US012674768B2

(12) United States Patent
Wada

(10) Patent No.: US 12,674,768 B2
(45) Date of Patent: Jul. 7, 2026

(54) ENTRANCE MANAGEMENT SYSTEM AND ENTRANCE MANAGEMENT CONTROL DEVICE

(71) Applicant: KABUSHIKI KAISHA TOSHIBA, Tokyo (JP)

(72) Inventor: Kentaro Wada, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 158 days.

(21) Appl. No.: 18/589,975

(22) Filed: Feb. 28, 2024

(65) Prior Publication Data

US 2025/0012741 A1 Jan. 9, 2025

(30) Foreign Application Priority Data

Jul. 3, 2023 (JP) ................................. 2023-108990

(51) Int. Cl.
*G01N 23/18* (2018.01)
*G01N 23/10* (2018.01)

(52) U.S. Cl.
CPC ............. *G01N 23/18* (2013.01); *G01N 23/10* (2013.01)

(58) Field of Classification Search
CPC ...... G06V 20/52; G06V 40/103; G06V 40/20; G06V 40/172; G06V 40/173; G06V 20/53; G08B 21/02; G08B 25/00; G01V 5/20; G01V 5/22; G01V 5/271; G06Q 50/265
See application file for complete search history.

(56) References Cited

U.S. PATENT DOCUMENTS

| 11,119,207 B2 * | 9/2021 | Vemury | ................ H04W 4/029 |
| 2009/0284343 A1 * | 11/2009 | Ambrefe, Jr. | ........... B64F 1/366 |
| | | | 340/5.2 |
| 2014/0079297 A1 * | 3/2014 | Tadayon | .............. G06V 40/172 |
| | | | 382/118 |

(Continued)

FOREIGN PATENT DOCUMENTS

| JP | 2005347905 A | 12/2005 |
| JP | 4528262 B2 | 8/2010 |

(Continued)

OTHER PUBLICATIONS

Japanese Office Action (and an English language translation thereof) dated Dec. 2, 2025, issued in corresponding Japanese Application No. 2023-108990.

*Primary Examiner* — David J Makiya
*Assistant Examiner* — Soorena Kefayati
(74) *Attorney, Agent, or Firm* — Holtz, Holtz & Volek PC

(57) ABSTRACT

According to one embodiment, an entrance management system includes a baggage determination device and an entrance management device. The baggage determination device includes a first determination unit which determines whether a predetermined object is included in baggage of the visitor. The entrance management device includes a second determination unit which determines whether the baggage has a predetermined size or more, and a processor. The processor determines whether the visitor is permitted to enter based on a result of the first determination unit and a result of the second determination unit, and outputs information indicating that the visitor is permitted to enter or the visitor is not permitted to enter.

13 Claims, 42 Drawing Sheets

(56) References Cited

U.S. PATENT DOCUMENTS

| | | | | |
|---|---|---|---|---|
| 2017/0083768 | A1* | 3/2017 | Xu | G06T 7/0002 |
| 2020/0043118 | A1* | 2/2020 | Sakaguchi | G06V 20/41 |
| 2020/0193545 | A1 | 6/2020 | Kumano et al. | |
| 2020/0233901 | A1* | 7/2020 | Crowley | G06V 20/647 |
| 2020/0393594 | A1* | 12/2020 | Obata | G06V 40/10 |
| 2021/0326596 | A1* | 10/2021 | Morita | G06F 18/2113 |
| 2021/0390290 | A1* | 12/2021 | Hunt | B64D 45/0018 |
| 2022/0165092 | A1* | 5/2022 | Watanabe | G08B 25/00 |
| 2022/0172218 | A1* | 6/2022 | Nakahira | G07C 9/38 |
| 2022/0381941 | A1* | 12/2022 | Fortune | G01V 5/20 |
| 2022/0383631 | A1* | 12/2022 | Kanemaru | G06V 10/761 |
| 2023/0040513 | A1* | 2/2023 | Ryan | G06V 10/25 |
| 2023/0143314 | A1* | 5/2023 | Norimatsu | G06Q 50/26 |
| | | | | 705/325 |
| 2023/0368927 | A1* | 11/2023 | Otani | G16H 40/67 |
| 2023/0377396 | A1* | 11/2023 | Dooley, III | G07C 9/30 |

FOREIGN PATENT DOCUMENTS

| | | | |
|---|---|---|---|
| JP | 2018005491 | A | 1/2018 |
| JP | 2019007771 | A | 1/2019 |
| JP | 6588148 | B1 | 10/2019 |
| JP | 2020155882 | A | 9/2020 |

* cited by examiner

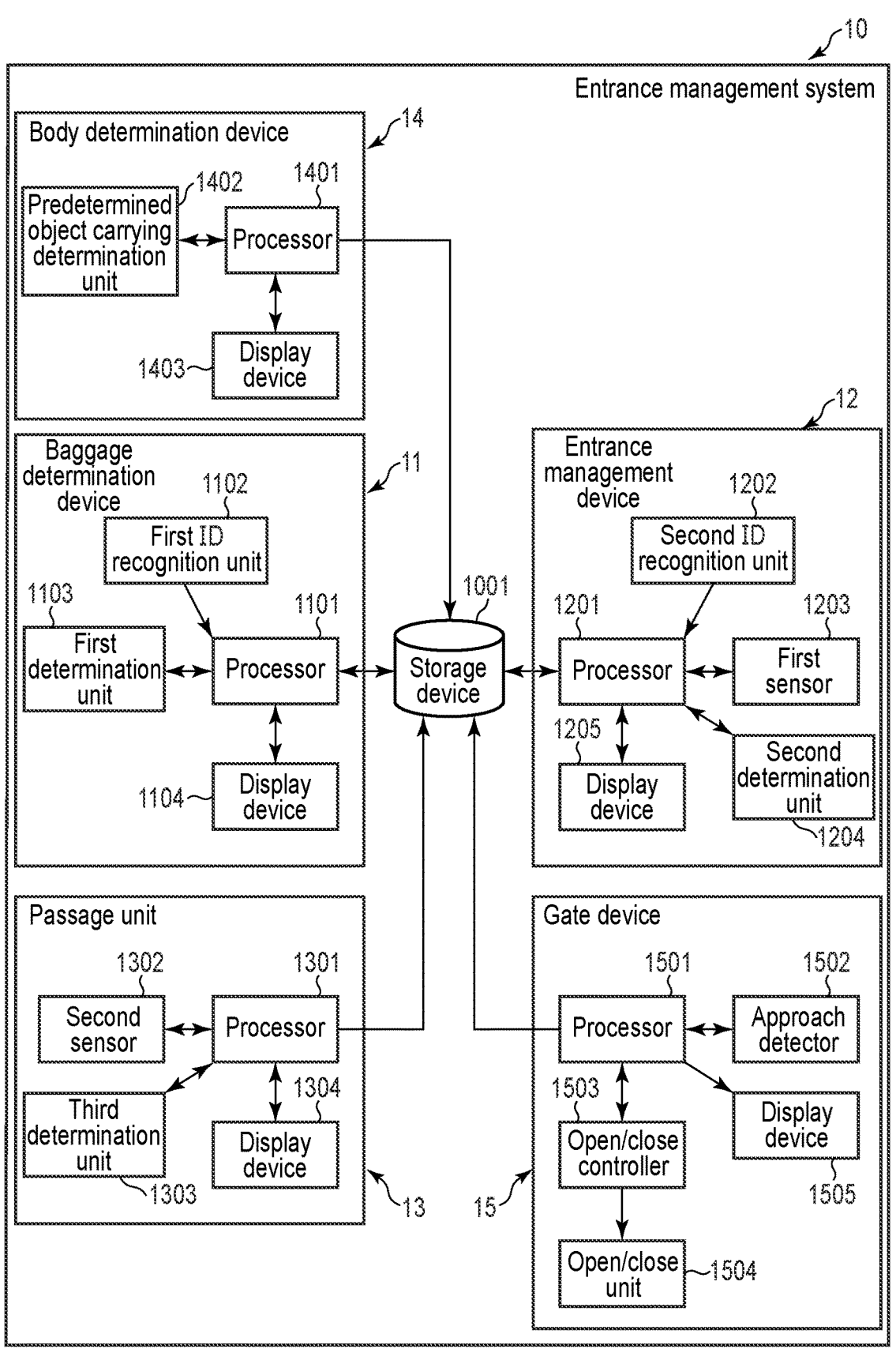
F I G. 1

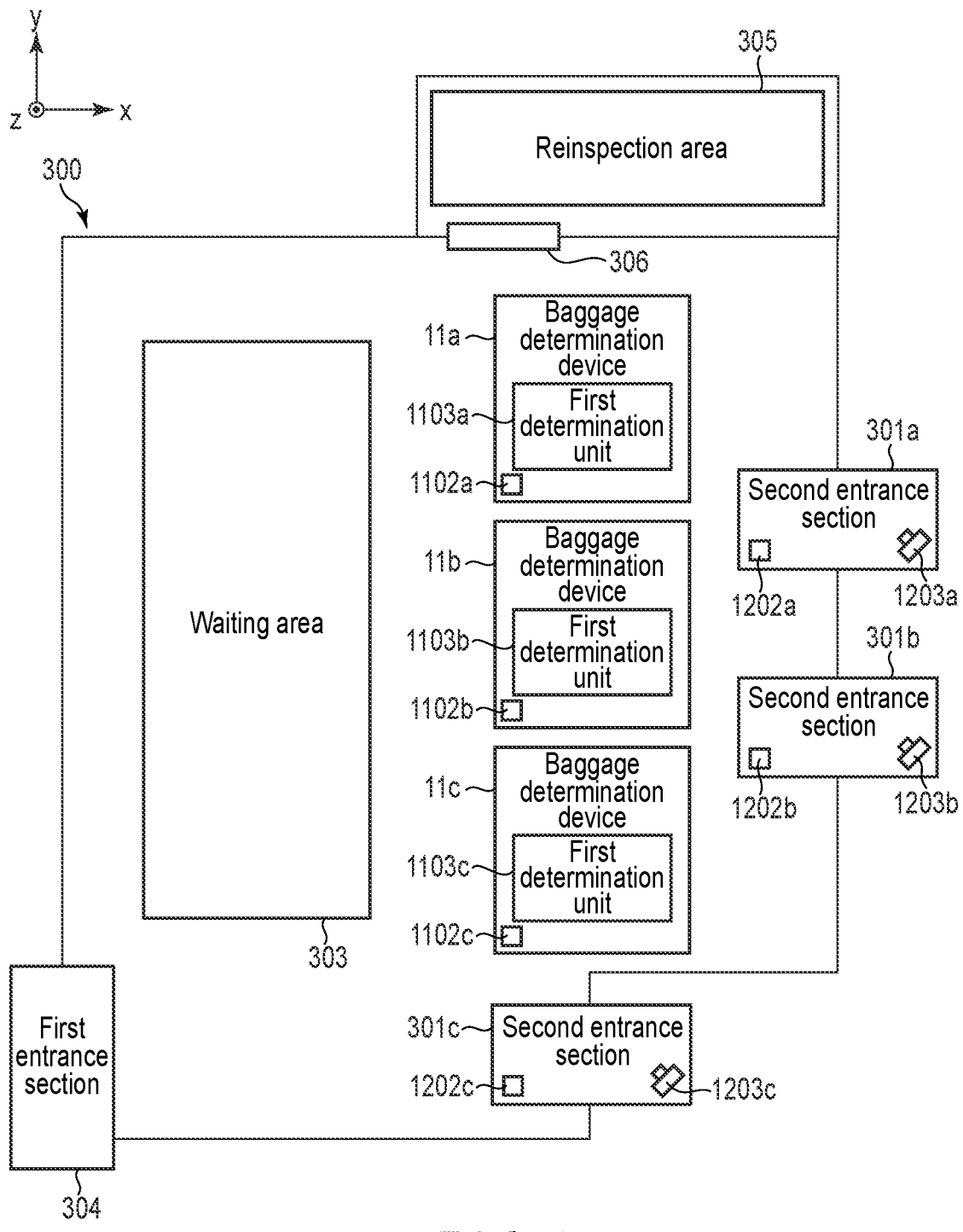
F I G. 2

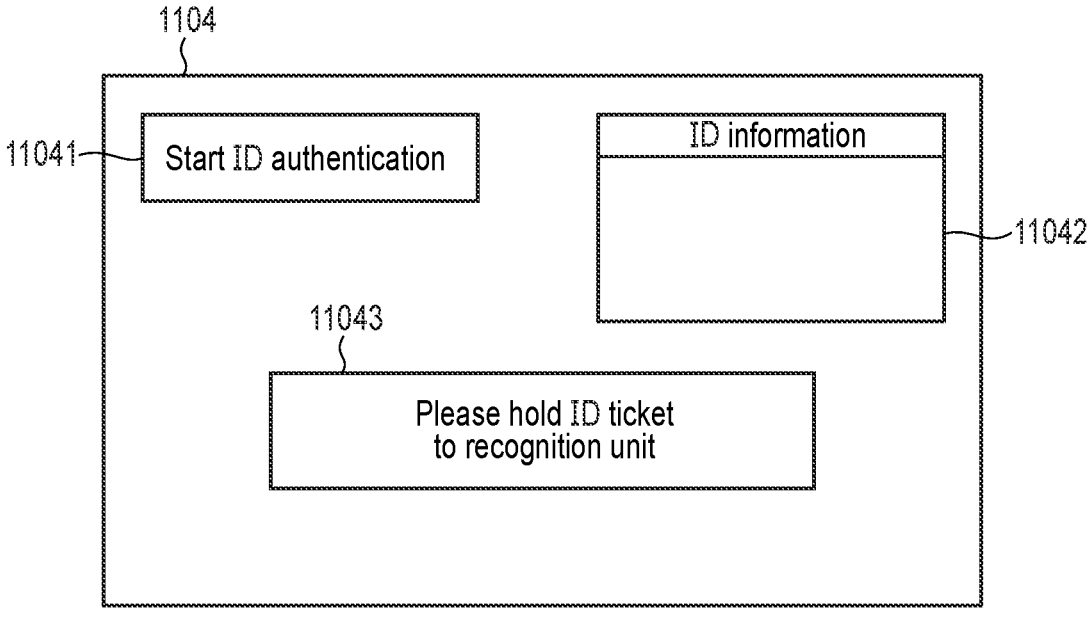
F I G. 3A
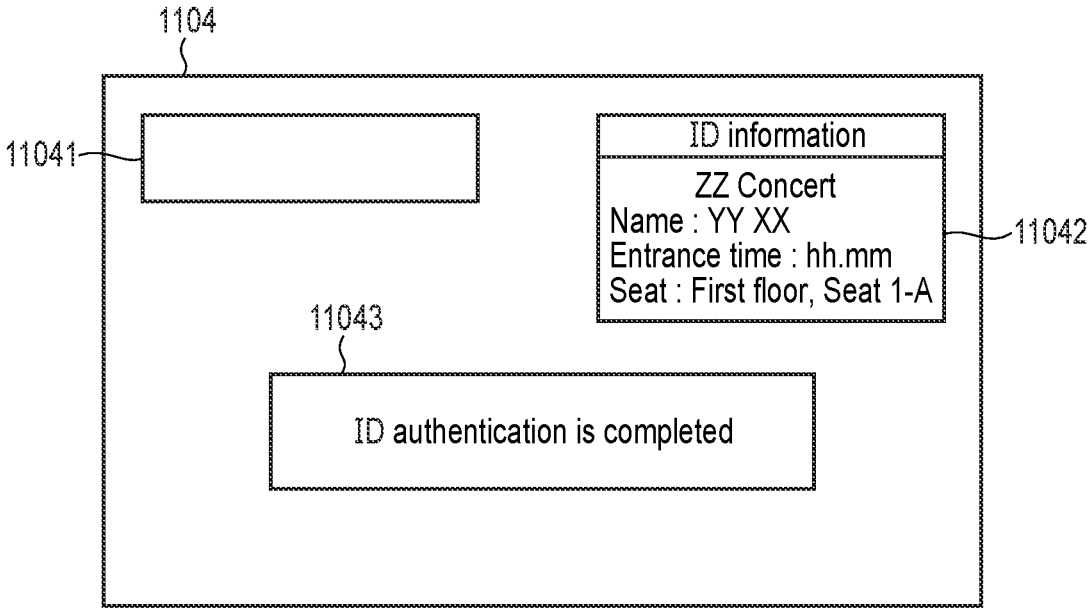
F I G. 3B

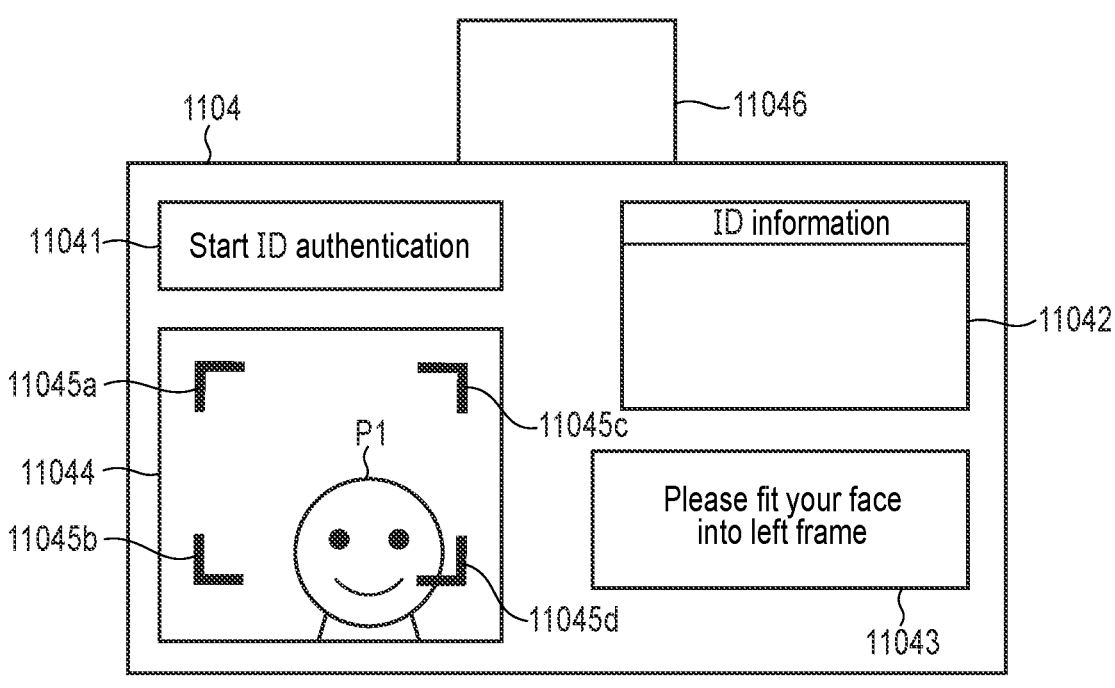
F I G. 3C
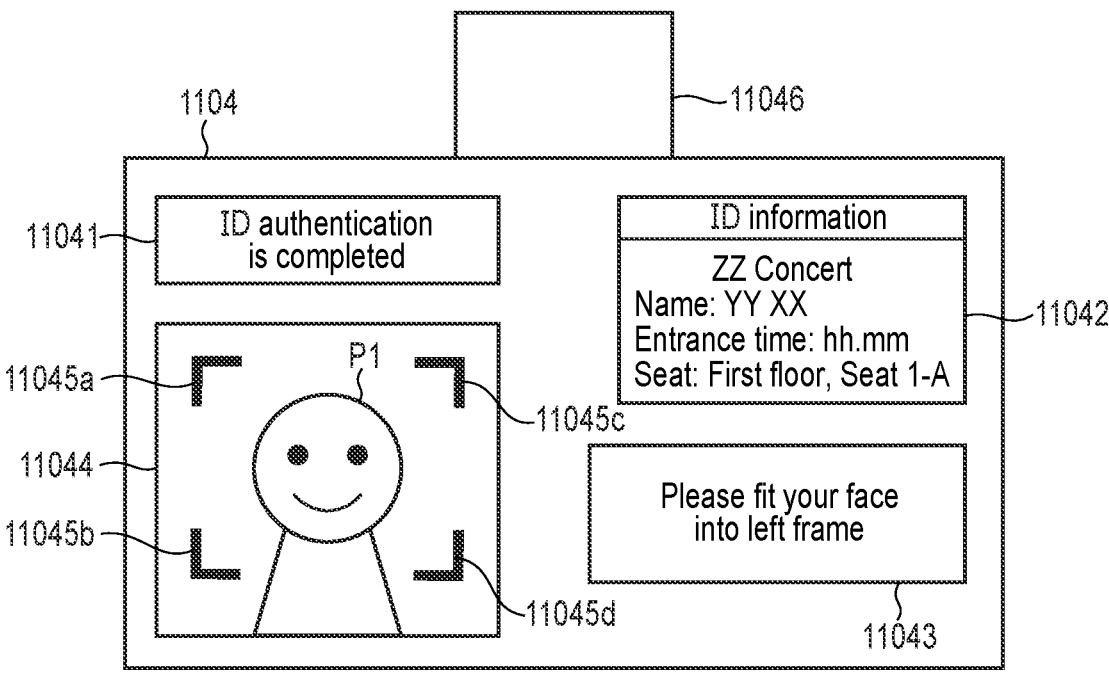
F I G. 3D

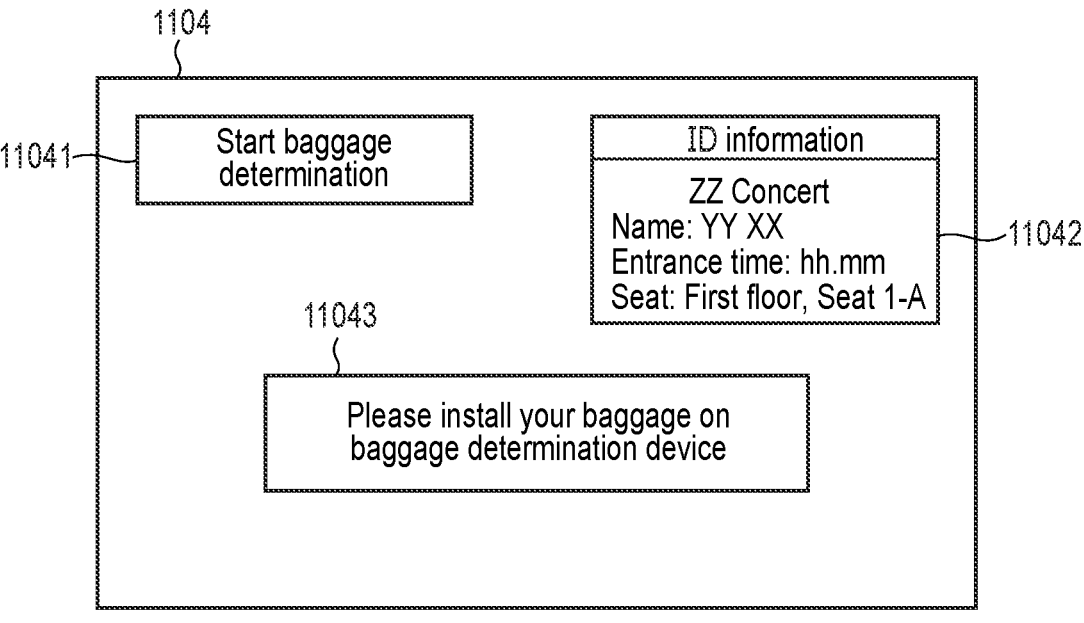
F I G. 3E
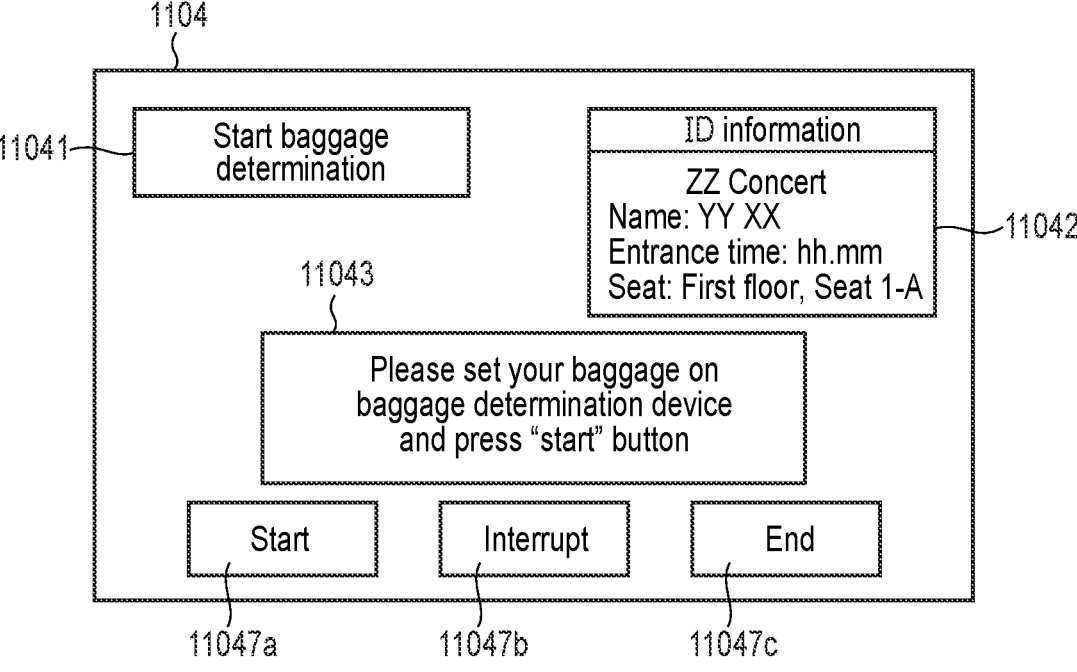
F I G. 3F

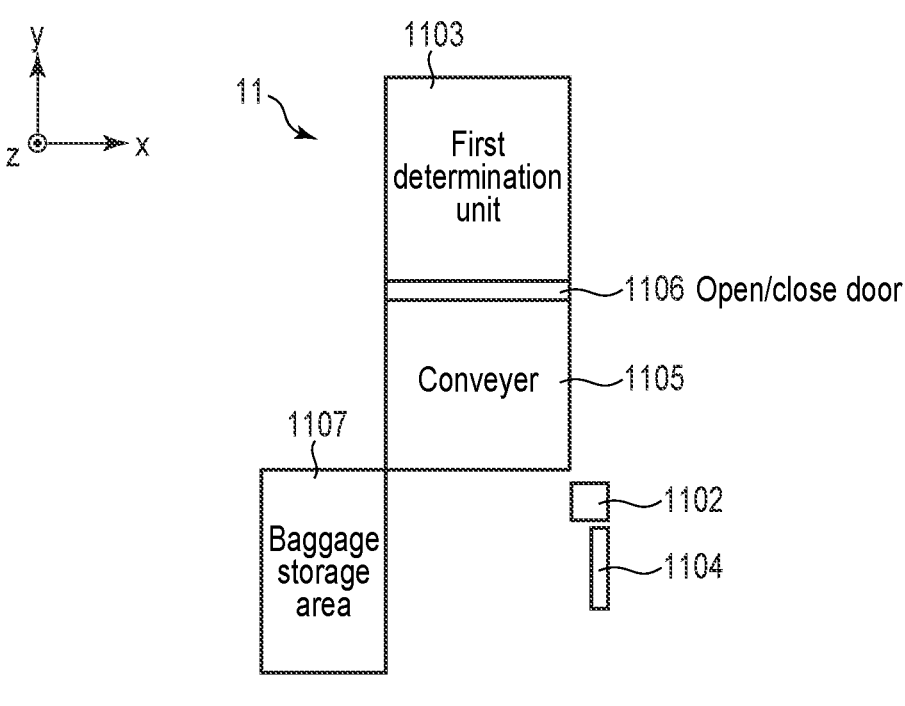
F I G. 4A
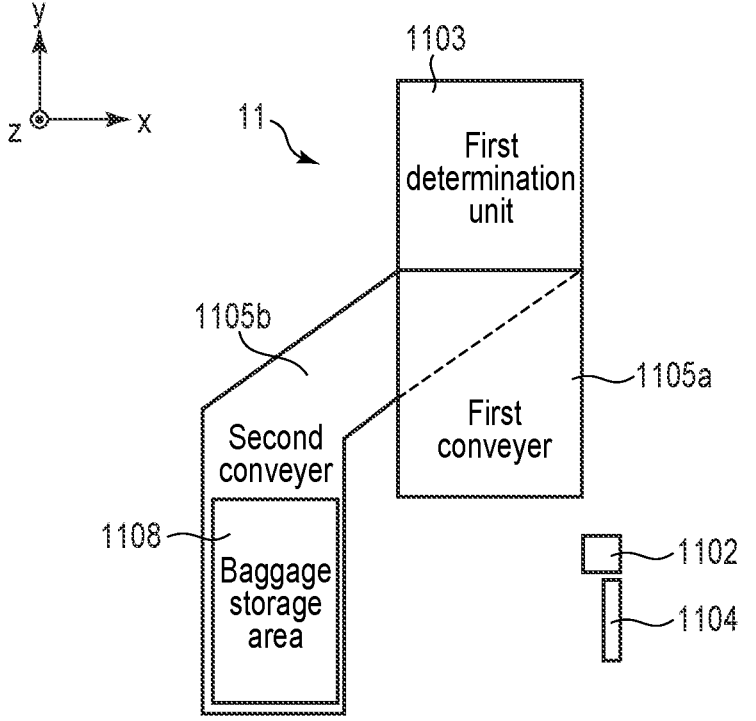
F I G. 4B

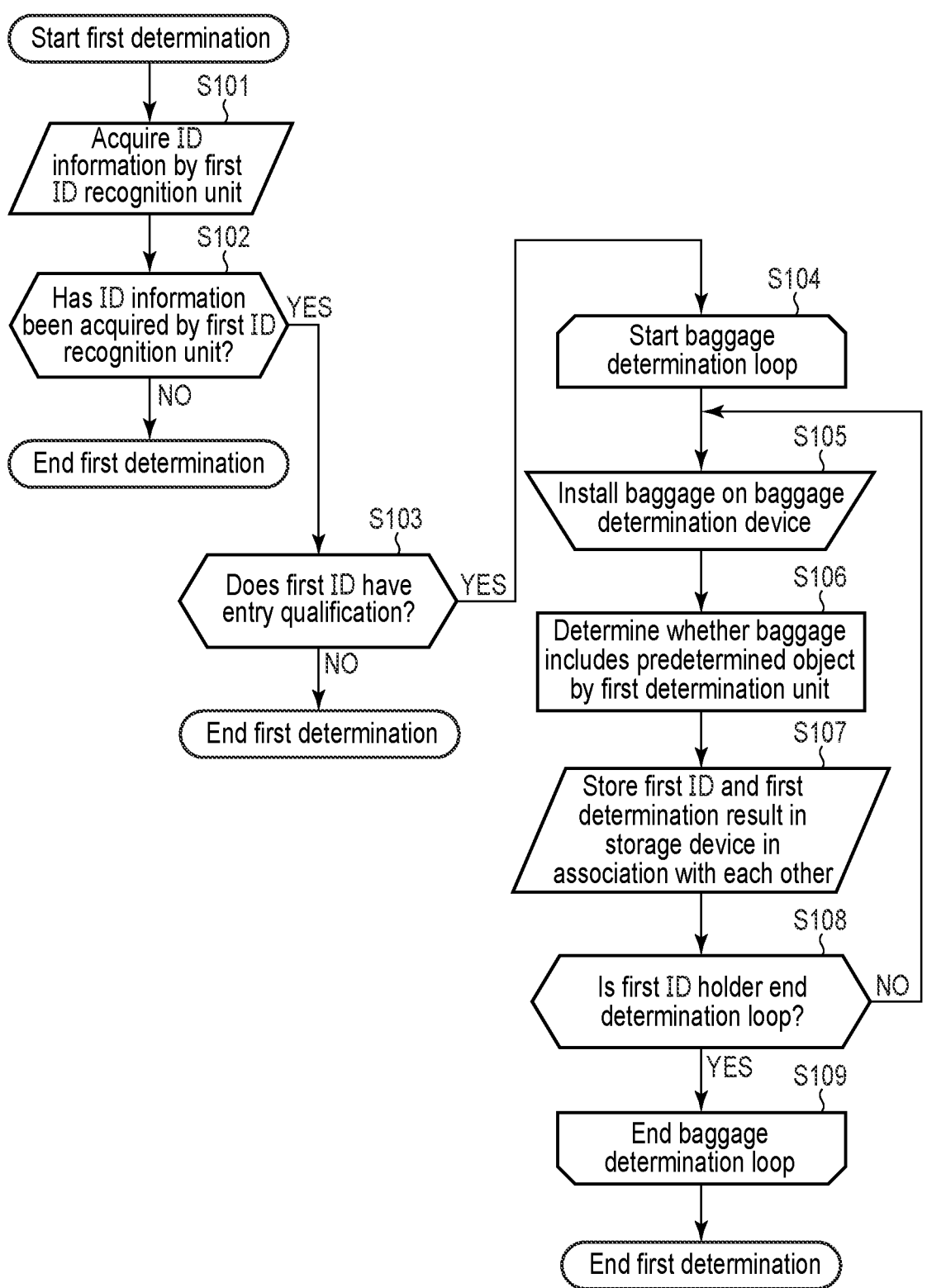
F I G. 5

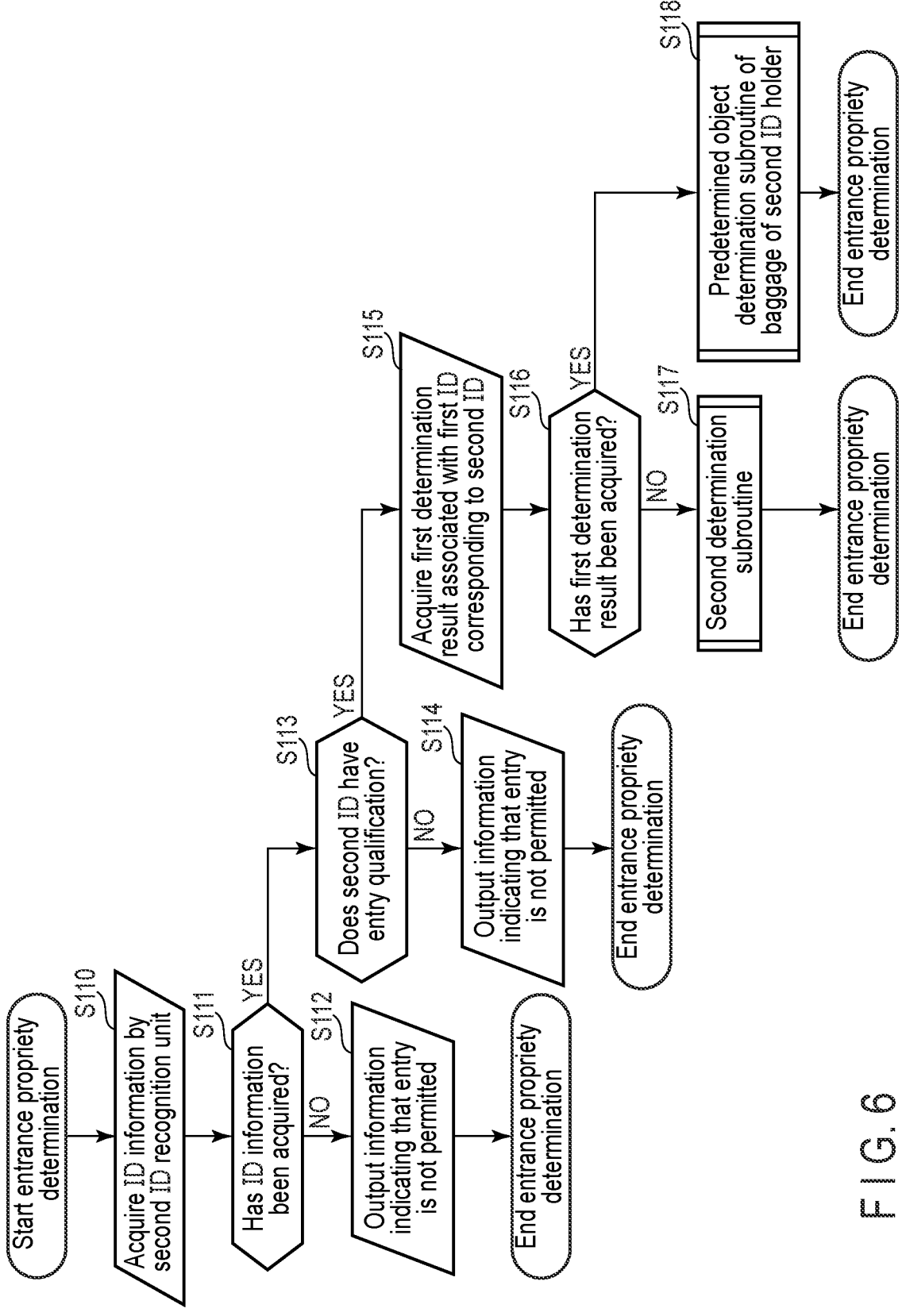
F I G. 6

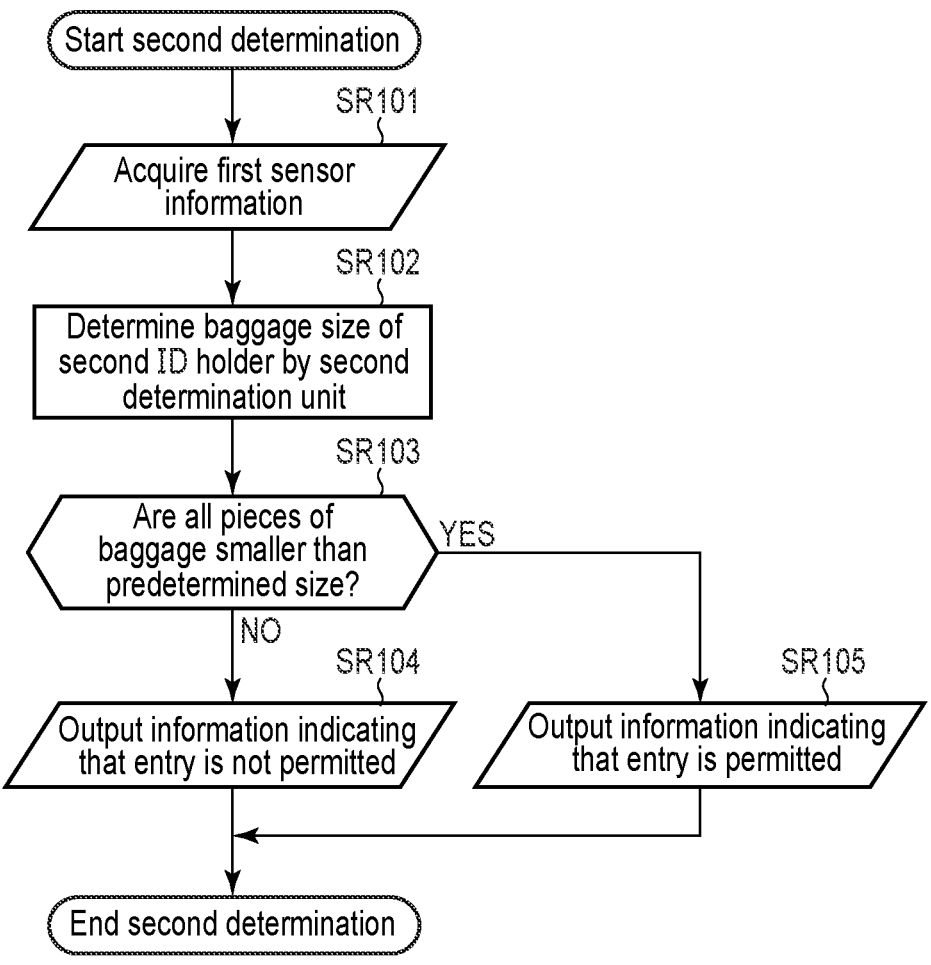
F I G. 7

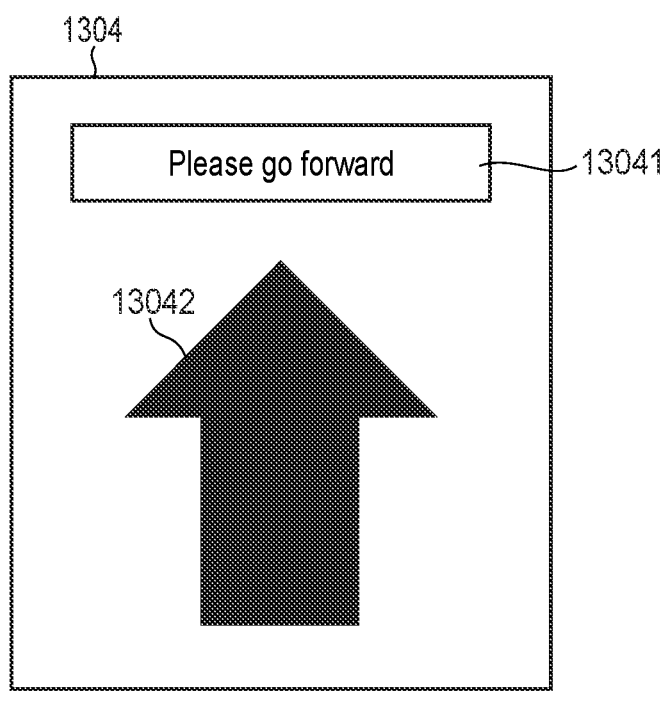
F I G. 10A
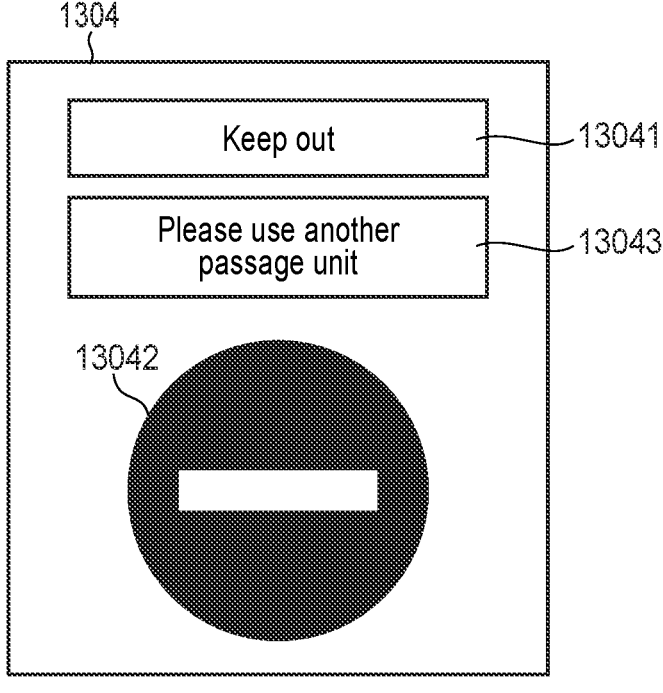
F I G. 10B

1304
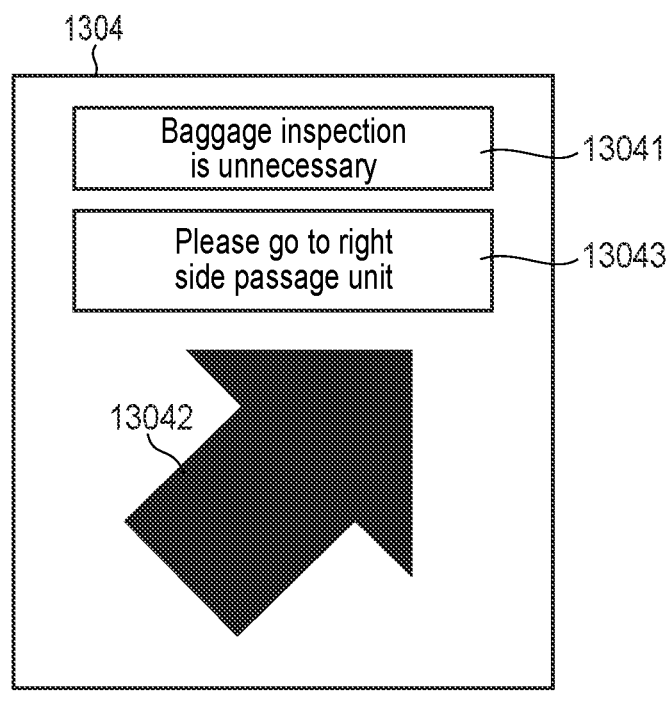
F I G. 10C
1304
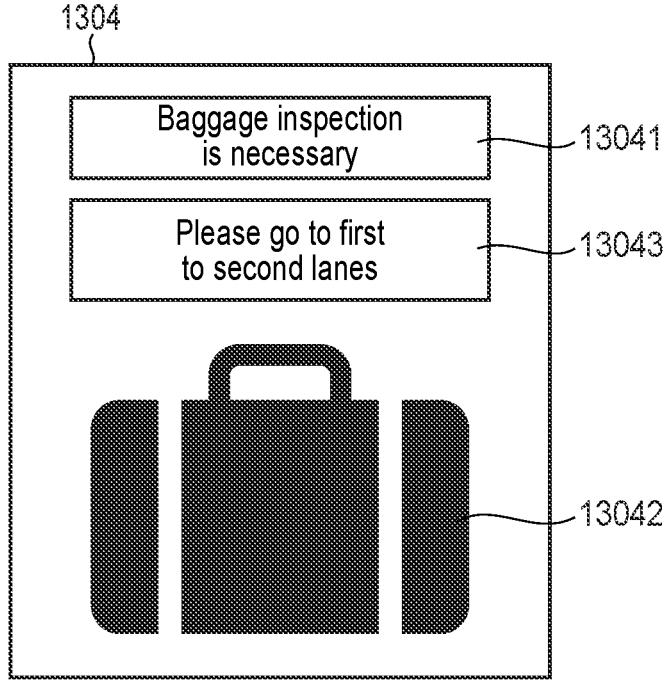
F I G. 10D

1304
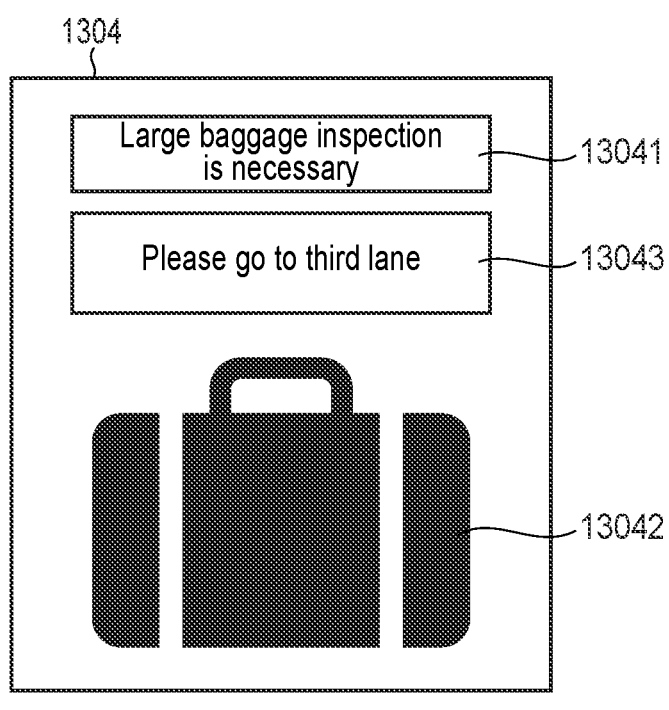
F I G. 10E
1304
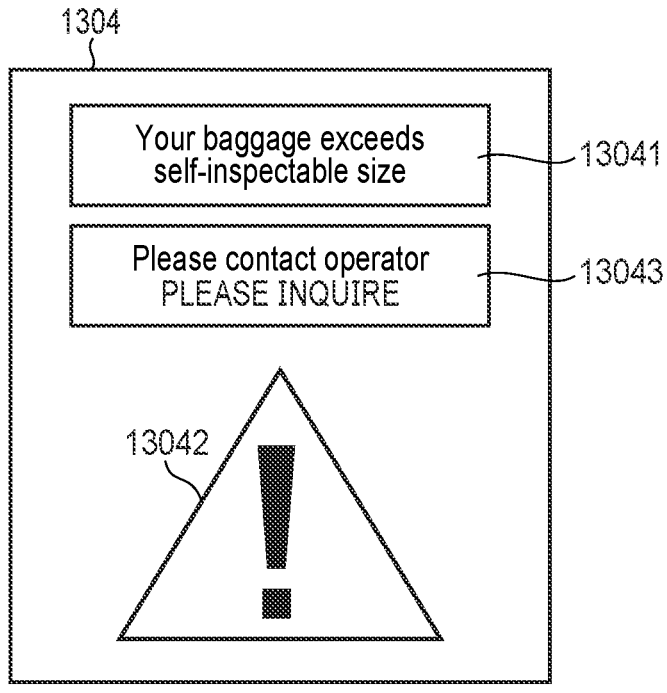
F I G. 10F

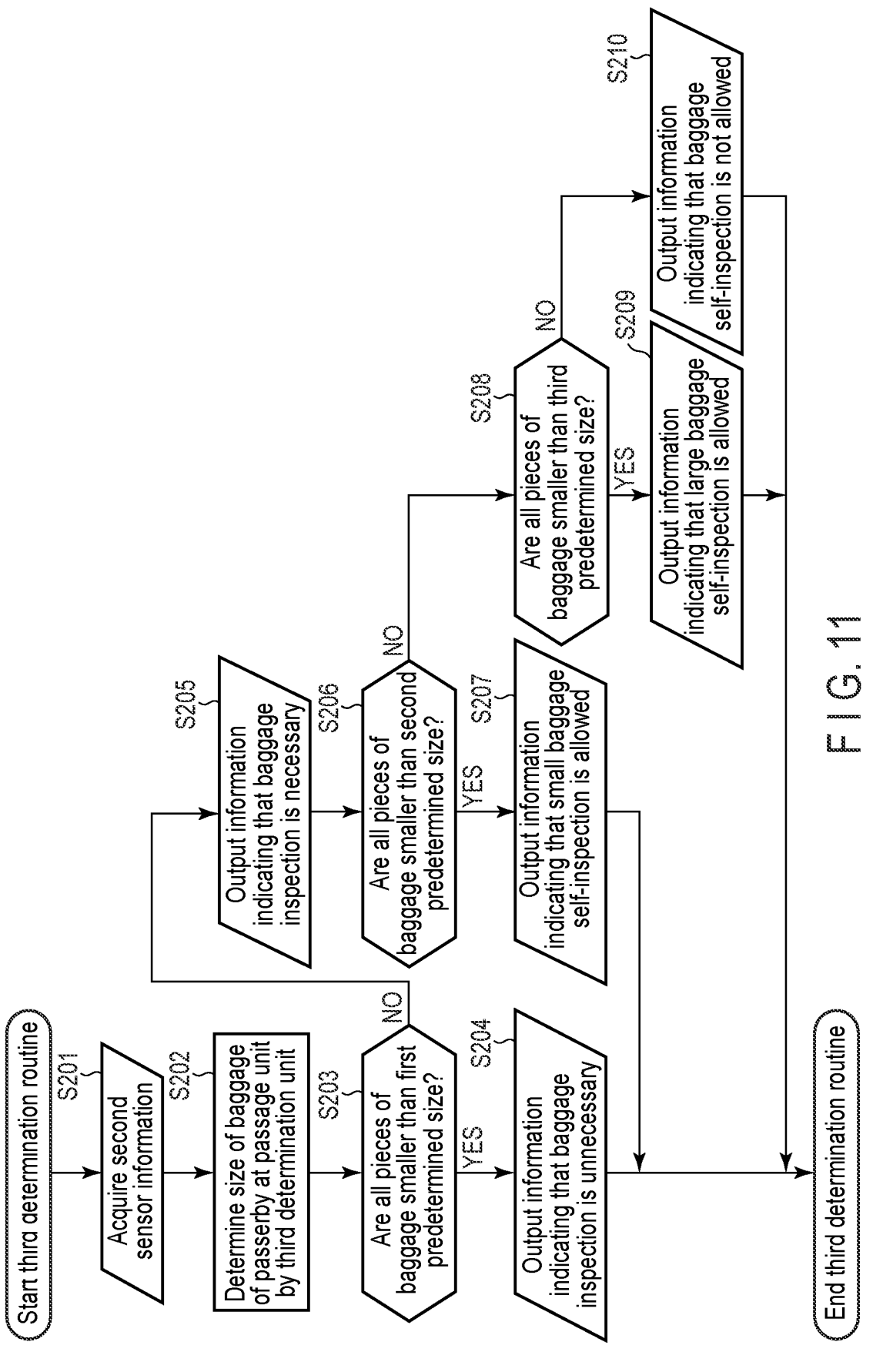
F I G. 11

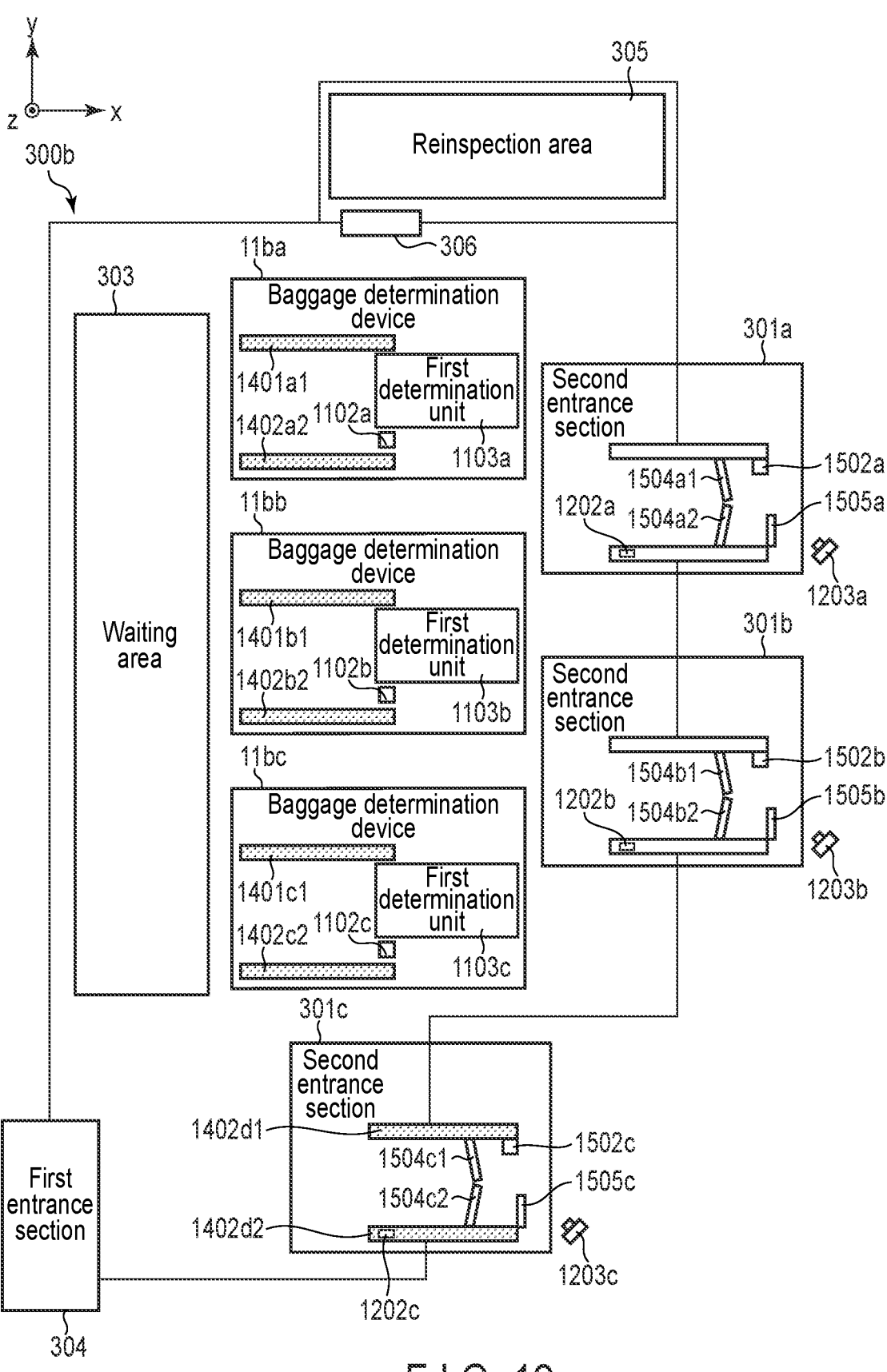
F I G. 12

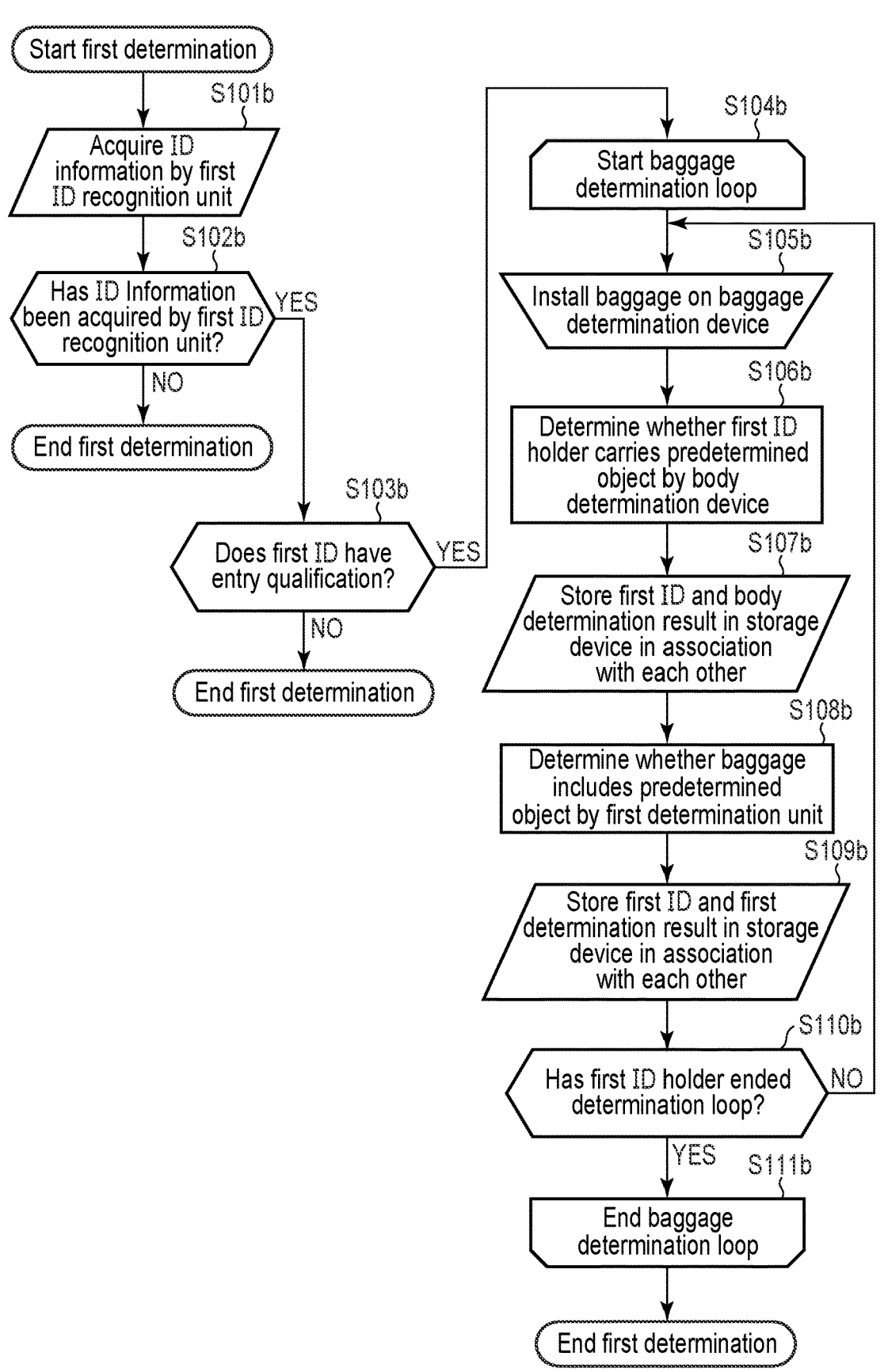
F I G. 14

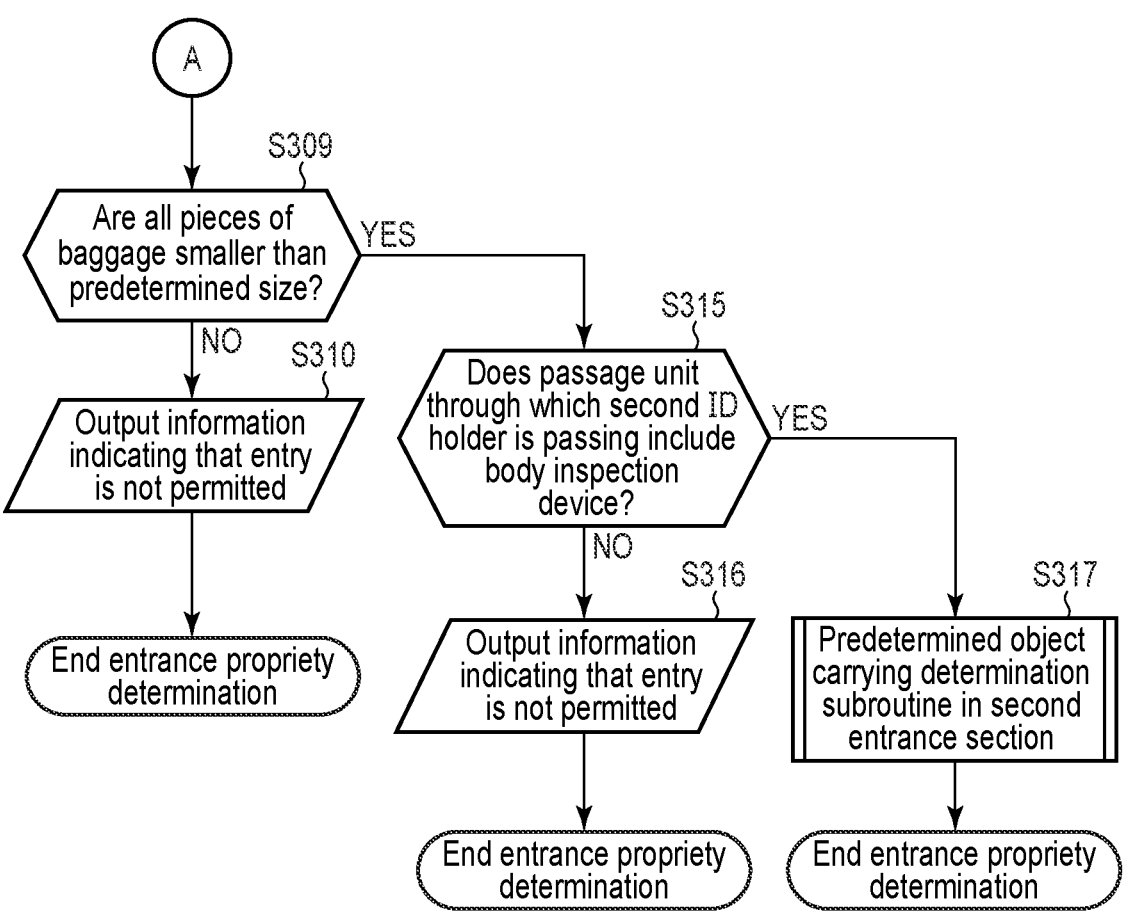
F I G. 15B

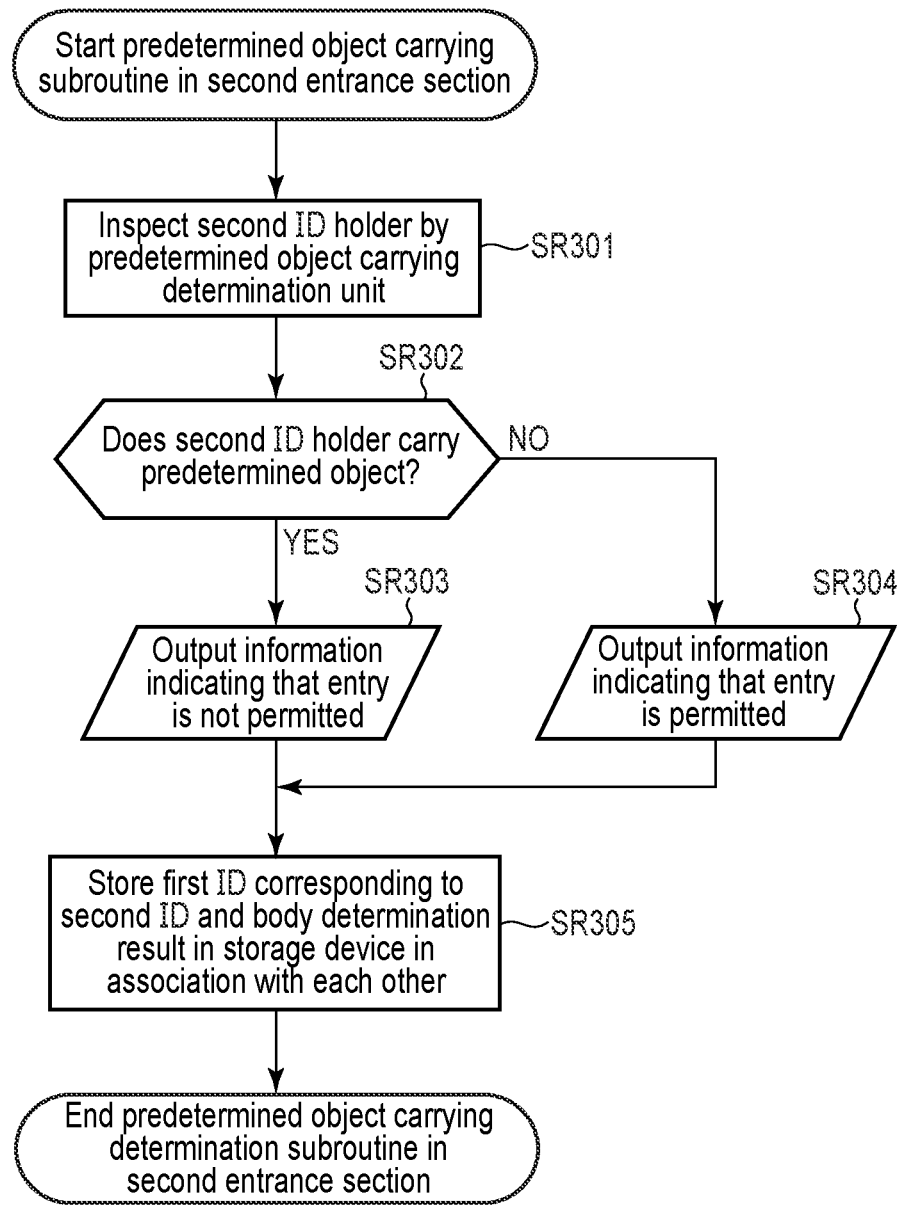
F I G. 16

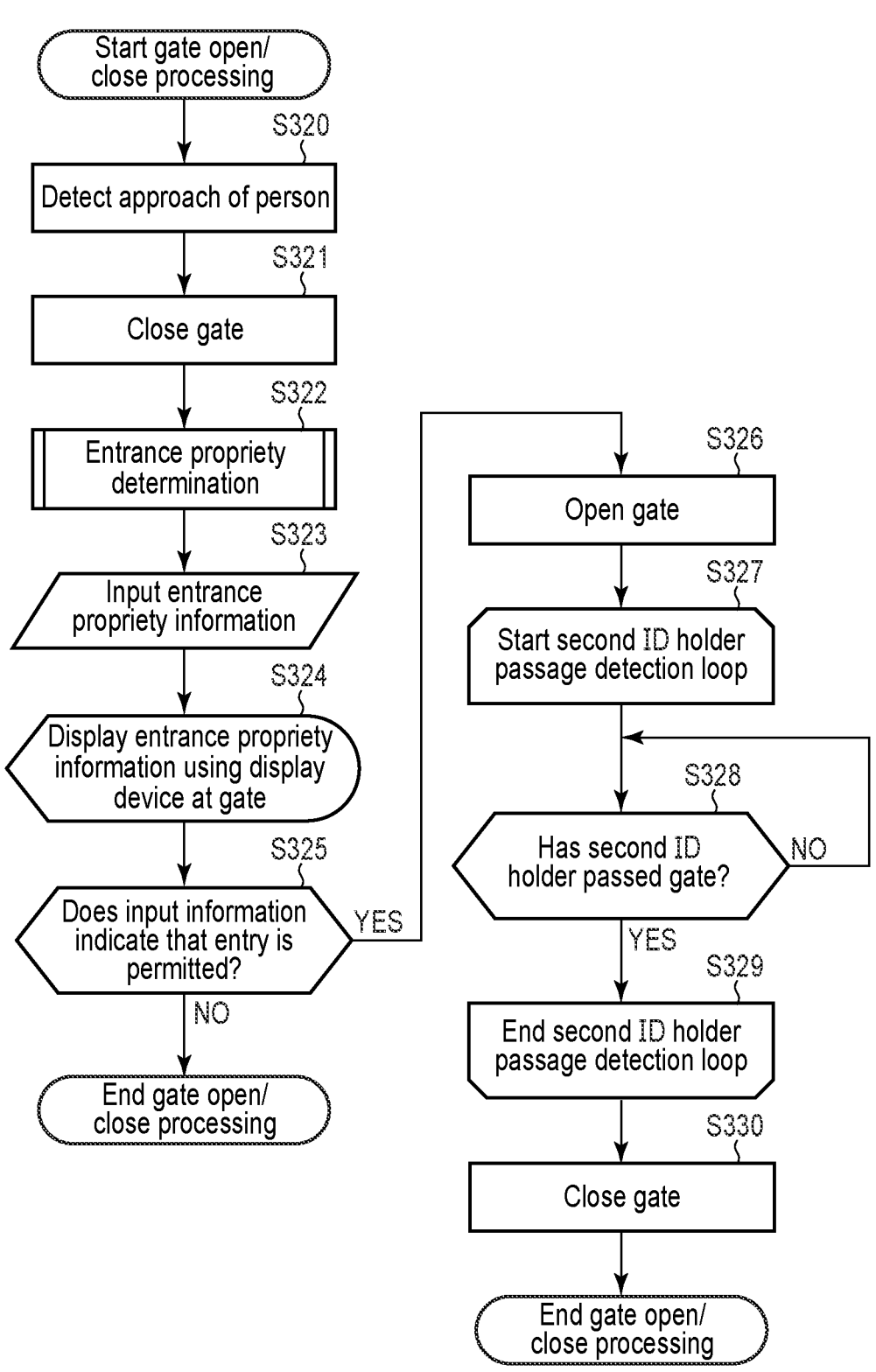
F I G. 17

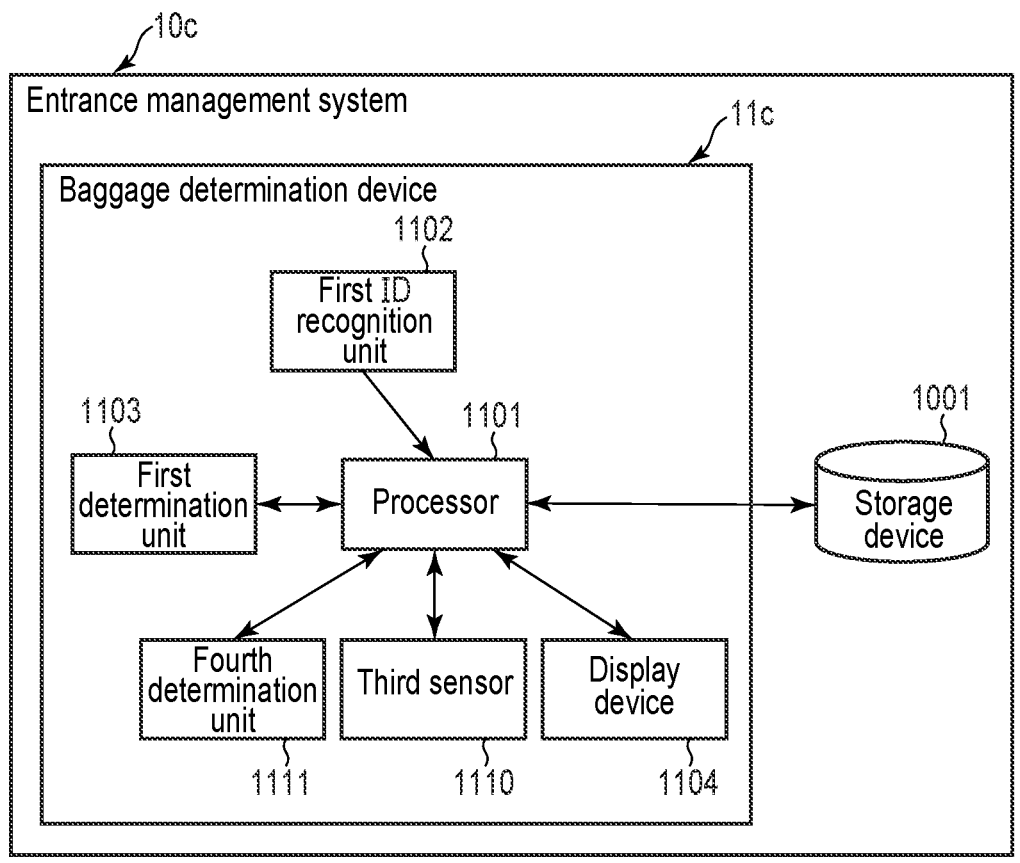
F I G. 18

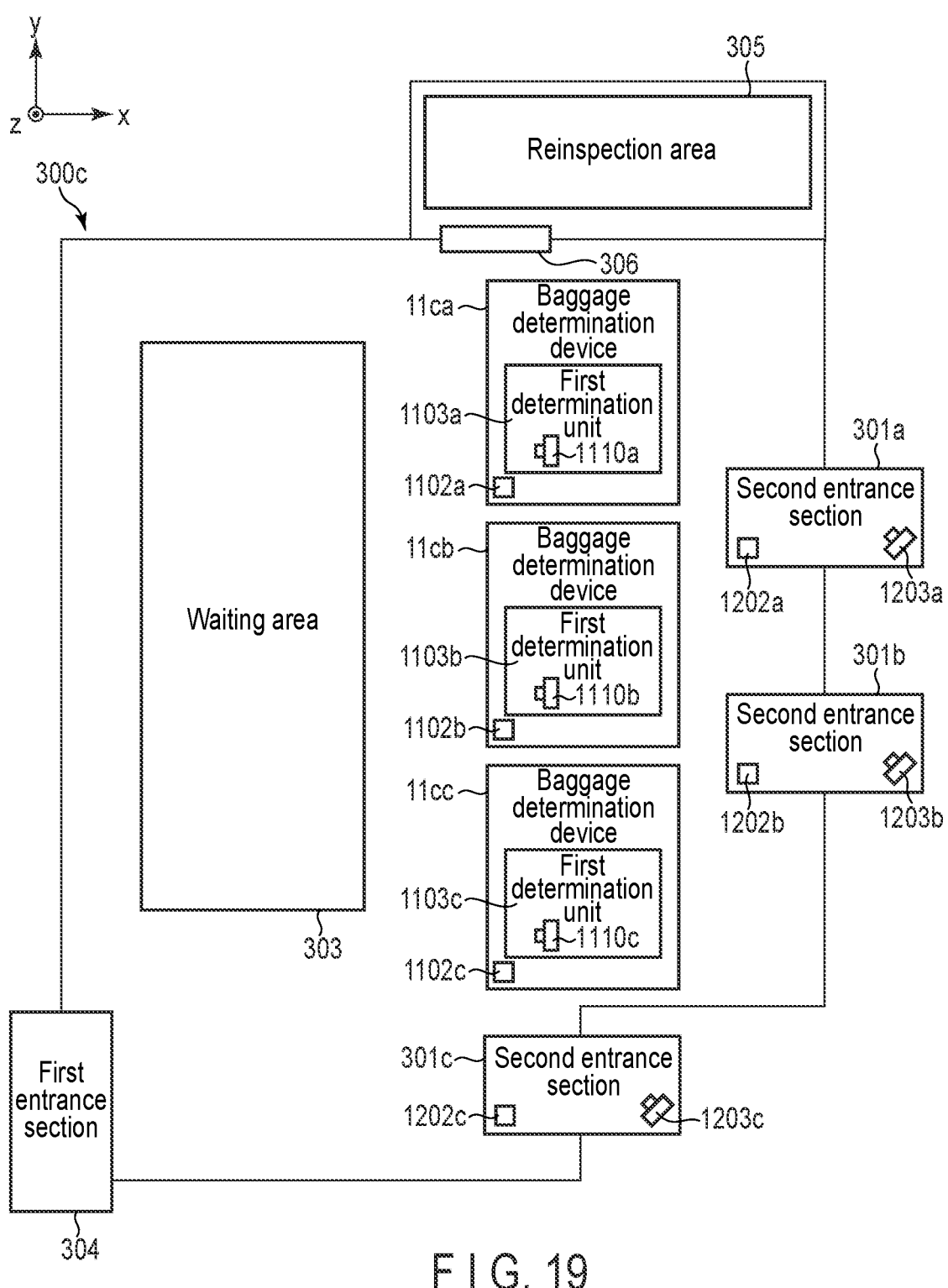
F I G. 19

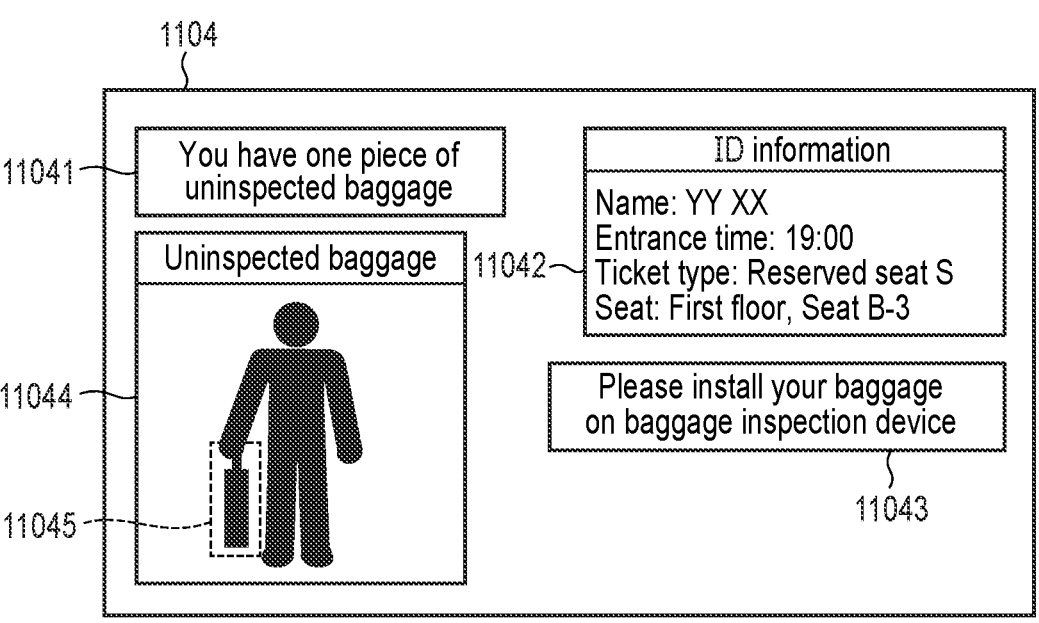
F I G. 20A
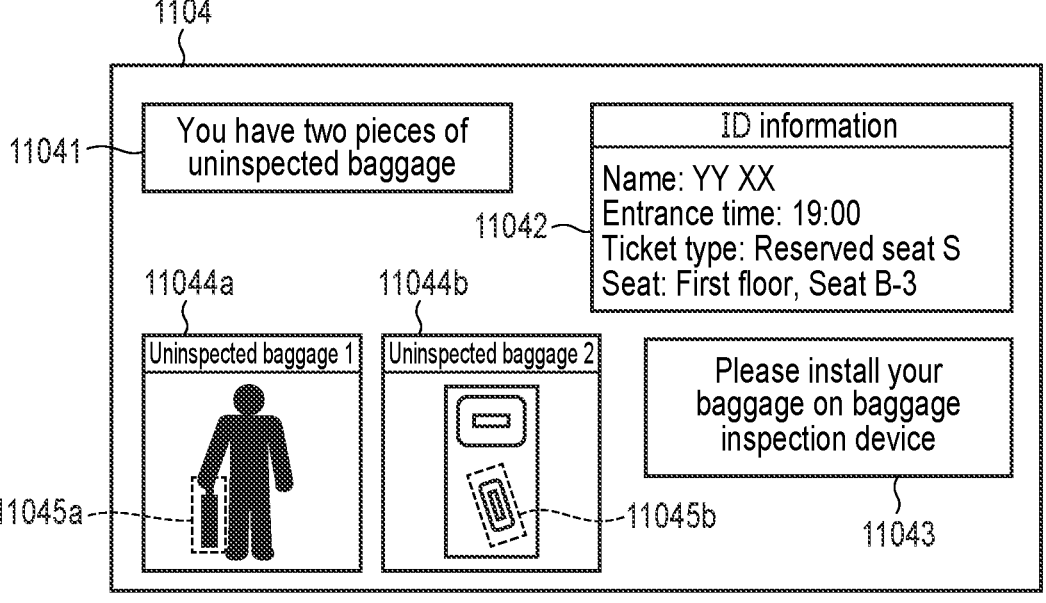
F I G. 20B

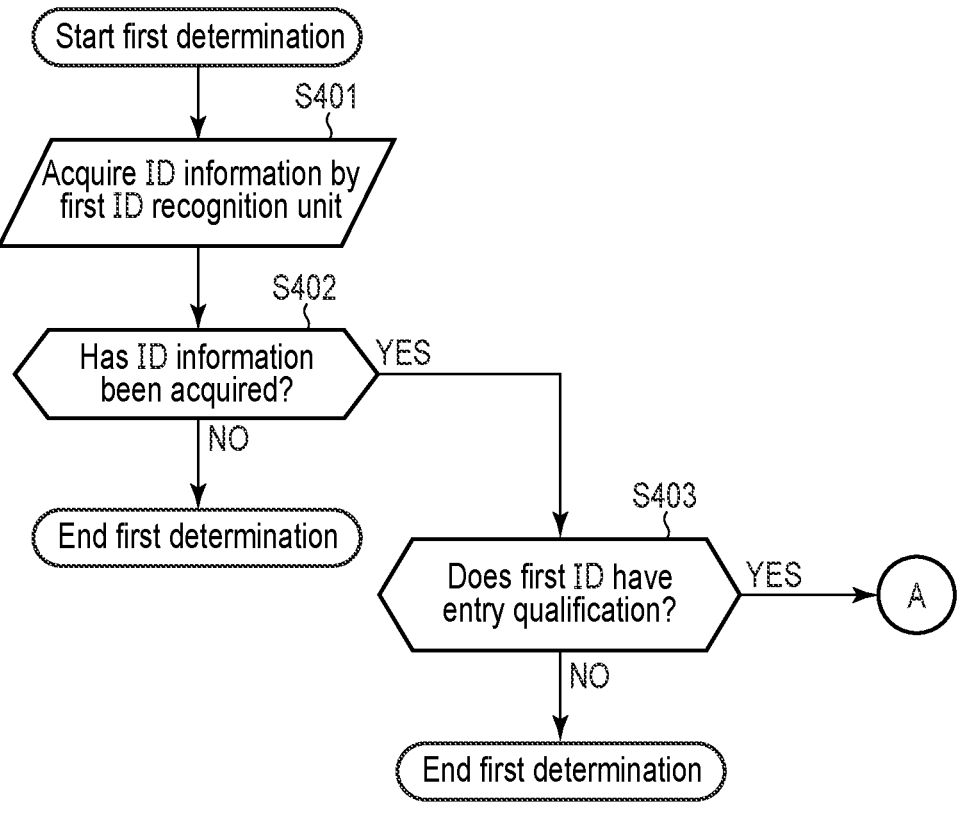
F I G. 21A

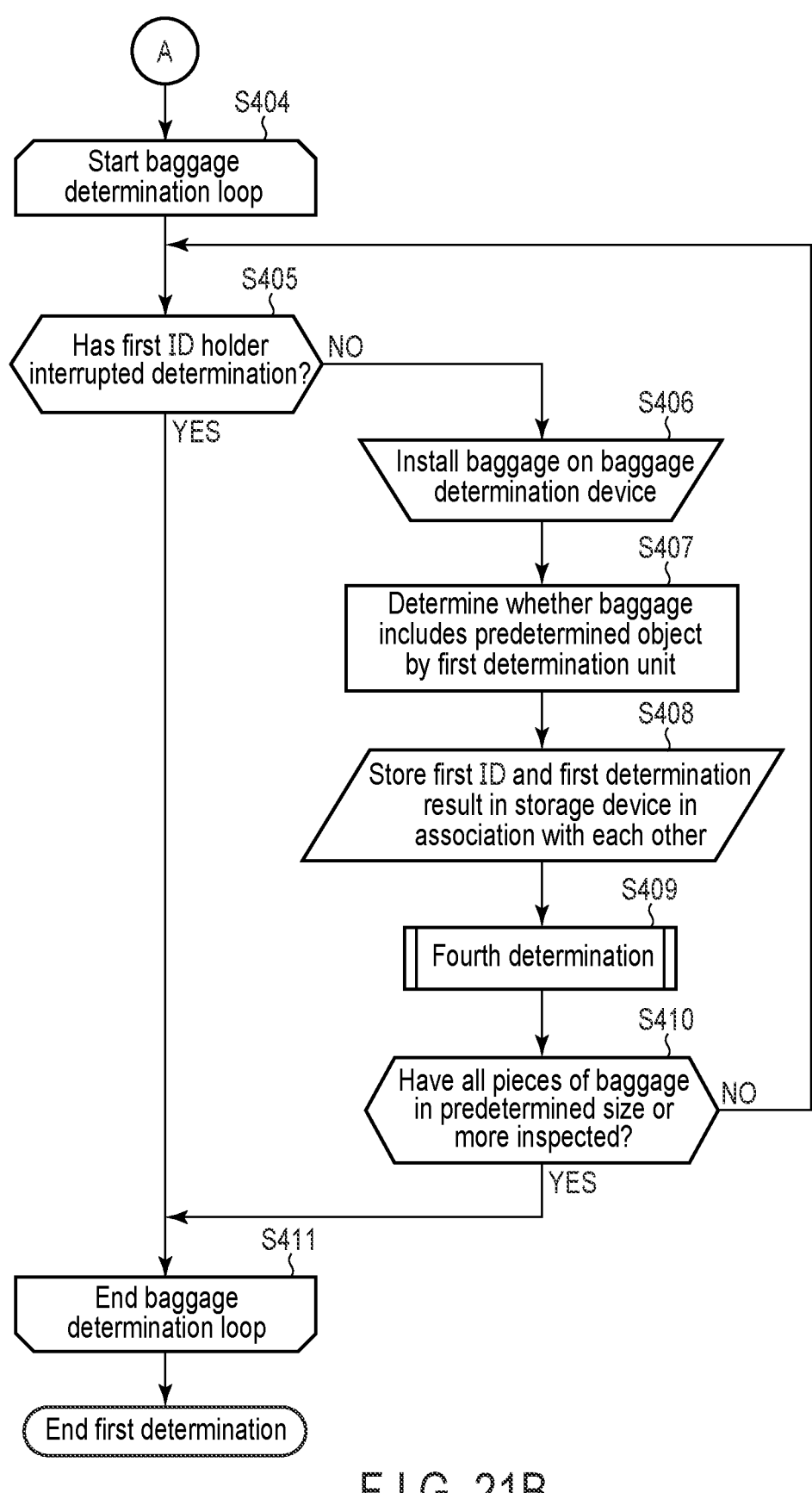
F I G. 21B

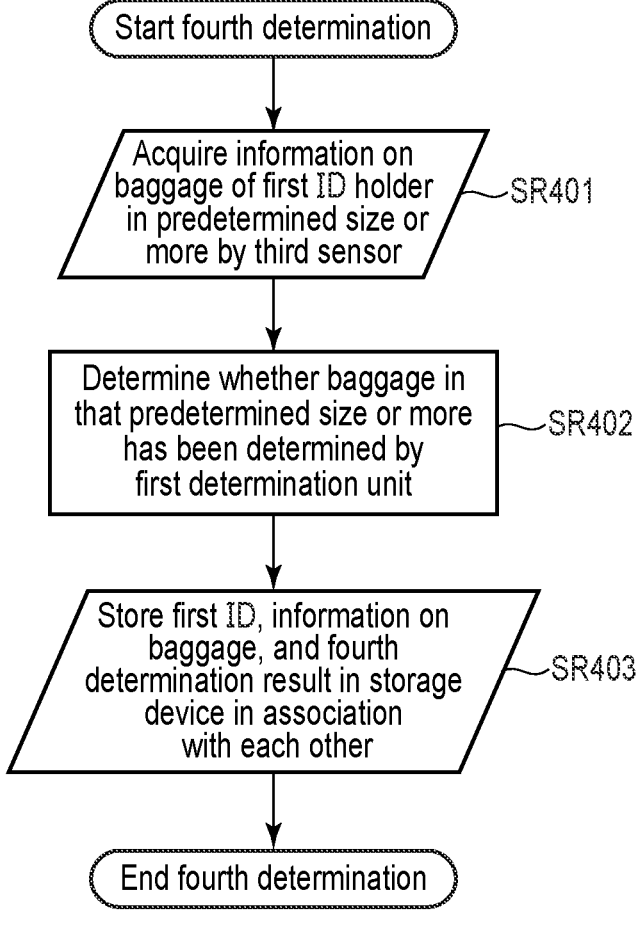
F I G. 22

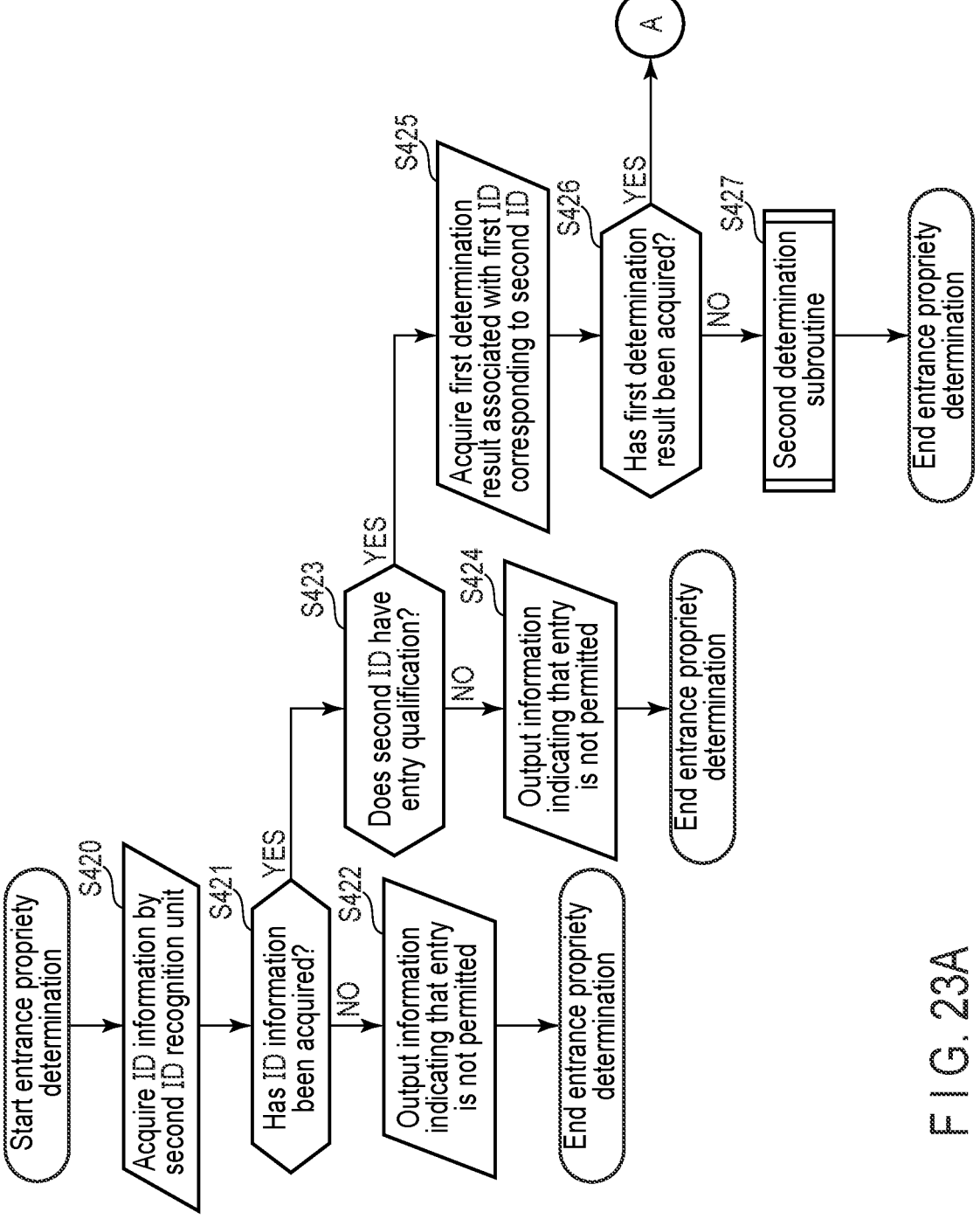
F I G. 23A

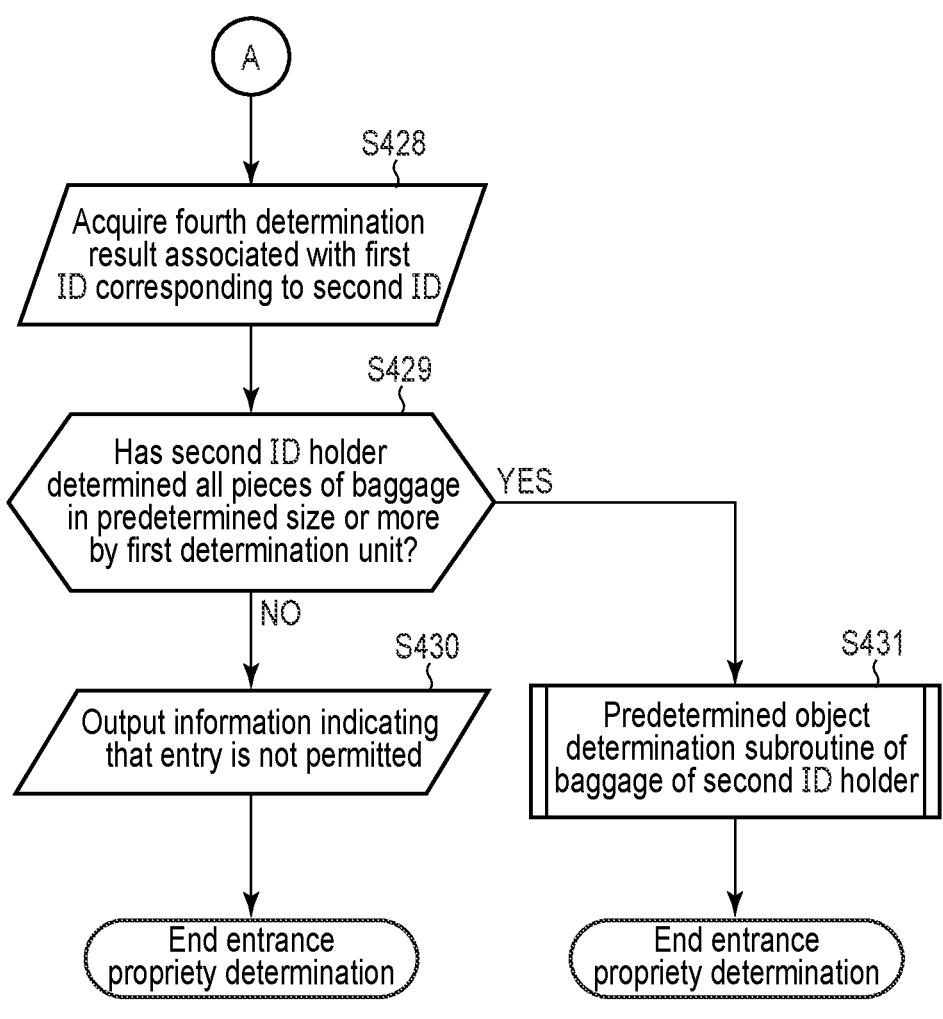
F I G. 23B

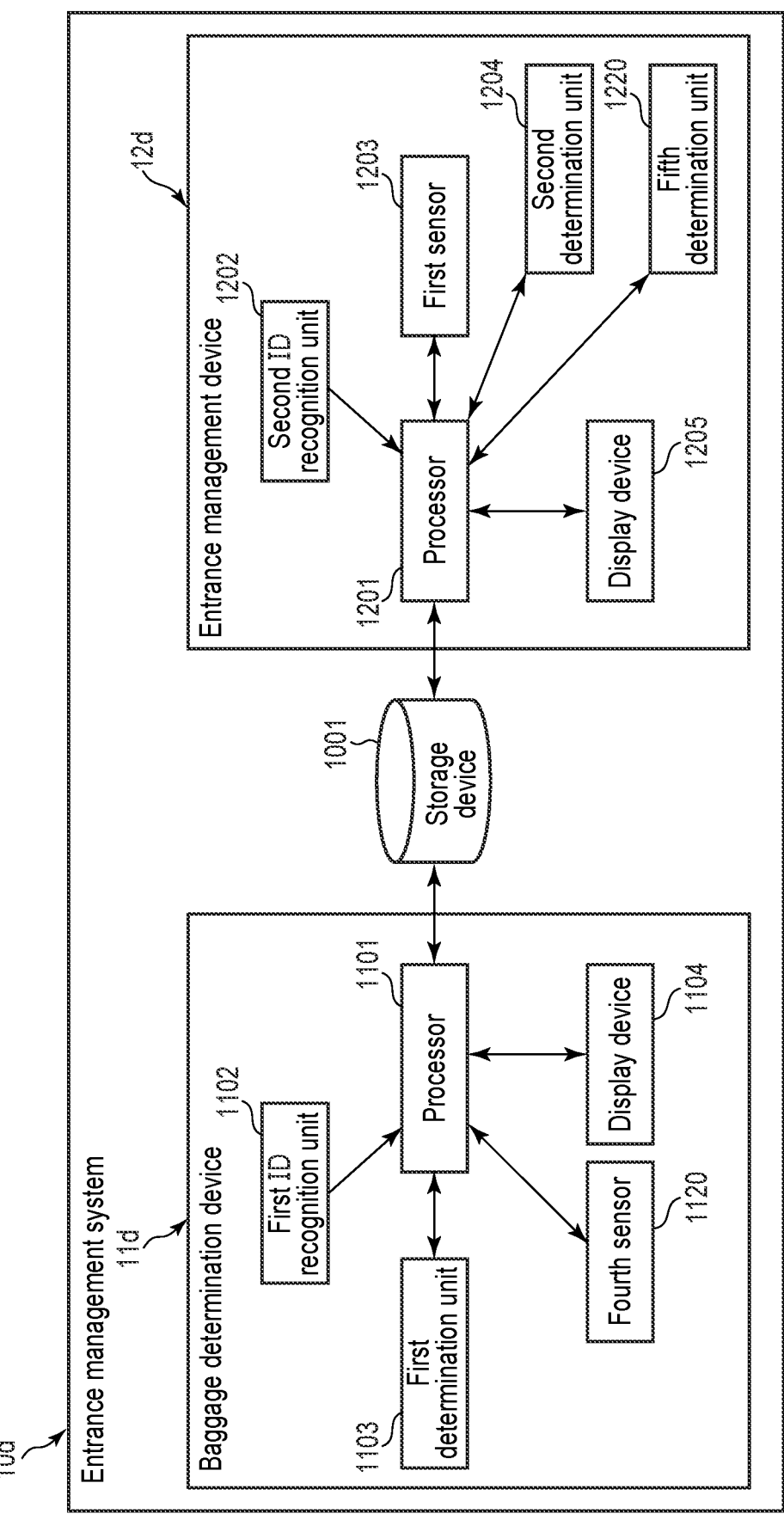
F I G. 24

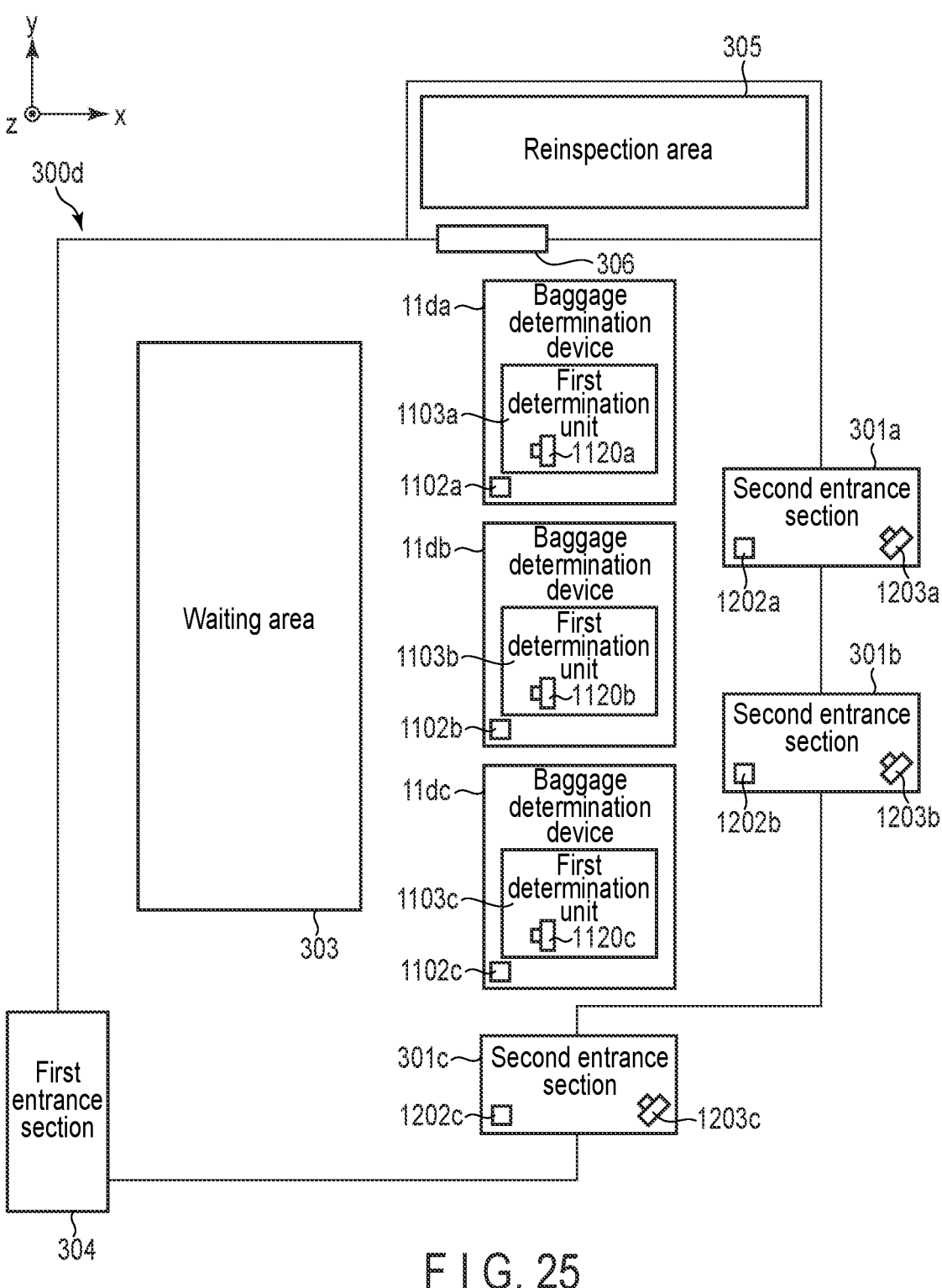
F I G. 25

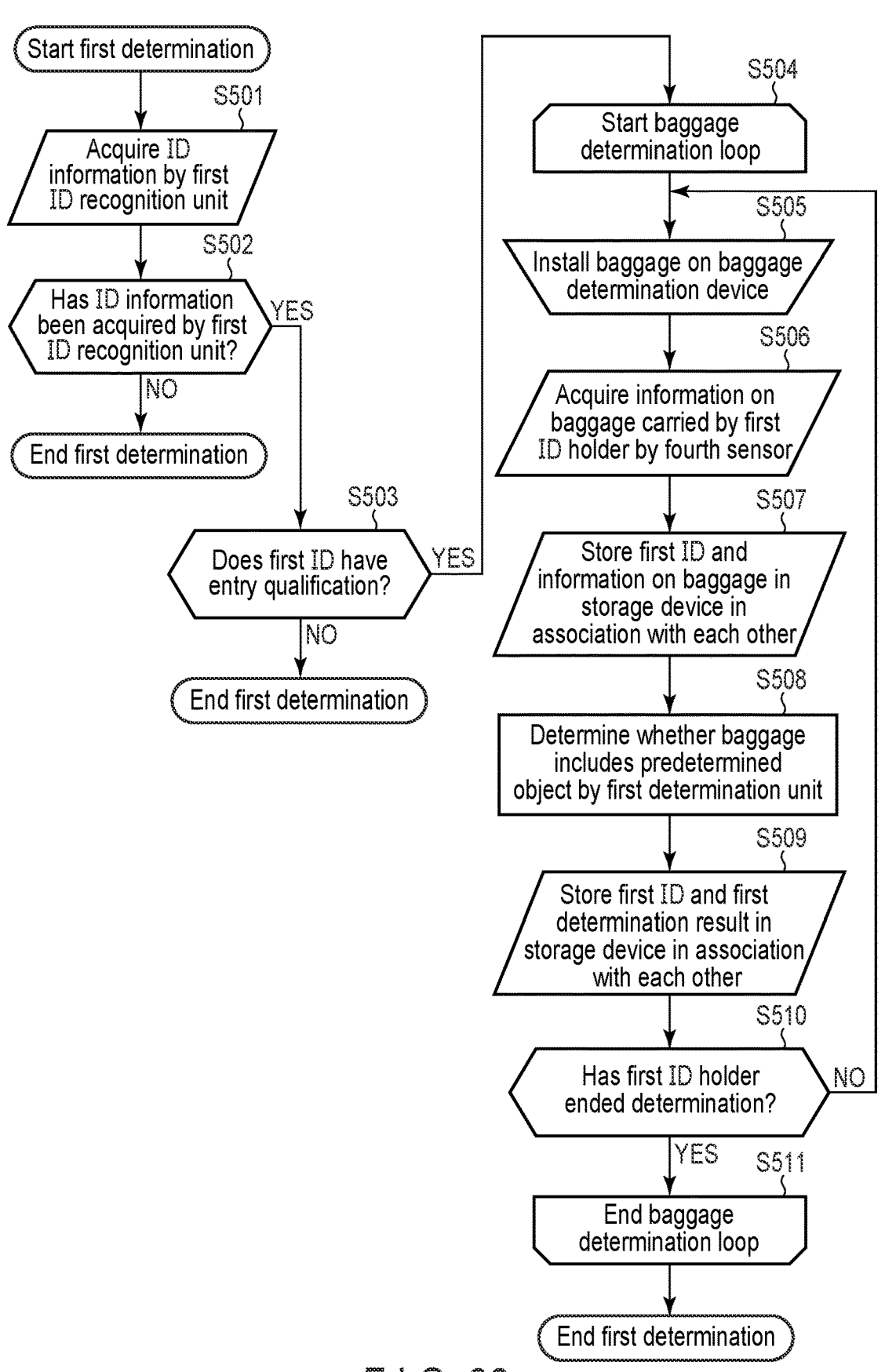
F I G. 26

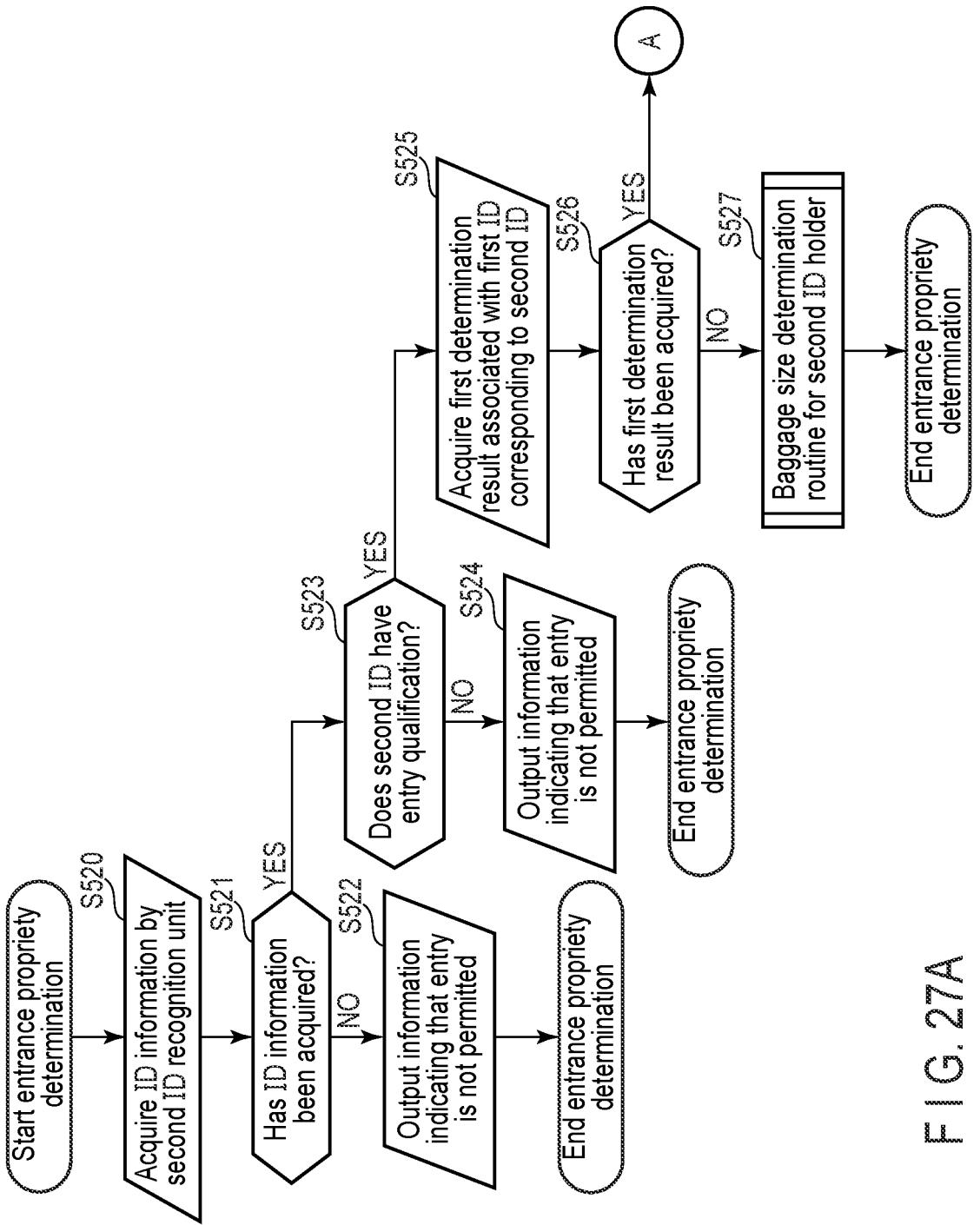
F I G. 27A

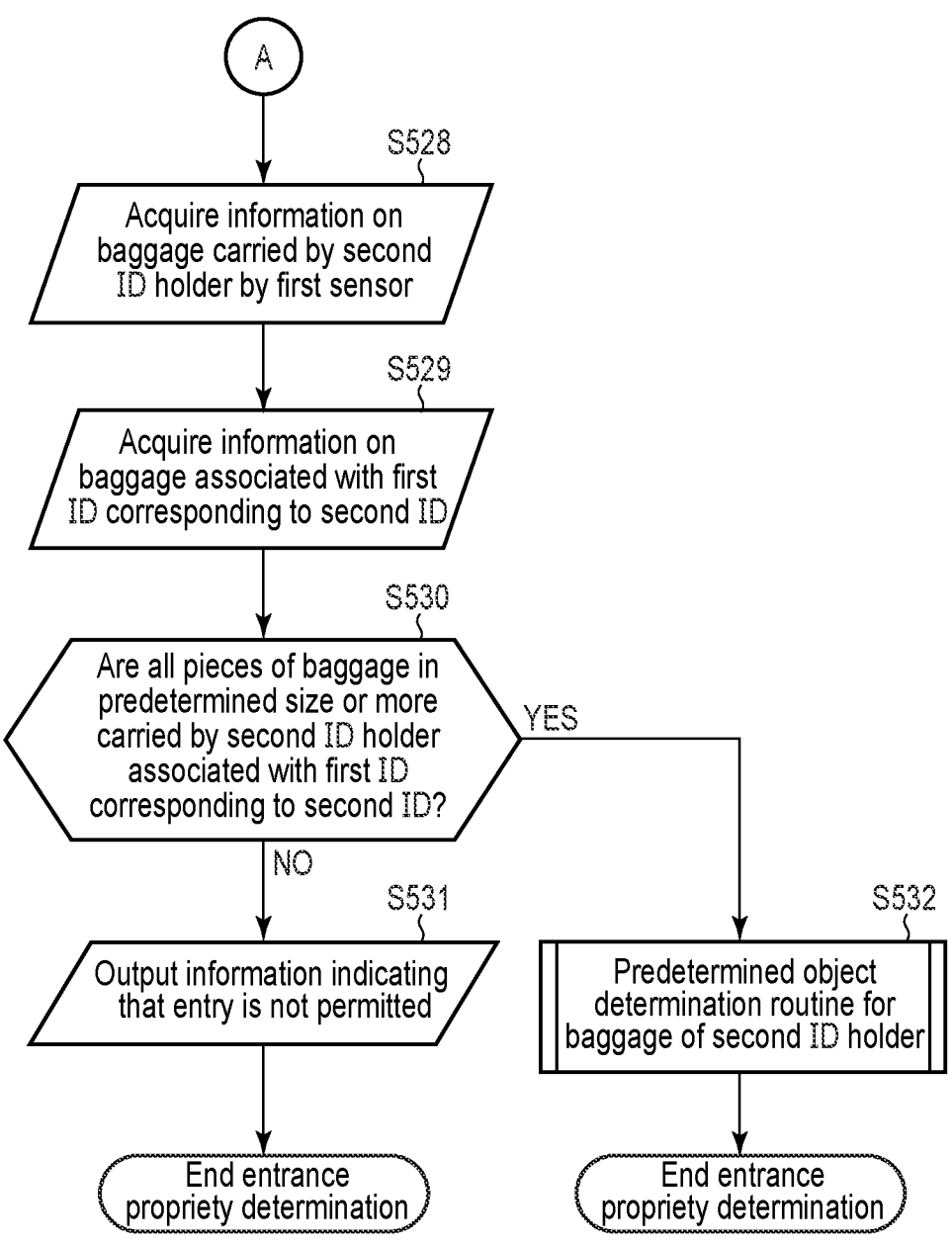
F I G. 27B

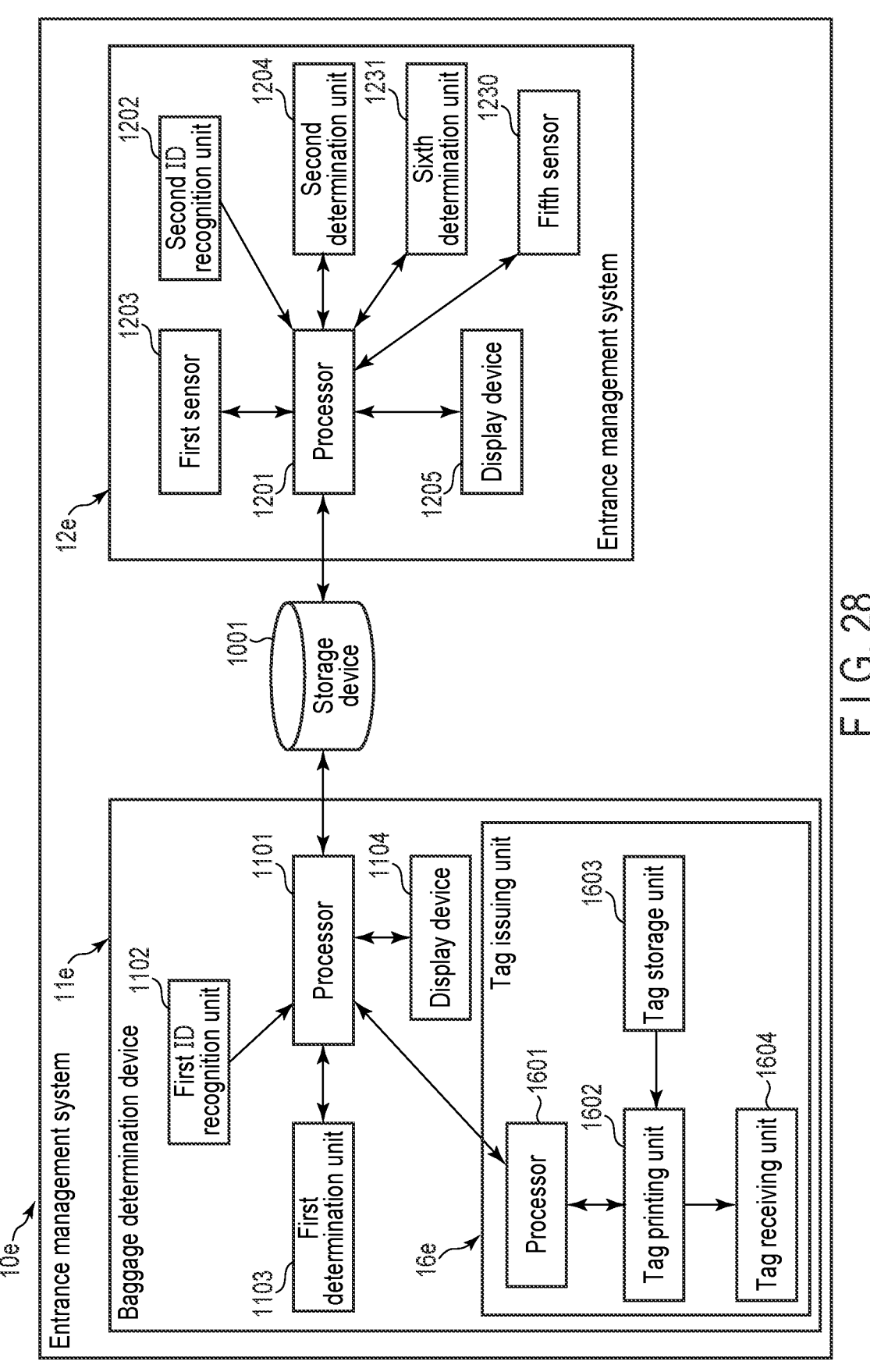
F I G. 28

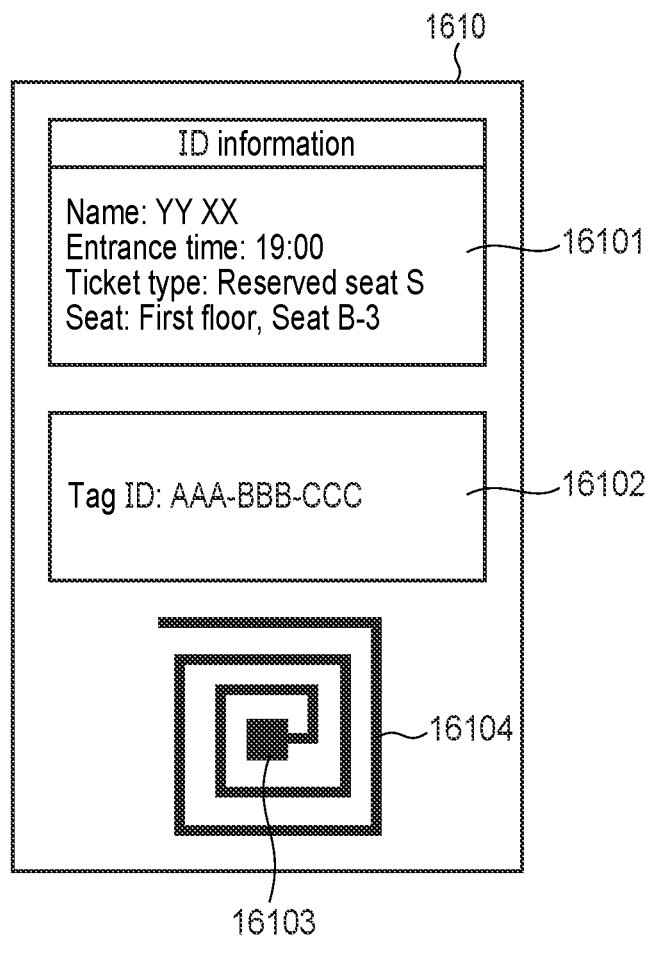
F I G. 30

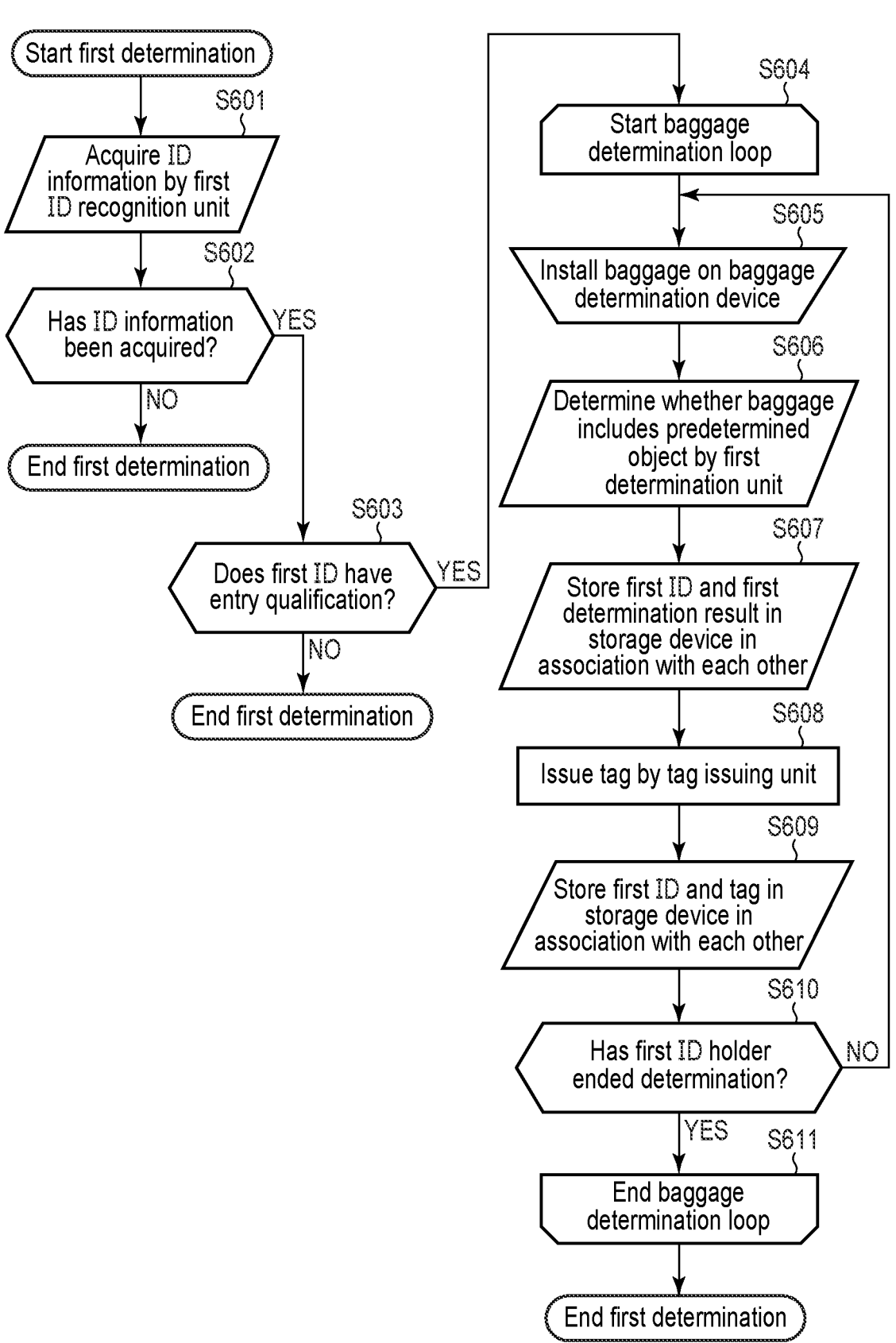
F I G. 31

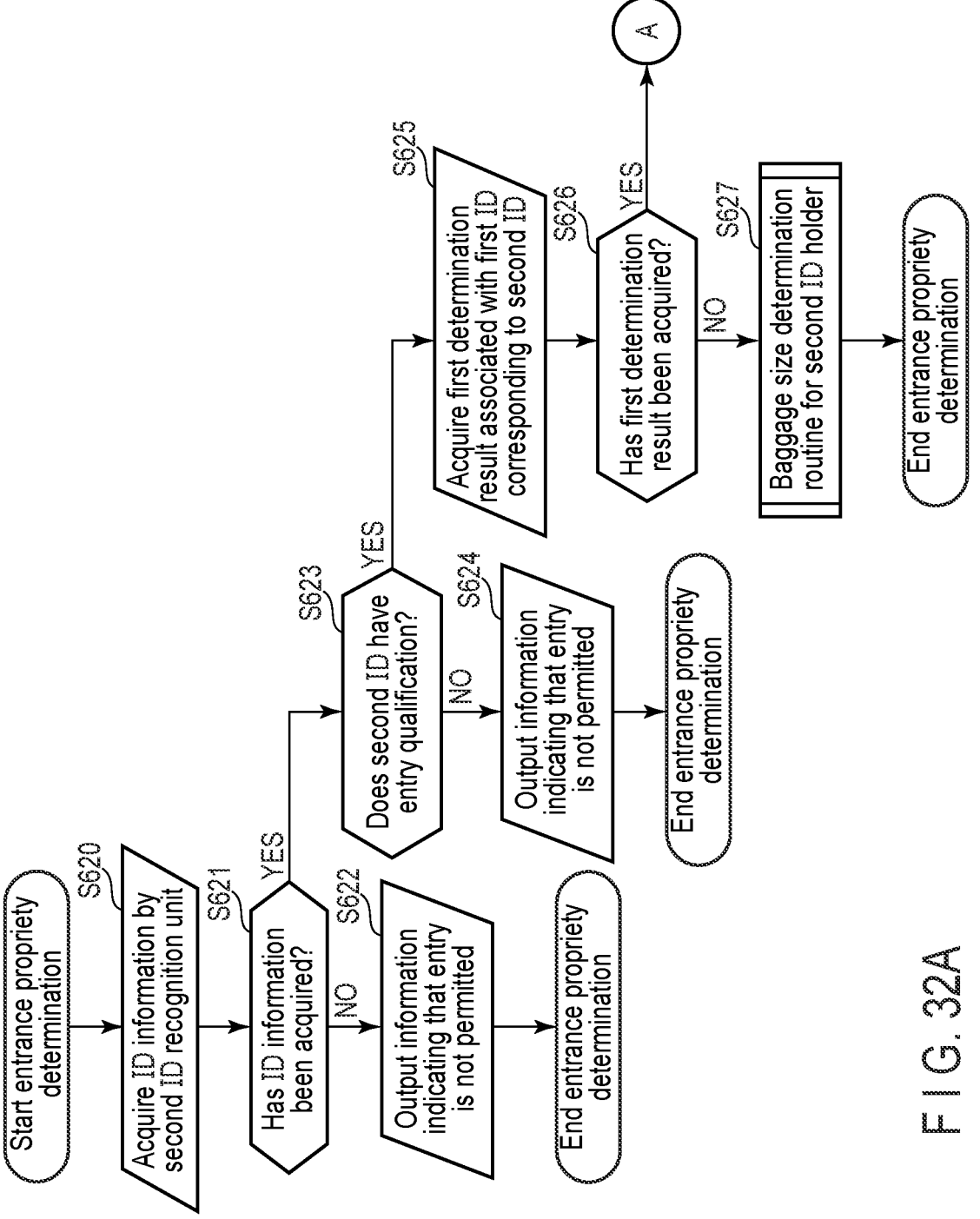
F I G. 32A

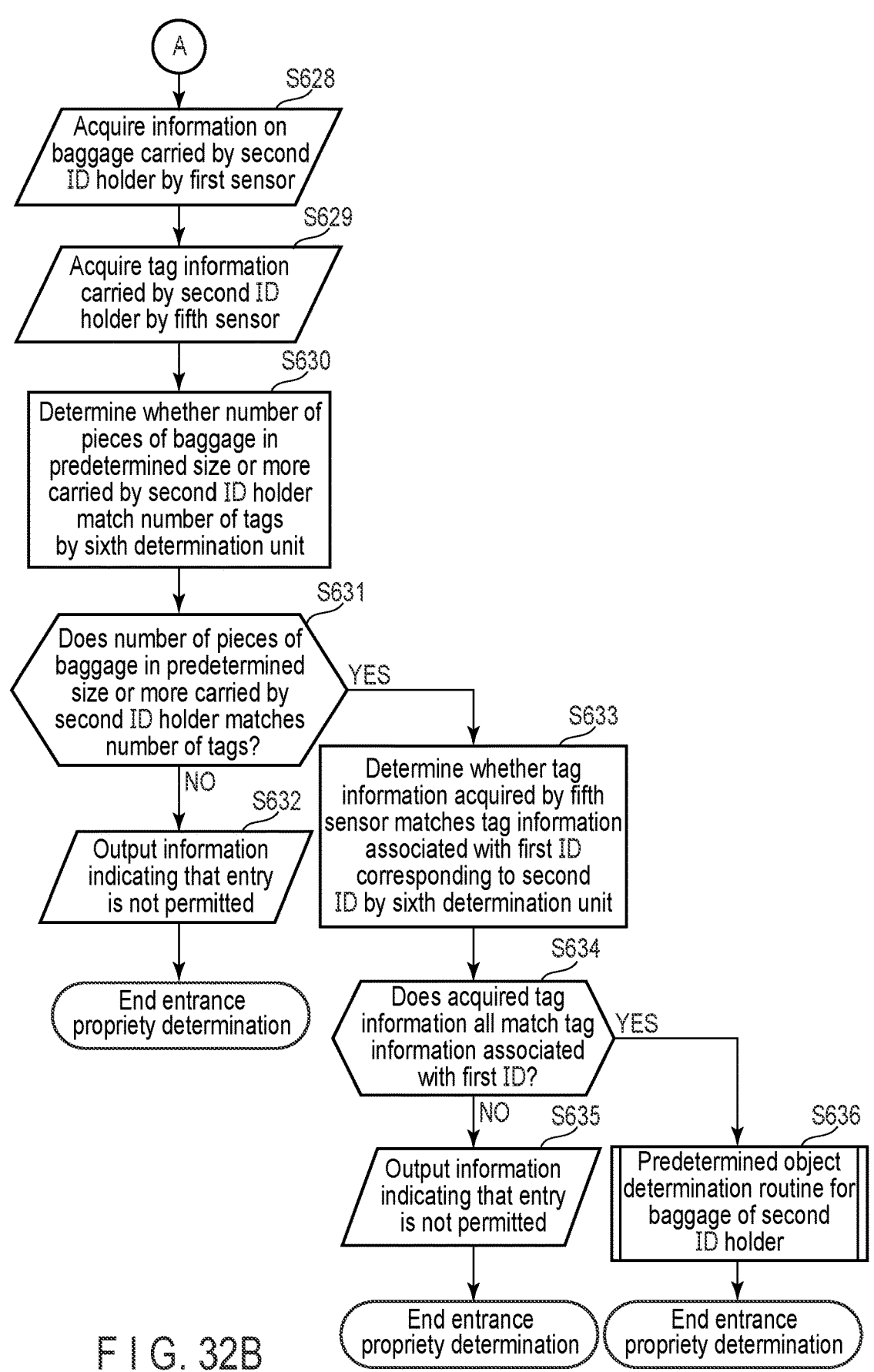
F I G. 32B

ENTRANCE MANAGEMENT SYSTEM AND ENTRANCE MANAGEMENT CONTROL DEVICE

CROSS-REFERENCE TO RELATED APPLICATIONS

This application is based upon and claims the benefit of priority from Japanese Patent Application No. 2023-108990, filed Jul. 3, 2023, the entire contents of which are incorporated herein by reference.

FIELD

Embodiments described herein relate generally to an entrance management system and an entrance management control device.

BACKGROUND

In public transportation, event halls, government offices, and the like, baggage inspection of visitors is performed. In order to improve the inspection throughput, an inspection system using a smart lane in which a plurality of persons can simultaneously prepare for baggage inspection is known. A space for a plurality of persons to prepare for baggage inspection is provided in one inspection lane, and baggage inspection is performed by sequentially placing baggage on the inspection lane from a person who has completed the inspection preparation. A visitor who has passed the baggage inspection can enter, and an additional inspection is appropriately performed on a visitor who has failed. Such a configuration enables a reduction in the number of operators necessary for per visitor for the inspection system, leading to labor-saving.

Here, when the visitor himself or herself is allowed to perform baggage inspection, there is a possibility that the visitor may improperly enter without proper inspection. As a method of preventing a visitor from improperly entering, an anti-crime support system that supports anti-theft in a retail store such as a bookstore is known (see, for example, Patent Literature 1: JP 2005-347905 A). In Patent Literature 1, it is determined whether or not a person taken by a camera possesses an object to be stolen, and a guard is notified of the person possessing the object to be stolen, and thus the theft of a product is prevented.

When an entrance management system that determines the necessity of baggage inspection for a visitor based on the presence or absence of baggage is configured, baggage inspection is mandatory even for small baggage such as a mobile phone, a wallet, food and drink, and a writing instrument, for example, and there is a possibility that the inspection throughput decreases due to an increase in the number of visitors. There is a possibility that a dangerous article or a carry-in prohibited article is brought in by receiving a piece of uninspected baggage or a dangerous article from a third party after inspection, receiving an ID from a third party, or the like.

BRIEF DESCRIPTION OF THE DRAWINGS

FIG. 1 is a diagram showing a schematic configuration of an entrance management system according to a first embodiment.

FIG. 2 is a plan view schematically showing an example of an inspection system to which the entrance management system according to the first embodiment is applied.

FIG. 3A is a schematic plan view of a first example of a display device according to the first embodiment.

FIG. 3B is a schematic plan view of a second example of the display device according to the first embodiment.

FIG. 3C is a schematic plan view of a third example of the display device according to the first embodiment.

FIG. 3D is a schematic plan view of a fourth example of the display device according to the first embodiment.

FIG. 3E is a schematic plan view of a fifth example of the display device according to the first embodiment.

FIG. 3F is a schematic plan view of a sixth example of the display device according to the first embodiment.

FIG. 4A is a schematic plan view showing a first example of a baggage determination device according to the first embodiment.

FIG. 4B is a schematic plan view showing a second example of the baggage determination device according to the first embodiment.

FIG. 5 is a flowchart of a first determination routine that determines whether a predetermined object is included in baggage carried by a first ID holder by the baggage determination device according to the first embodiment.

FIG. 6 is a flowchart of an entrance propriety determination routine that determines whether a second ID holder can enter by the entrance management device according to the first embodiment.

FIG. 7 is a flowchart of a second determination subroutine by the entrance management device according to the first embodiment for determining whether or not a baggage carried by a second ID holder is a predetermined size or more.

FIG. 10A is a schematic plan view of a first example of a display device according to a second embodiment.

FIG. 10B is a schematic plan view of a second example of the display device according to the second embodiment.

FIG. 10C is a schematic plan view of a third example of the display device according to the second embodiment.

FIG. 10D is a schematic plan view of a fourth example of the display device according to the second embodiment.

FIG. 10E is a schematic plan view of a fifth example of the display device according to the second embodiment.

FIG. 10F is a schematic plan view of a sixth example of the display device according to the second embodiment.

FIG. 11 is a flowchart of a baggage size determination routine in a passage unit that determines a size of baggage carried by a passerby of the passage unit by the passage unit according to the second embodiment.

FIG. 12 is a plan view schematically showing an inspection system to which an entrance management system according to a third embodiment is applied.

FIG. 14 is a flowchart of a first determination routine in the inspection system according to the third embodiment.

FIG. 15B is a second flowchart of an entrance propriety determination routine that determines whether or not the second ID holder can enter by the entrance management device in the inspection system according to the third embodiment.

FIG. 16 is a flowchart of a carrying determination routine of a predetermined object in a second entrance section that determines whether or not a user of a body determination device included in the second entrance section according to the third embodiment carries a predetermined object.

FIG. 17 is a flowchart of a gate open/close routine that opens and closes an open/close unit of a gate device included in a second entrance section according to a third embodiment.

FIG. 18 is a diagram showing a schematic configuration of an entrance management system according to a fourth embodiment.

FIG. 19 is a plan view schematically showing an inspection system to which an entrance management system according to a fourth embodiment is applied.

FIG. 20A is a schematic plan view of a first example of a display device according to the fourth embodiment.

FIG. 20B is a schematic plan view of a second example of the display device according to the fourth embodiment.

FIG. 21A is a first flowchart of a first determination routine in the entrance management system according to the fourth embodiment.

FIG. 21B is a second flowchart of the first determination routine in the entrance management system according to the fourth embodiment.

FIG. 22 is a flowchart of a fourth determination routine in the entrance management system according to the fourth embodiment.

FIG. 23A is a first flowchart of an entrance propriety determination routine in an entrance management system according to a fourth embodiment.

FIG. 23B is a second flowchart of the entrance propriety determination routine in the entrance management system according to the fourth embodiment.

FIG. 24 is a diagram showing a schematic configuration of an entrance management system according to a fifth embodiment.

FIG. 25 is a plan view schematically showing an inspection system to which an entrance management system according to the fifth embodiment is applied.

FIG. 26 is a flowchart of a first determination routine in the entrance management system according to the fifth embodiment.

FIG. 27A is a first flowchart of an entrance propriety determination routine in the entrance management system according to a fifth embodiment.

FIG. 27B is a second flowchart of the entrance propriety determination routine in the entrance management system according to the fifth embodiment.

FIG. 28 is a diagram showing a schematic configuration of an entrance management system according to a sixth embodiment.

FIG. 30 is a plan view schematically showing an example of a tag issued by a tag issuing unit of the entrance management system according to the sixth embodiment.

FIG. 31 is a flowchart of a first determination routine in the entrance management system according to the sixth embodiment.

FIG. 32A is a first flowchart of an entrance propriety determination routine in the entrance management system according to the sixth embodiment.

FIG. 32B is a second flowchart of an entrance propriety determination routine in the entrance management system according to the sixth embodiment.

DETAILED DESCRIPTION

Figure 3G:
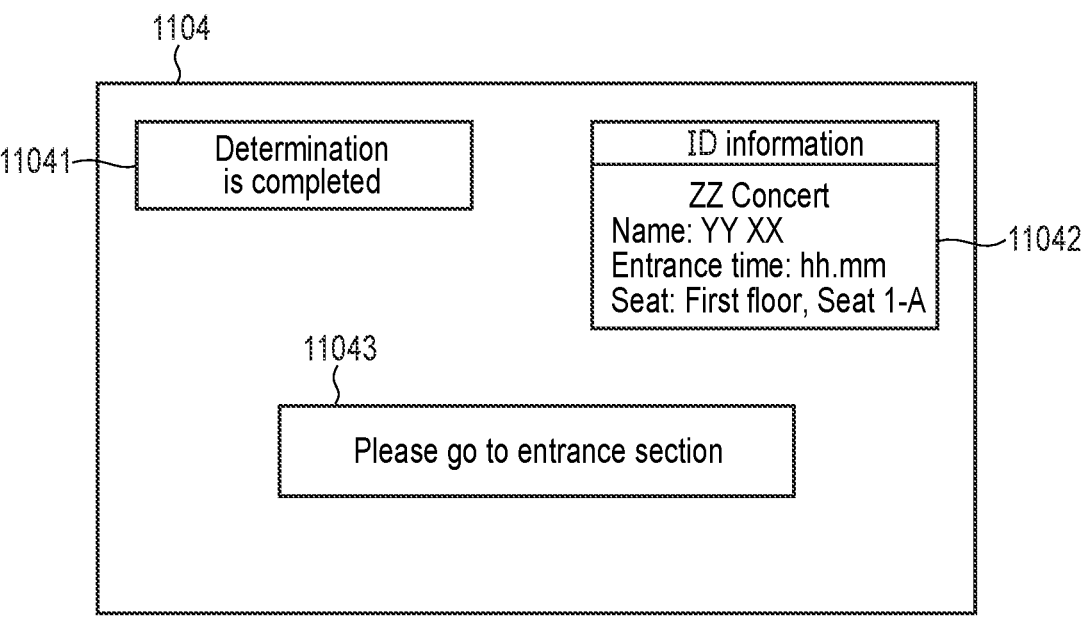
FIG. 3G is a schematic plan view of a seventh example of the display device according to the first embodiment.

In general, according to one embodiment, an entrance management system includes a baggage determination device, a storage device, and an entrance management device. The baggage determination device includes a first recognition unit and a first determination unit. The first recognition unit acquires identification information of a visitor. The first determination unit determines whether or not a predetermined object is included in baggage of the visitor. The storage device stores first identification information acquired by the first recognition unit and a first determination result of the first determination unit in association with each other. The entrance management device includes a first sensor, a second recognition unit, a second determination unit, and a processor. The first sensor detects information including a size of the baggage. The second recognition unit acquires identification information of the visitor. The second determination unit determines whether or not the baggage has a predetermined size or more based on the information detected by the first sensor. The processor acquires, from the storage device, the first determination result associated with the first identification information corresponding to the second identification information acquired by the second recognition unit. The processor determines whether or not the visitor is permitted to enter based on the first determination result and a second determination result of the second determination unit, and outputs information indicating that the visitor is permitted to enter or the visitor is not permitted to enter.

In the following, embodiments will be described with reference to the drawings. In the following description, an X axis, a Y axis, and a Z axis represent axes orthogonal to each other, and a +X axis direction, a +Y axis direction, and a +Z axis direction represent positive directions parallel to the X axis, the Y axis, and the Z axis, respectively. A −X axis direction, a −Y axis direction, and a −Z axis direction represent negative directions parallel to the X axis, the Y axis, and the Z axis, respectively. When simply referred to as the X axis direction, the Y axis direction, and the Z axis direction, both directions of + and − are included along the X axis, the Y axis, and the Z axis, respectively.

As described above, when the entrance management system that determines the necessity of baggage inspection for the visitor based on the presence or absence of baggage is configured, for example, baggage inspection is necessary even for small baggage such as a mobile phone, a wallet, food and drink, and a writing instrument, and there is a possibility that the inspection throughput decreases due to an increase in the number of visitors. There is a possibility that a dangerous article or a carry-in prohibited article is brought in by receiving a piece of uninspected baggage or a dangerous article from a third party after inspection, receiving an ID from a third party, or the like.

For example, in the case of an explosive or the like, the risk is substantially proportional to the size of the explosive. In addition, in smuggling of prohibited articles such as drugs, precious metals, jewelry, and the like, the amount of damage is generally proportional to the size of the smuggled articles to be brought. Therefore, depending on the inspection target and the inspection purpose, the inspection may be unnecessary for the baggage smaller than the predetermined size. When an entrance management system that determines necessary inspection according to the size of baggage carried by a visitor is configured, for example, the entrance management system makes it mandatory for the visitor carrying baggage with a large size to perform baggage inspection, and allows the visitor carrying only baggage with a small size to enter without performing the inspection, and thus it is possible to improve the inspection throughput.

In addition, when there is a plurality of baggage inspection devices having different upper limit sizes that can be inspected, it is possible to improve the inspection efficiency by determining which baggage has to be used according to the size of the baggage and displaying the relevant baggage inspection device to the user. In addition, it is also possible to improve the inspection efficiency by determination, the display, and the like of an appropriate inspection process according to the size of the baggage, such as determining the baggage exceeding the size that can be inspected by the baggage inspection device and guiding the owner to receive a visual inspection.

In addition, when the inspection system is configured in which, for example, even a visitor who possesses only baggage in a small size has to be subjected to high-through-put walk-through type body inspection, it is possible to prevent the belongings of the visitor from not being inspected without reducing the inspection throughput. In addition, by appropriately acquiring the number of pieces of baggage in a predetermined size or more possessed by the visitor after baggage inspection, it is also possible to detect that uninspected baggage or dangerous articles are received from a third party after baggage inspection.

Based on the above, the present embodiment presents an entrance management system capable of achieving both preventing a visitor from improperly entering and improving an inspection throughput.

First Embodiment

First, a first embodiment will be described.

FIG. 1 is a diagram showing a schematic configuration of an entrance management system 10 according to a first embodiment.

The entrance management system 10 includes, for example, a baggage determination device 11, an entrance management device 12, and a storage device 1001.

The storage device 1001 may be, for example, a main the storage device such as a semiconductor memory or an auxiliary storage device such as a hard disk drive (HDD) or a solid state drive (SDD). Alternatively, a cloud storage accessible via the Internet may be used. The storage device may be installed inside an inspection system 300 described later with reference to FIG. 2 using the entrance management system 10, or may be a server or a cloud storage installed outside the inspection system 300. The storage device 1001 has a function of storing information input from the outside in a wired or wireless manner and outputting the stored information to the outside. In addition, the storage device 1001 may have a function of constructing a database in which stored information is associated with each other and organized. In the first embodiment, the storage device 1001 is a server installed outside the inspection system 300.

The baggage determination device 11 determines whether a predetermined object defined by a manufacturer, a manager, or the like is included in the baggage. The predetermined object may be, for example, an explosive, a drug, a firearm, a cutlery, a noble metal, or the like. The predetermined object is not limited to a solid, and may be a liquid or a gas. In addition, a container or the like capable of storing a predetermined object may be included in the predetermined object.

The baggage determination device 11 includes, for example, a processor 1101, a first ID recognition unit 1102, a first determination unit 1103, and a display device 1104.

The processor 1101 is, for example, an electronic circuit such as an integrated circuit (IC). Alternatively, the processor 1101 is an integrated circuit such as a central processing unit (CPU), a graphics processing unit (GPU), a field-programmable gate array (FPGA), or a microcontroller. Alternatively, the processor 1101 may be a computer such as a server incorporating a CPU or a GPU. The processor 1101 processes, for example, information input from the first ID recognition unit 1102, the first determination unit 1103, or the display device 1104, and outputs the processed information to the storage device 1001, the first determination unit 1103, or the display device 1104.

The processor 1101 may be hardware incorporated in the first determination unit 1103, or may be hardware installed outside the first determination unit 1103 and connected to the first ID recognition unit 1102, the first determination unit 1103, the display device 1104, or the storage device 1001 in a wired or wireless manner. For example, the processor 1101 may be a server capable of inputting and outputting processing information via the Internet.

One processor 1101 may be configured to be able to input information from a plurality of first ID recognition units 1102, a plurality of first determination units 1103, and a plurality of display devices 1104. Furthermore, one processor 1101 may be configured to be able to output information to the plurality of first determination units 1103 and the plurality of display devices 1104.

The first ID recognition unit 1102 includes, for example, a sensor that acquires ID information possessed by a user of the baggage determination device 11. For example, the first ID recognition unit 1102 may include a magnetic sensor that recognizes a magnetic ticket, or may include an optical sensor that recognizes an IC ticket, a one-dimensional barcode, a two-dimensional barcode, or the like. Alternatively, the first ID recognition unit 1102 may include a sensor that recognizes biological information. For example, an image of a face, a fingerprint, a retina, or the like of the user of the baggage determination device 11 may be acquired by an optical sensor included in the first ID recognition unit 1102, and the processor 1101 may perform biometric authentication by collating the acquired biometric information with biometric information stored in advance in the storage device 1001. Further, the biological information acquired by the first ID recognition unit 1102 may be used as the first ID. In addition, the first ID recognition unit 1102 may include an electronic circuit that controls a sensor included in the first ID recognition unit 1102 and an electronic circuit that processes acquired information.

The first determination unit 1103 includes, for example, an inspection device that irradiates a baggage with an electromagnetic wave such as an X-ray, a terahertz wave, or a millimeter wave to capture an image, and determines whether or not a predetermined object is included in the baggage. Alternatively, the first determination unit 1103 may include a metal detector that determines whether a predetermined object is included in the baggage by electromagnetic induction. Alternatively, the first determination unit 1103 may include a liquid inspection device utilizing the fact that the transmitted light spectrum of the liquid differs depending on the type. Alternatively, the first determination unit 1103 may include a trace detection device that flies fine particles attached to the baggage by air flow or the like and detects drugs, explosives, or the like from the fine particles.

The display device 1104 may include, for example, a display that displays input information. Furthermore, the display device 1104 may include a speaker that transmits input information by voice. The display device 1104 displays, for example, a method of using the baggage determination device 11 and a first determination result by the first determination unit 1103 for the user of the baggage determination device 11.

Furthermore, the display device 1104 may be, for example, a touch panel having a touch sensor. In this case, the user of the baggage determination device 11 can operate the baggage determination device 11 by touching the display device 1104 with a fingertip or an input stylus pen.

Figure 3H:
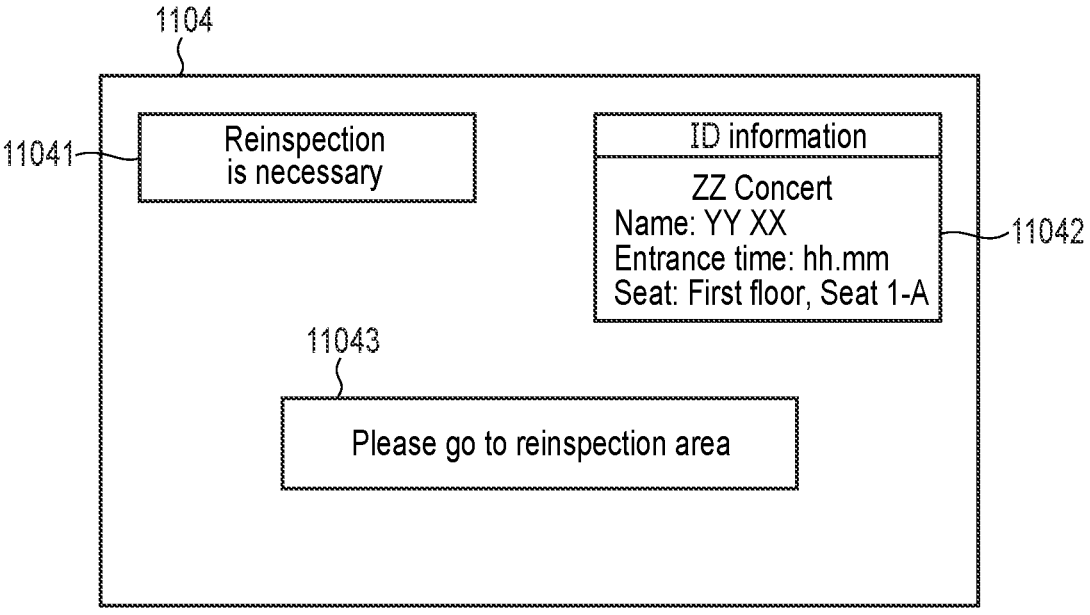
FIG. 3H is a schematic plan view of an eighth example of the display device according to the first embodiment.

The display device 1104 may display a message urging the user of the baggage determination device 11 to perform the ID authentication using the first ID recognition unit 1102, for example, as a display content 11041 and a display content 11043 shown in FIG. 3A. As shown in FIG. 3B, the display device 1104 may display the completion of the ID authentication in the first ID recognition unit 1102. At this time, the display device 1104 may display information corresponding to the ID recognized by the first ID recognition unit 1102, such as the display content 11042. The display content 11042 may be, for example, a name, an age, a gender, or the like associated in advance with the ID recognized by the first ID recognition unit 1102. Furthermore, for example, in the case of inspecting a visitor of a movie theater, a concert venue, or the like, or a passenger of a train or a bus, the display content 11042 may be a seat, an entry possible time, a destination of the train or the bus, or the like associated in advance with the ID. The display content 11042 is not limited to text, and may be, for example, an image such as a face photograph of the first ID holder associated with the first ID. Furthermore, as shown in FIG. 3C, the display device 1104 may include, for example, a camera 11046. When the first ID recognition unit 1102 recognizes the ID based on the face authentication, the display device 1104 may include the camera 11046, and an image of a user P1 of the baggage determination device 11 captured by the camera 11046 may be displayed in the display content 11044. The display device 1104 may instruct the user P1 to put the face of the user P1 into a frame including display contents 11045a, 11045b, 11045c, and 11045d in order to improve the accuracy of face authentication by the first ID recognition unit 1102. As shown in FIG. 3D, the display device 1104 may display the completion of the ID authentication to the user P1. As shown in FIG. 3E, the display device 1104 may instruct the user to install the baggage of the user to the baggage determination device 11. In addition, when the display device 1104 is a touch panel having a touch sensor, as shown in FIG. 3F, the entrance management system 10 may be configured such that the user can operate the baggage determination device 11 on the display device 1104 such as the start, interruption, and end of baggage determination. In addition, as shown in FIGS. 3G and 3H, the display device 1104 may instruct the user whose baggage determination has been completed to perform the action after the end. For example, the display device 1104 may urge a visitor whose baggage is determined not to include a predetermined object in the baggage to proceed to an entrance section, and may urge a visitor whose baggage is determined to include a predetermined object to proceed to a reinspection area.

For example, as shown in FIG. 4A, the baggage determination device 11 may include a conveyor 1105, an open/close door 1106, and a baggage storage area 1107.

The baggage determination device 11 may determine whether a predetermined object is included in the baggage by placing the baggage on the conveyor 1105 and conveying the baggage to the first determination unit 1103. The user of the baggage determination device 11 places the baggage on the −Y axis side of the conveyor 1105. The conveyor 1105 conveys the baggage to the first determination unit 1103 located on the +Y axis side as viewed from the user. The baggage for which the determination by the first determination unit has been completed is conveyed in the −Y axis direction, and the user collects the baggage for which the determination by the first determination unit has been completed.

In addition, for example, when the first determination unit 1103 includes an X-ray inspection device, when X-rays are emitted from the first determination unit 1103 to the outside, surrounding persons may be exposed. When the open/close door 1106 includes a material capable of shielding radiation, such as lead, for example, exposure of surrounding persons can be prevented by closing the open/close door 1106 during the determination processing of the first determination unit. In addition, in the case in which the baggage determination device 11 includes the baggage storage area 1107, the user of the baggage determination device 11 places the baggage in the baggage storage area 1107, and thus preparation for inspecting a plurality of pieces of baggage and operation of the baggage determination device 11 is facilitated.

In addition, for example, as shown in FIG. 4B, the baggage determination device 11 may include a first conveyor 1105a and a second conveyor 1105b. The user of the baggage determination device 11 first places the baggage on the −Y axis side of the first conveyor 1105a. The baggage is conveyed by the conveyor 1105a to the first determination unit 1103 located in the +Y axis direction as viewed from the user, and it is determined whether the predetermined object is included in the baggage. The baggage for which the determination by the first determination unit has been completed is conveyed along an axis in a counterclockwise direction of 135° as viewed from the +X axis by the second conveyor 1105b, then conveyed in the −Y axis direction, and conveyed to the baggage storage area 1108. In the configuration of FIG. 4A, it is necessary for the user of the baggage determination device 11 to move the baggage determined by the first determination unit 1103 to the baggage storage area 1107. In the configuration of FIG. 4B, a plurality of pieces of baggage is continuously determined by the first determination unit 1103, and the pieces of baggage determined can be sequentially conveyed to the baggage storage area 1108 and collectively received after the baggage determination. In this manner, it is possible to cause the first determination unit to determine a plurality of pieces of baggage without necessity of the user to move the baggage for which determination by the first determination unit has been completed to the baggage storage area 1107, and it is possible to improve the inspection throughput.

The entrance management device 12 includes, for example, a processor 1201, a second ID recognition unit 1202, a first sensor 1203, a second determination unit 1204, and a display device 1205.

The processor 1201 is, for example, an electronic circuit such as an integrated circuit (IC). Alternatively, the processor 1201 is an integrated circuit such as a central processing unit (CPU), a field-programmable gate array (FPGA), or a microcontroller. Alternatively, the processor 1201 may be a computer such as a server incorporating a CPU or a GPU. The processor 1201 processes, for example, information input from the second ID recognition unit 1202, the second determination unit 1204, or the display device 1205, and outputs the processed information to the storage device 1001, the second determination unit 1204, or the display device 1205.

The processor 1201 may be hardware incorporated in the second determination unit 1204, or may be hardware installed outside the second determination unit 1204 and connected to the second ID recognition unit 1202, the first sensor 1203, the second determination unit 1204, the display device 1205, or the storage device 1001 in a wired or wireless manner. For example, the processor 1201 may be a server capable of inputting and outputting processing information via the Internet.

One processor 1201 may be configured to be able to input information from a plurality of second ID recognition units 1202, a plurality of first sensors 1203, a plurality of second determination units 1204, and a plurality of display devices 1205. Furthermore, one processor 1201 may be configured to be able to output information to the plurality of first sensors 1203, the plurality of second determination units 1204, and the plurality of display devices 1205.

The second ID recognition unit 1202 may be similar to the first ID recognition unit 1102. That is, the second ID may be the same as the first ID, and the second ID recognition unit 1202 may acquire the same information as the first ID recognition unit 1102. The second ID recognition unit 1202 includes, for example, a sensor that acquires ID information possessed by a user of the entrance management device 12. Further, the biological information acquired by the second ID recognition unit 1202 may be used as the second ID. In addition, the second ID recognition unit 1202 may include an electronic circuit that controls a sensor included in the second ID recognition unit 1202 and an electronic circuit that processes acquired information.

The first sensor 1203 may be, for example, a camera that captures an image of visible light or infrared light. Alternatively, the first sensor 1203 may be a sensor that applies a laser beam to an object and acquires a shape of the object or a distance between the object and the sensor based on information of the reflected light, like a light detection and ranging (LiDAR). Alternatively, the first sensor 1203 may be a sensor referred to as a time-of-flight (ToF) sensor that acquires depth information of an object from a time until irradiation light applied to the object is reflected and returned. Alternatively, the first sensor 1203 may be a 3D sensor that measures the three-dimensional shape of the object.

The entrance management device 12 may include a plurality of first sensors 1203. For example, there may be one first sensor that senses the visitor for both before and after the visitor as viewed from the traveling direction, or the visitor may be sensed from above by the first sensor installed on the ceiling or the like. By arranging the plurality of first sensors in this manner, it is possible to reduce the possibility that the detection of the baggage carried by the visitor is not enabled by hiding behind the visitor. Furthermore, the first sensor 1203 may be configured in which a plurality of types of sensors different from each other is combined, such as a camera and a LiDAR, a camera and a 3D sensor, and the like.

The second determination unit 1204 determines whether the visitor has baggage in a predetermined size or more based on the information acquired by the first sensor 1203. The second determination unit 1204 is, for example, an integrated circuit such as a CPU, a GPU, an FPGA, or a microcontroller. Alternatively, the second determination unit 1204 may be a computer such as a server incorporating a CPU, a GPU, and the like. The second determination unit 1204 includes a program executed by an integrated circuit such as the CPU described above. Note that the predetermined size may be changeable by external input or the like.

The second determination unit 1204 determines whether the visitor possesses baggage in a predetermined size or more determined by a manufacturer, a manager, or the like of the entrance management system 10. The predetermined size of the baggage is defined by, for example, the three-dimensional volume, the expected area of the baggage, or the length of the longest side of the outer shape of the baggage. The predetermined size of the baggage may be set by appropriately combining the plurality of definitions described above. When the predetermined size is defined as an expected area or a three-dimensional volume, there is a possibility that a rod-shaped object such as a sword or a firearm fails to be detected as baggage in a predetermined size or more. In addition, for example, when the first sensor is a camera, it is difficult to determine the three-dimensional volume of the baggage from the two-dimensional image of the baggage depending on the arrangement of the camera. In such a case, it is preferable to determine the size of the baggage by the expected area of the baggage in the image captured by the first sensor or the length of the longest side of the outer shape of the baggage.

When the first sensor 1203 is constituted of a camera, for example, an index whose position and size are known is installed in the imaging range of the first sensor, and the size of the baggage carried by the visitor can be determined by comparing the size of the index with the size of the baggage carried by the visitor based on the image captured by the first sensor. Alternatively, for example, training data including an image of a person carrying a piece of baggage whose size is known may be prepared, and artificial intelligence for estimating the size of the piece of baggage carried by the person may be generated by a machine learning technique and incorporated into the second determination unit 1204. With this configuration, the second determination unit 1204 can determine the size of the baggage carried by the visitor from the image captured by the first sensor 1203.

In addition, when the first sensor 1203 includes a plurality of cameras, it is easy to capture the baggage from a plurality of directions and determine the three-dimensional size of the baggage. The first sensor 1203 may use, for example, a camera that is referred to as a stereo camera or a 3D camera, in which two cameras are arranged in parallel, and a three-dimensional image of an imaging target can be acquired using parallax between the cameras.

Alternatively, for example, in the case in which the first sensor 1203 includes cameras installed before and after a person and cameras installed above and below the person, images captured by a plurality of cameras are processed by the processor 1201, and thus a three-dimensional image of the baggage can be captured. When the plurality of cameras is disposed apart from each other in this manner, it is possible to reduce the possibility that the baggage of the visitor is hidden behind the body of the visitor and fails to be detected. A plurality of LiDAR sensors and a plurality of ToF sensors are similarly disposed apart from each other, and thus it is possible to reduce the possibility that the baggage of the visitor is hidden behind the body of the visitor and fails to be detected.

For example, when a LiDAR sensor or a ToF sensor is used, it is possible to acquire a three-dimensional shape of a target, and thus it is possible to determine the size of baggage carried by a visitor. For example, in the case in which the first sensor 1203 includes a camera and a LiDAR sensor, the second determination unit 1204 can determine the size of the baggage owned by the visitor from the image of the visitor acquired by the camera and combine the baggage with the three-dimensional shape information acquired by the LiDAR sensor.

The display device 1205 may include, for example, a display that displays input information. Furthermore, the display device 1205 may include a speaker that transmits input information by voice. Furthermore, the display device 1205 may be, for example, a touch panel having a touch sensor. In this case, the user of the entrance management device 12 can operate entrance management device 12 by touching display device 1205 with a fingertip or an input stylus pen.

The display device 1205 displays, for example, ID information of a visitor and a first determination result or a second determination result associated with the ID to a manager of the inspection system or a person in charge of inspection. By using the display device 1205, the person in charge of inspection specifies a visitor whose baggage is determined to include a predetermined object by the first determination unit, and it is easy to call out, track, monitor using a monitoring camera, and the like. In addition, it is easy to identify a visitor who is determined to have baggage in a predetermined size or more by the second determination unit, call out, and guide the visitor to the baggage determination device 11, and the like.

FIG. 2 is a plan view schematically showing an example of an inspection system 300.

The inspection system 300 includes, for example, baggage determination devices 11a, 12a, and 13a, a first entrance section 304, second entrance sections 301a, 301b, and 301c, a waiting area 303, a reinspection area 305, and an entrance 306 of the reinspection area.

The entrance section 301a includes, for example, a second ID recognition unit 1202a and a first sensor 1203a. Similarly, the entrance section 301b includes, for example, a second ID recognition unit 1202b and a first sensor 1203b. Moreover, the entrance section 301c includes, for example, a second ID recognition unit 1202c and a first sensor 1203c.

The baggage determination device 11a includes, for example, a first ID recognition unit 1102a and a first determination unit 1103a. Similarly, the baggage determination device 11b includes, for example, a first ID recognition unit 1102b and a first determination unit 1103b. The baggage determination device 11c includes, for example, a first ID recognition unit 1102c and a first determination unit 1103c.

In the inspection system 300, the user of the inspection system 300 goes on the first entrance section 304 in the +X axis direction, and enters the inside of the inspection system 300. In the inspection system 300, the second entrance section 301c is located closer to the first entrance section 304 from the second entrance section 301a and the second entrance section 301b. When a user who does not carry baggage in a predetermined size or more enters from the second entrance section 301c, a moving distance necessary for the entry can be shortened. A user who does not carry baggage in a predetermined size or more may enter either the second entrance section 301a or the second entrance section 301b in the +X axis direction.

The user of the inspection system 300 may wait in order for baggage determination using any of the baggage determination devices 11a, 11b, and 11c in the waiting area 303. The user uses any one of the baggage determination devices 11a, 11b, and 11c to determine whether the carried baggage includes a predetermined object. The user who has completed the baggage determination goes and enters any one of the second entrance sections 301a, 301b, and 301c in the +X axis direction.

For example, when entering through the second entrance section 301a, the user of the inspection system 300 causes the second ID recognition unit 1202a to recognize the ID of the user. When the second ID recognition unit 1202a fails to recognize the ID, the processor 1201 outputs information indicating that entry is not permitted. In the case in which the second ID recognition unit 1202a can recognize the ID of the user, the processor 1201 acquires a first determination result associated with a first ID corresponding to a second ID from the storage device 1001 based on the recognized second ID. When the first determination result has been acquired, the processor 1201 outputs the entrance propriety information of a second ID holder based on the first determination result. When the first determination result fails to be acquired, the processor 1201 acquires the second determination result determined by the second determination unit 1204 based on the information acquired by the first sensor 1203a, and outputs the entrance propriety information of the second ID holder based on the second determination result. The second ID holder who has the output information indicating that the entry is not permitted accepts the reinspection in any one of the baggage determination devices 11a, 11b, and 11c or the reinspection area 305. Information on the second ID holder who passes the retest is stored in the storage device 1001, and the processor 1201 outputs information indicating that the second ID holder can enter when the second ID holder passes through any one of the second entrance sections 301a, 301b, and 301c.

Here, the operation of the entrance management system 10 when the second ID holder passes through the second entrance section 301a has been described. The same applies to the case in which the second ID holder passes through the second entrance section 301b or the second entrance section 301c and enters.

In the configuration of FIG. 2, the entrance management system 10 determines whether the second ID holder passing through the second entrance sections 301a, 301b, and 301c included in the inspection system 300 can enter, and outputs the entrance propriety information of the second ID holder.

A first determination routine of determining whether baggage includes a predetermined object by the baggage determination device 11 will be described with reference to a flowchart shown in FIG. 5.

The first ID recognition unit 1102 acquires information of the first ID possessed by the first ID holder (S101).

The processor 1101 determines whether the information of the first ID can be acquired (S102). In the case in which the first ID information fails to be acquired (S102: NO), the processor 1101 ends the first determination routine.

In the case in which the information of the first ID has been acquired (S102: YES), the processor 1101 determines whether the first ID has an entry qualification (S103). The fact that the ID has an entry qualification means that the ID is given an attribute indicating that the ID has an entry qualification. In the case in which the first ID has no entry qualification (S103: NO), the processor 1101 ends the first determination routine.

In the case in which the first ID has an entry qualification (S103: YES), the processor 1101 starts a baggage determination loop (S104). The first ID holder installs the baggage in the baggage determination device 11 (S105). The first determination unit 1103 determines whether the baggage installed in the baggage determination device 11 includes a predetermined object (S106). The processor 1101 associates the first determination result by the first determination unit 1103 with the first ID and stores the first ID in the storage device 1001 (S107).

The processor 1101 determines whether the first ID holder has ended the baggage determination loop (S108). In the case in which the first ID holder has not ended the baggage determination loop (S108: NO), the processor 1101 repeats the baggage determination loop (S109). In the case in which the baggage determination loop ends (S108: YES), the processor 1101 ends the first determination routine.

Next, referring to a flowchart shown in FIG. 6, an entrance propriety determination routine in which the entrance management device 12 determines whether a passerby through the second entrance section 301a in the inspection system 300 can enter will be described. The entrance propriety determination routine in the second entrance sections 301b and 301c is similar to the entrance propriety determination routine in the second entrance section 301a.

The second ID recognition unit 1202a acquires second ID information possessed by a passerby of the second entrance section 301a (S110). The processor 1201 determines whether the second ID recognition unit 1202a has acquired the second ID information (S111). In the case in which it is determined that the second ID information fails to be acquired (S111: NO), the processor 1201 outputs information indicating that entry is not permitted (S112), and ends the entrance propriety determination routine. In the case in which the second ID information has been acquired (S111: YES), the processor 1201 determines whether the second ID has an entry qualification (S113). In the case in which the second ID has no entry qualification (S113: NO), the processor 1201 outputs information indicating that entry is not permitted (S114), and ends the entrance propriety determination routine.

In the case in which the second ID has an entry qualification (S113: YES), the processor 1201 acquires the first determination result associated with the first ID corresponding to the second ID from the storage device 1001 (S115). In the case in which the first determination result fails to be acquired (S116: NO), the processor 1201 executes a second determination subroutine that determines whether the baggage carried by the second ID holder is equal to or larger than the predetermined size (S117), and ends the entrance propriety determination processing. In the case in which the first determination result has been acquired (S116: YES), the processor 1201 executes a predetermined object determination subroutine of the baggage of the second ID holder that determines whether the predetermined object is included in the baggage of the second ID holder (S118), and ends the entrance propriety determination processing.

Next, the second determination subroutine in which the entrance management device 12 determines whether the baggage carried by the second ID holder is equal to or larger than a predetermined size will be described with reference to a flowchart shown in FIG. 7.

The processor 1201 acquires information sensed by the first sensor 1203 (SR101). The second determination unit 1204 determines whether all the pieces of baggage carried by the second ID holder are smaller than the predetermined size based on the acquired first sensor information (SR102). When at least one of the pieces of baggage carried by the second ID holder is equal to or larger than the predetermined size (SR103: NO), the processor 1201 outputs information indicating that entry is not permitted (SR104), and ends the second determination subroutine. When all the pieces of baggage possessed by the second ID holder are smaller than the predetermined size (SR103: YES), the processor 1201 outputs information indicating that entry is permitted (SR105), and ends the second determination subroutine.

Figure 8:
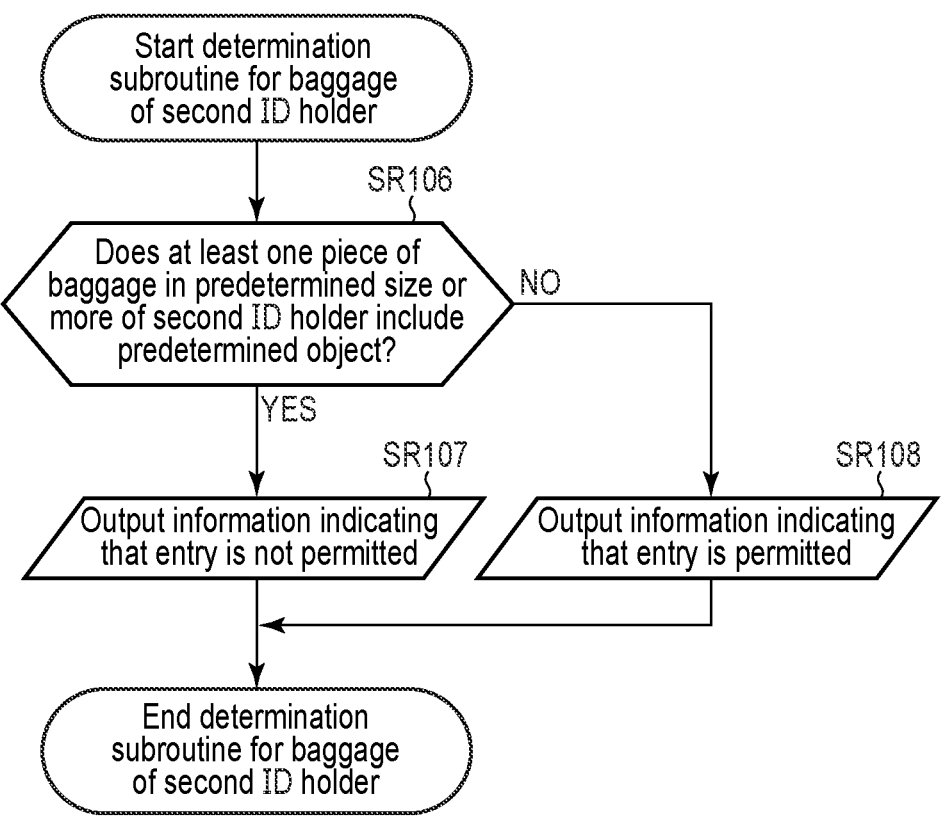
FIG. 8 is a flowchart of a predetermined object determination subroutine by the entrance management device according to the first embodiment for determining whether or not a predetermined object is included in baggage carried by a second ID holder.

Next, a predetermined object determination subroutine in which the entrance management device 12 determines whether a predetermined object is included in baggage carried by a second ID holder will be described with reference to a flowchart shown in FIG. 8.

The processor 1201 determines whether at least one piece of baggage in a predetermined size or more carried by the second ID holder includes a predetermined object based on the first determination result acquired from the storage device 1001 (SR106). In the case in which at least one piece of baggage in a predetermined size or more carried by the second ID holder includes a predetermined object (SR106: YES), the processor 1201 outputs information indicating that entry is not permitted (SR107), and ends the predetermined object determination subroutine for the baggage of the second ID holder. In the case in which all pieces of baggage of the predetermined size or more carried by the second ID holder do not include the predetermined object (SR106: NO), the processor 1201 outputs information indicating that entry is permitted (SR108), and ends the predetermined object determination subroutine for the baggage of the second ID holder.

As described above, in accordance with the entrance management system 10 according to the first embodiment, among the users of the inspection system 300, for example, baggage determination by the baggage determination device 11 is unnecessary for a user who possesses only baggage of less than a predetermined size such as a mobile phone, a wallet, food and drink, and a writing instrument. Since the number of users of the baggage determination device 11 is reduced as compared with the inspection system that does not use the entrance management system 10 according to the first embodiment, it is possible to improve the inspection throughput. In addition, in accordance with the entrance management system 10 according to the first embodiment, the entrance management device 12 determines the size of the baggage of the user of the inspection system 300, and outputs the entrance propriety information. At this time, since the inspector does not necessarily have to check the size of the baggage carried by the visitor, it is possible to achieve labor-saving.

Second Embodiment

Next, a second embodiment will be described. In the configuration of the second embodiment, the description of the configuration similar to that of the first embodiment is omitted or simplified by referring to the description of the first embodiment.

Figure 9:
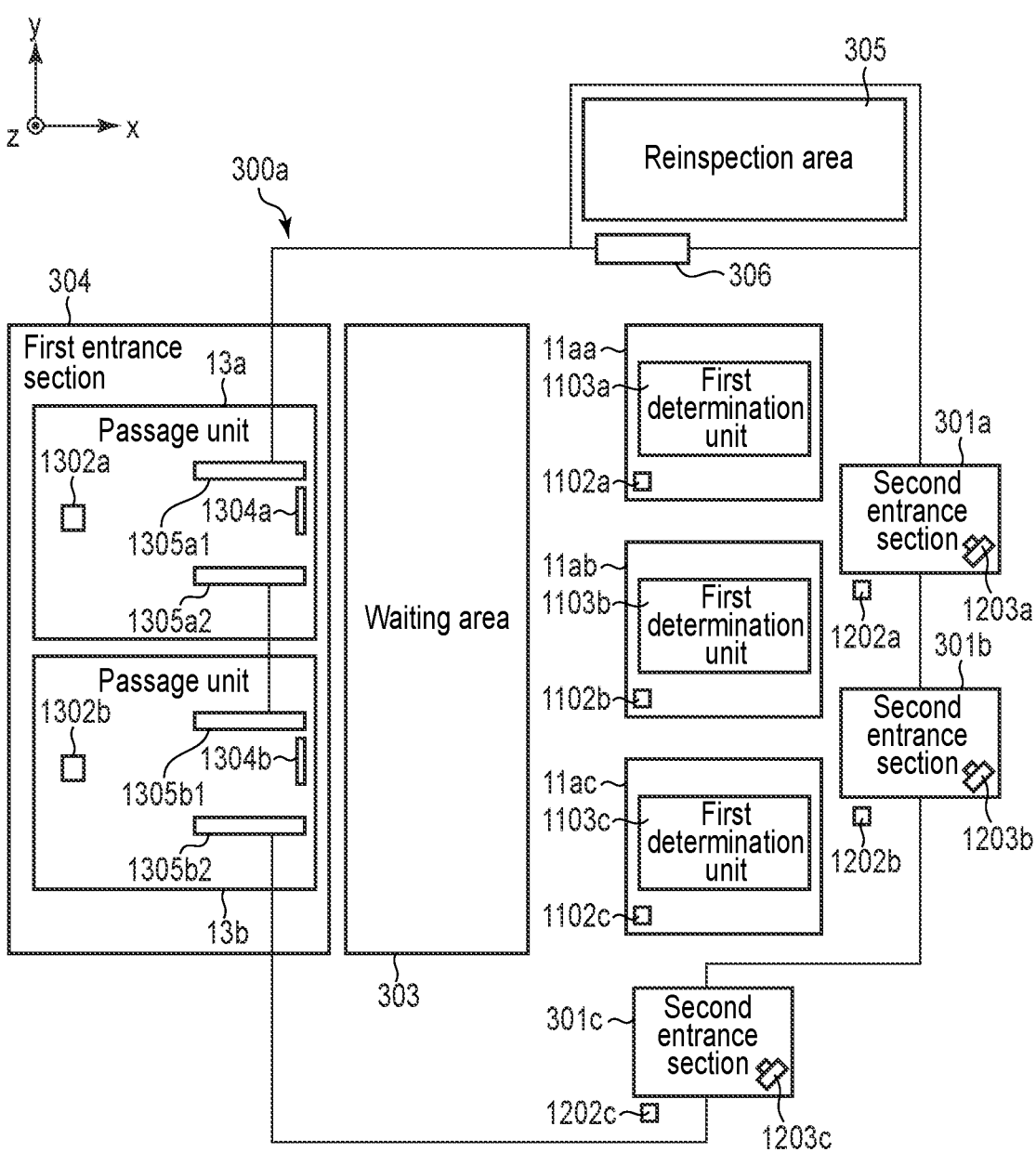
FIG. 9 is a plan view schematically showing an inspection system to which an entrance management system according to a second embodiment is applied.

FIG. 9 is a plan view schematically showing an inspection system 300a to which an entrance management system 10a according to the second embodiment is applied.

The first entrance section 304 of the inspection system 300*a* according to the second embodiment includes a passage unit 13*a* and a passage unit 13*b*. The first passage unit 13*a* and the second passage unit 13*b* correspond to the passage unit 13 shown in FIG. 1. The passage unit 13 includes, for example, a processor 1301, a second sensor 1302, a third determination unit 1303, and a display device 1304.

The passage unit 13*a* includes, for example, a second sensor 1302*a* and a display device 1304*a*. Similarly, the passage unit 13*b* includes, for example, a second sensor 1302*b* and a display device 1304*b*.

The processor 1301 is, for example, an electronic circuit such as an integrated circuit (IC). Alternatively, the processor 1301 is an integrated circuit such as a central processing unit (CPU), a field-programmable gate array (FPGA), or a microcontroller. Alternatively, the processor 1301 may be a computer such as a server incorporating a CPU or a GPU. The processor 1301 processes information input from the second sensor 1302, the third determination unit 1303, or the display device 1304, for example, and outputs the processed information to the storage device 1001, the second sensor 1302, the third determination unit 1303, or the display device 1304.

The processor 1301 may be hardware incorporated in the third determination unit 1303 or may be hardware installed outside the third determination unit 1303 and connected to the second sensor 1302, the third determination unit 1303, the display device 1304, or the storage device 1001 in a wired or wireless manner. For example, the processor 1301 may be a server capable of inputting and outputting processing information via the Internet. One processor 1301 may be configured to be able to input information from a plurality of second sensors 1302, a plurality of third determination units 1303, and a plurality of display devices 1304. Furthermore, one processor 1301 may be configured to be able to output information to the plurality of second sensors 1302, the plurality of third determination units 1303, and the plurality of display devices 1304.

The second sensor 1302 may be similar to the first sensor 1203. The second sensor 1302 includes, for example, a camera that captures visible light or infrared light, a LiDAR, a ToF sensor, a 3D sensor, or the like. Similarly to the first sensor 1203, the second sensor 1302 may include a plurality of sensors of the same type, or may include a combination of a plurality of types of sensors different from each other, such as a camera and a LiDAR, and a camera and a 3D sensor.

In the inspection system 300*a*, a user of the inspection system 300*a* goes in the +X axis direction through passage unit 13*a* or passage unit 13*b* of the first entrance section 304, and enters the inspection system 300*a*. At this time, determination by the third determination unit 1303 is executed. The third determination unit 1303 is, for example, an integrated circuit such as a CPU, a GPU, an FPGA, or a microcontroller. Alternatively, the third determination unit 1303 may be a computer such as a server incorporating a CPU or a GPU. The third determination unit 1303 includes a program executed by an integrated circuit such as the CPU described above.

In the second embodiment, the determination by the third determination unit 1303 is performed before the determination by the first determination unit 1103.

The third determination unit 1303 determines whether a passerby of the passage unit 13 carries baggage in a predetermined size or more based on the information acquired by the second sensor 1302. The determination by the third determination unit 1303 may be made by an operator based on the information acquired by the second sensor 1302, or the third determination unit 1303 may be a program operated by the processor 1301 of the passage unit 13.

Here, as the predetermined size of the baggage, for example, a first predetermined size, a second predetermined size, and a third predetermined size different from each other may be defined. In the following, the third predetermined size is larger than the second predetermined size, and the second predetermined size is larger than the first predetermined size.

The third determination unit 1303 performs determination on three conditions: whether the baggage carried by the passerby of the passage unit 13 is less than the first predetermined size; whether the baggage is equal to or larger than the first predetermined size and less than the second predetermined size; and whether the baggage is equal to or larger than the second predetermined size and less than the third predetermined size.

For example, it is assumed that the inspection system 300*a* does not have to inspect baggage of a person who possesses only baggage less than the first predetermined size. Here, the first predetermined size is similar to the predetermined size in the first embodiment. Among the baggage determination devices 11 included in the inspection system 300*a*, baggage determination devices 11*aa* and 11*ab* can determine whether the baggage smaller than the second predetermined size includes the predetermined object, and a baggage determination device 11*ac* can determine whether the baggage smaller than the third predetermined size includes the predetermined object.

At this time, in the case in which the passage unit 13 is configured such that the passage unit 13 guides a passerby to enter from any one of the second entrance sections 301*a*, 301*b*, and 301*c* when the passerby of the passage unit 13 possesses only baggage of less than the first predetermined size, guide a passerby to perform baggage determination using any one of the baggage determination devices 11*aa* and 11*ab* when the passerby of the passage unit 13 possesses baggage of equal to or larger than the first predetermined size and less than the second predetermined size, guide a passerby to perform baggage determination using the baggage determination device 11*ac* when the passerby possesses baggage of equal to or larger than the second predetermined size and less than the third predetermined size, and guide a passerby of the passage unit to perform baggage determination by a visual check or the like of an operator when the passerby possesses baggage of equal to or larger than the third predetermined size, the passerby of the passage unit 13 is able to know in advance whether to perform the baggage determination by him-herself, or able to know a process of the baggage determination to be performed after passing through the passage unit 13, and the like.

The display device 1304 may include, for example, a display that displays information input from the processor 1301. Furthermore, the display device 1304 may include a speaker that transmits input information by voice. Furthermore, the display device 1304 may be, for example, a touch panel having a touch sensor.

The display device 1304 may display, for example, whether the passage of the passage unit 13 is permitted to the passerby of the passage unit 13, such as a display content 13041 and a display content 13042 shown in FIG. 10A and a display content 13041, a display content 13042, and a display content 13043 shown in FIG. 10B. As the display method, not only text but also symbols, pictograms, and the like may be shown.

As shown in FIGS. 10C and 10D, information based on the third determination result by the third determination unit 1303 may be displayed to a passerby of the passage unit 13. In this manner, the passerby of the passage unit 13 can know in advance whether he/she needs to use the baggage determination device 11. A passerby carrying only baggage less than the predetermined size can smoothly enter from any of the second entrance sections 301a, 301b, and 301c by knowing in advance that it is not necessary to wait in the waiting area 303 in order to use the baggage determination device 11.

In addition, as shown in FIGS. 10E and 10F, the process of baggage determination to be performed after passing through the passage unit 13 may be displayed to the passerby of the passage unit 13. The passerby of the passage unit 13 can move smoothly by knowing in advance the process of baggage determination to be performed by the passer.

The display device 1304 may display information based on the third determination result by the third determination unit 1303 not only to the passerby of the passage unit 13 but also to an operator. In this manner, the operator can appropriately guide the moving route and the inspection to be taken to the passerby of the passage unit 13 according to the third determination result.

A third determination routine in the passage unit in which the passage unit 13 determines the size of the baggage carried by the person passing through the passage unit 13 will be described with reference to a flowchart shown in FIG. 11.

The processor 1301 acquires information on baggage carried by a passerby of the passage unit 13 via the second sensor (S201). The third determination unit 1303 determines the size of the baggage carried by the passerby of the passage unit 13 (S202).

The third determination unit 1303 determines whether all pieces of baggage carried by the passerby are smaller than the first predetermined size (S203). When all the pieces of baggage are less than the first predetermined size (S203: YES), the processor 1301 outputs information indicating that baggage inspection is unnecessary (S204), and ends the third determination routine in the passage unit.

When at least one piece of baggage among the pieces of baggage carried by the passerby is equal to or larger than the first predetermined size (S203: NO), the processor 1301 outputs information indicating that baggage inspection is necessary (S205). The third determination unit 1303 determines whether all the pieces of baggage carried by the passerby of the passage unit 13 are smaller than the second predetermined size (S206). When all the pieces of baggage are less than the second predetermined size (S206: YES), the processor 1301 outputs information indicating that the small baggage self-inspection is allowed (S207), and ends the third determination routine in the passage unit. When at least one piece of baggage is equal to or larger than the second predetermined size (S206: NO), the third determination unit 1303 determines whether all the pieces of baggage are smaller than the third predetermined size (S208). When all the pieces of baggage are smaller than the third predetermined size (S208: YES), the processor 1301 outputs information indicating that the large baggage self-inspection is allowed (S209), and ends the third determination routine in the passage unit. When at least one piece of baggage is equal to or larger than the third predetermined size (S208: YES), the processor 1301 outputs information indicating that baggage self-inspection is not allowed (S210), and ends the third determination routine in the passage unit.

By the third determination routine in the passage unit, the inspection system 300a is configured to be able to select an inspection method according to the size of the baggage carried by the user.

As described above, in accordance with the entrance management system 10a according to the second embodiment, in the inspection system 300a to which the entrance management system 10a is applied, the size of the baggage owned by the user can be determined by the third determination unit 1303 before the user of the inspection system 300a performs the baggage determination by the baggage determination device 11.

In addition, by displaying the third determination result by the third determination unit 1303 to the passerby of the passage unit 13 using the display device 1304, the passerby of the passage unit 13 can know in advance whether the baggage determination is necessary before the baggage determination is performed, or can know the process of the baggage determination to be performed after passing through the passage unit 13. The display device 1304 displays the third determination result by the third determination unit 1303 to the operator, and thus the operator can easily guide the passerby of the passage unit 13.

With the entrance management system 10a thus configured, the user of the inspection system 300a can perform an efficient action by knowing in advance the baggage determination process and the movement route to be performed by the user. The inspection system 300a urges the user to select an appropriate action by applying the entrance management system 10a, and thus it is possible to improve the inspection throughput. In addition, since the display device 1304 allows the visitor to know the baggage determination process and the movement route to be performed by the inspection system 300a, it is not necessary for an operator to guide the baggage determination process and the movement route to the visitor, and it is possible to achieve labor-saving. Further, by the third determination routine in the passage unit, the inspection system 300a is configured to be able to select the inspection method according to the size of the baggage carried by the user.

Third Embodiment

Next, a third embodiment will be described. In the configuration of the third embodiment, the description of the configuration similar to that of the first embodiment is omitted or simplified by referring to the description of the first embodiment.

FIG. 12 is a plan view schematically showing an inspection system 300b to which an entrance management system 10b according to the third embodiment is applied.

The inspection system 300b includes, for example, baggage determination devices 11ba, 11bb, and 11bc, a first entrance section 304, second entrance sections 301a, 301b, and 301c, a waiting area 303, a reinspection area 305, an entrance 306 of the reinspection area, predetermined object carrying determination units 1402a1, 1402a2, 1402b1, 1402b2, 1402c1, 1402c2, 1402d1, and 1402d2 of a body determination device, open/close units 1504a1, 1504a2, 1504b1, 1504b2, 1504c1, and 1504c2 of a gate device, and display devices 1505a, 1505b, and 1505c of the gate device.

The entrance section 301a includes, for example, a second ID recognition unit 1202a, a first sensor 1203a, open/close units 1504a1 and 1504a2 of the gate device, and a display device 1505a. Similarly, the entrance section 301b includes, for example, a second ID recognition unit 1202b, a first sensor 1203*b*, open/close units 1504*b*1 and 1504*b*2 of the gate device, and a display device 1505*b*.

The entrance section 301*c* includes, for example, a second ID recognition unit 1202*c*, a first sensor 1203*c*, open/close units 1504*c*1 and 1504*c*2 of the gate device, a display device 1505*c*, and predetermined object carrying determination units 1402*d*1 and 1402*d*2 of the body determination device.

The baggage determination device 11*ba* includes, for example, a first ID recognition unit 1102*a*, a first determination unit 1103*a*, and predetermined object carrying determination units 1402*a*1 and 1402*a*2 of the body determination device. Similarly, the baggage determination device 11*bb* includes, for example, a first ID recognition unit 1102*b*, a first determination unit 1103*b*, and predetermined object carrying determination units 1402*b*1 and 1402*b*2 of the body determination device. The baggage determination device 11*bc* includes, for example, a first ID recognition unit 1102*c*, a first determination unit 1103*c*, and predetermined object carrying determination units 1402*c*1 and 1402*c*2 of the body determination device.

The body determination device 14 includes, for example, a processor 1401, a predetermined object carrying determination unit 1402, and a display device 1403.

The processor 1401 is, for example, an electronic circuit such as an integrated circuit (IC). Alternatively, the processor 1401 is an integrated circuit such as a central processing unit (CPU), a field-programmable gate array (FPGA), or a microcontroller. Alternatively, the processor 1401 may be a computer such as a server incorporating a CPU or a GPU. The processor 1401 processes, for example, information input from the predetermined object carrying determination unit 1402 or the display device 1403, and outputs the processed information to the storage device 1001, the predetermined object carrying determination unit 1402, or the display device 1403.

The processor 1401 may be hardware incorporated in the body determination device 14, or may be hardware installed outside the body determination device 14 and connected to the predetermined object carrying determination unit 1402, the display device 1403, or the storage device 1001 in a wired or wireless manner. For example, the processor 1401 may be a server capable of inputting and outputting processing information via the Internet. One processor 1401 may be configured to be able to input information from a plurality of predetermined object carrying determination units 1402 and a plurality of display devices 1403. Further, one processor 1401 may be configured to be able to output information to the plurality of predetermined object carrying determination units 1402 and the plurality of display devices 1403.

The predetermined object carrying determination unit 1402 includes an inspection device that irradiates the inspection target person of the body determination device 14 with an electromagnetic wave such as an X-ray, a terahertz wave, or a millimeter wave to capture an image, and determines whether the inspection target person of the body determination device 14 possesses a predetermined object. Alternatively, the predetermined object carrying determination unit 1402 may include a metal detector that determines whether the inspection target person of the body determination device 14 possesses a predetermined object by electromagnetic induction. Alternatively, the predetermined object carrying determination unit 1402 may include a trace detection device that flies fine particles attached to the inspection target person of the body determination device 14 by an air flow or the like and detects a drug, an explosive, or the like from the fine particles.

The display device 1403 may include, for example, a display that displays information input from the processor 1401. Furthermore, the display device 1403 may include a speaker that transmits input information by voice. Furthermore, the display device 1403 may be, for example, a touch panel having a touch sensor.

The gate device 15 includes, for example, a processor 1501, an approach detector 1502, an open/close control unit 1503, an open/close unit 1504, and a display device 1505.

The processor 1501 may be similar to the processor 1101, for example. The processor 1501 processes information input from, for example, the approach detector 1502, the open/close control unit 1503, or the display device 1505, and outputs the processed information to the storage device 1001, the approach detector 1502, the open/close control unit 1503, or the display device 1505.

In addition, the processor 1501 may acquire the second ID information acquired by second ID recognition unit 1202 via the storage device 1001. As shown in FIG. 12, when each of the second entrance sections includes the second ID recognition unit and the open/close unit of the gate device, the processor 1501 of the gate device can acquire a first determination result or a body determination result associated with a first ID corresponding to a second ID based on the second ID information acquired by the second ID recognition unit, and execute the open/close processing of the gate based on the acquired result.

The approach detector 1502 is, for example, a camera or an infrared sensor, and detects that the visitor approaches the gate device 15. The approach detector 1502 outputs information about whether the visitor approaches the gate device 15 to the processor 1501. Further, the approach detector 1502 may detect not only that the visitor approaches the gate device 15 but also whether the visitor passes through the gate device 15.

The open/close control unit 1503 is, for example, a CPU or a microcontroller, and controls an open/close operation of the open/close unit 1504. By controlling the open/close control unit 1503 based on the output information of approach detector 1502, the processor 1501 can perform control such that the open/close unit 1504 of the gate is closed when the visitor approaches the gate device 15, and the open/close unit 1504 of the gate is opened when the visitor does not approach the gate device 15.

The open/close unit 1504 is a mechanism that prevents a passerby of the gate device 15 from illegally passing through gate device 15. The structure of the open/close unit may be a turn style type, a retractable type, a flap door type, or the like.

The display device 1505 may include, for example, a display that displays information input from the processor 1501. Furthermore, the display device 1505 may include a speaker that transmits input information by voice. Furthermore, the display device 1505 may be, for example, a touch panel having a touch sensor. The display device 1505 displays, for example, information regarding whether the gate device 15 can pass for the visitor.

The inspection system 300*b* according to the third embodiment includes three second entrance sections. Among the three second entrance sections, only the second entrance section 301*c* includes a predetermined object carrying determination unit 1402*d*1 and a predetermined object carrying determination unit 1402*d*2 of the body determination device. The inspection system 300*b* is configured in which among users of the inspection system 300*b*, a user having at least one piece of baggage in a predetermined size or more can pass through the second entrance section after determining whether the baggage includes a predetermined
object by any one of the baggage determination devices
11*ba*, 11*bb*, and 11*bc*. The user of the baggage determination
device 11*ba* is determined whether the predetermined object
is carried by the predetermined object carrying determina-
tion units 1402*a*1 and 1402*a*2 of the body determination
device. The user of the baggage determination device 11*bb*
is determined whether the predetermined object is carried by
the predetermined object carrying determination units
1402*b*1 and 1402*b*2 of the body determination device. The
user of the baggage determination device 11*bc* determines
whether the predetermined object is carried by the prede-
termined object carrying determination units 1402*c*1 and
1402*c*2 of the body determination device.

A user whose all pieces of baggage are less than the
predetermined size can pass through the second entrance
section 301*c* without using the baggage determination
devices 11*ba*, 11*bb*, and 11*bc*. The predetermined object
carrying determination units 1402*d*1 and 1402*d*2 of the body
determination device included in the second entrance section
301*c* determine whether the user whose baggage is less than
the predetermined size carries the predetermined object.
When the user whose baggage is less than the predetermined
size passes through one of the second entrance sections 301*a*
and 301*b*, it is not determined whether all the baggage is
carrying the predetermined object to the user whose baggage
is less than the predetermined size. In the inspection system
300*b*, since all the baggage determination devices 11*ba*,
11*bb*, and 11*bc* include the predetermined object carrying
determination unit of the body determination device, the
determination by the body determination device is also
performed for the user who has performed the first deter-
mination as to whether the predetermined object is carried in
the baggage in the baggage determination devices 11*ba*,
11*bb*, and 11*bc*. Therefore, when the first determination
result associated with the first ID corresponding to the
second ID held by any one of the passersby of the second
entrance sections 301*a* and 301*b* fails to be obtained, that is,
when the baggage determination devices 11*ba*, 11*bb*, and
11*bc* do not determine whether a predetermined object is
carried in baggage, the processor 1501 included in the gate
device 15 outputs information indicating that the passerby is
not allowed to enter. In this manner, the body determination
device 14 can determine whether all the users of the inspec-
tion system 300*b* carry the predetermined object regardless
of the size of the carried baggage.

A first determination routine in the entrance management
system 10*b* will be described with reference to a flowchart
shown in FIG. 14. In the first determination routine accord-
ing to the third embodiment, unlike the first determination
routine according to the first embodiment, two determina-
tion processes of determining whether a predetermined
object is included in the baggage of the first ID holder by the
baggage determination device and determining whether the
first ID holder carries the predetermined object by the body
determination device are performed.

The first ID recognition unit 1102 acquires information of
the first ID possessed by the first ID holder (S101*b*).

The processor 1101 determines whether the information
of the first ID can be acquired (S102*b*). In the case in which
the first ID information fails to be acquired (S102*b*: NO), the
processor 1101 ends the first determination routine.

In the case in which the information of the first ID has
been acquired (S102*b*: YES), the processor 1101 determines
whether the first ID has an entry qualification (S103*b*). In the
case in which the first ID has no entry qualification (S103*b*:
NO), the processor 1101 ends the first determination routine.

In the case in which the first ID has an entry qualification
(S103*b*: YES), the processor 1101 starts a baggage deter-
mination loop (S104*b*). The first ID holder installs the
baggage in the baggage determination device 11 (S105*b*).
The predetermined object carrying determination unit 1402
determines whether the first ID holder carries a predeter-
mined object (S106*b*). The processor 1401 of the body
determination device stores the first ID and the body deter-
mination result in association with each other in the storage
device 1001 (S107*b*).

The first determination unit 1103 determines whether the
baggage installed in the baggage determination device 11
includes a predetermined object (S108*b*). The processor
1101 associates the first determination result by the first
determination unit 1103 with the first ID and stores the first
ID in the storage device 1001 (S109*b*).

The processor 1101 determines whether the first ID holder
has ended the baggage determination loop (S110*b*). In the
case in which the first ID holder has not ended the baggage
determination loop (S110*b*: NO), the processor 1101 repeats
the baggage determination loop (S111*b*). In the case in
which the baggage determination loop ends (S110*b*: YES),
the processor 1101 ends the first determination routine.

Figure 15A:
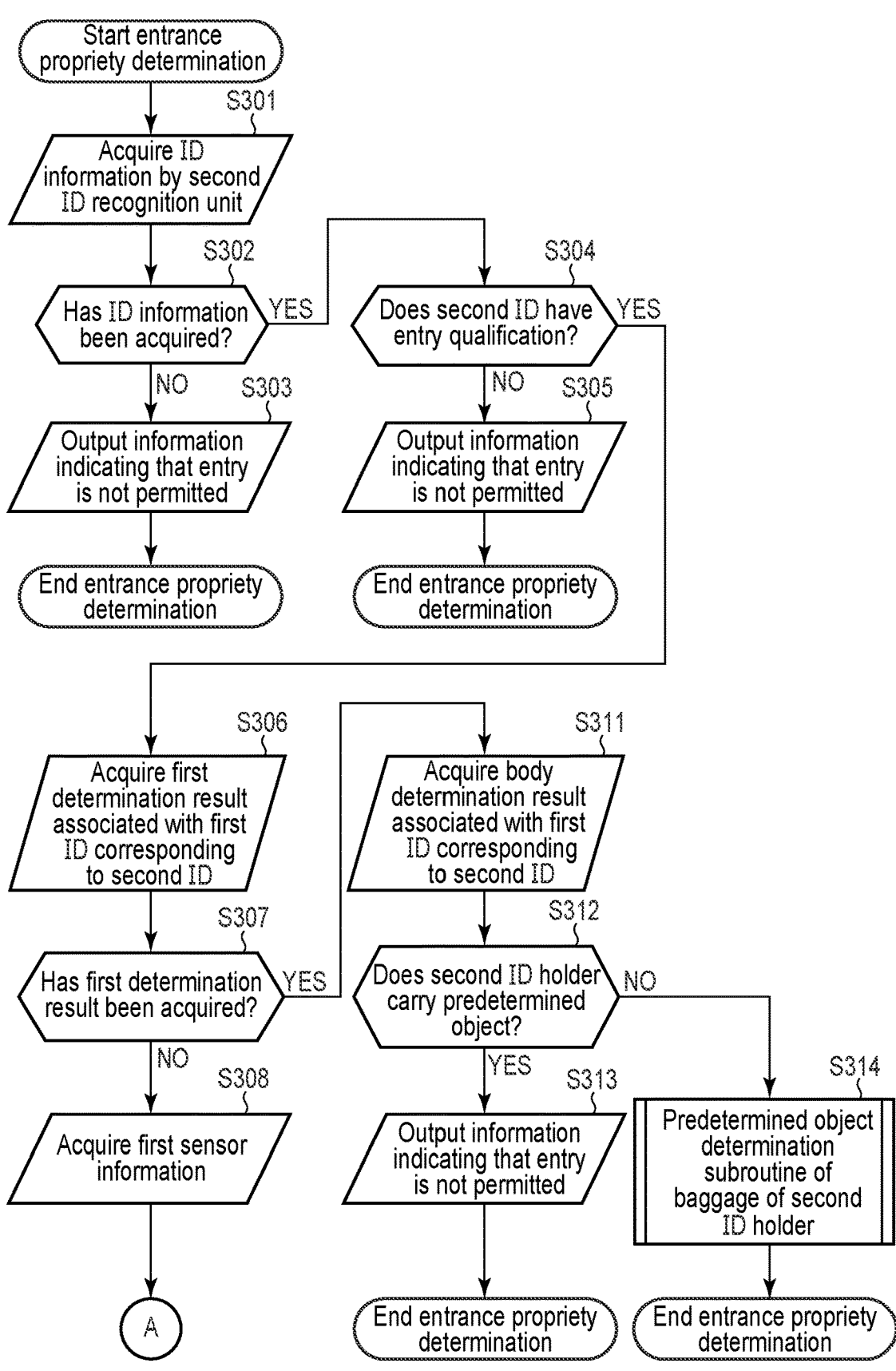
FIG. 15A is a first flowchart of an entrance propriety determination routine that determines whether or not the second ID holder can enter by the entrance management device in the inspection system according to the third embodiment.

Referring to flowcharts shown in FIGS. 15A and 15B, an
entrance propriety determination routine that determines
whether a passerby of the second entrance section 301*a*
enters the inspection system 300*b* according to the third
embodiment will be described. The entrance propriety deter-
mination routine in the second entrance sections 301*b* and
301*c* is similar to the entrance propriety determination
routine in the second entrance section 301*a*.

The second ID recognition unit 1202*a* of the entrance
management device 12 acquires ID information possessed
by a passerby of the second entrance section 301*a* (S301).
The processor 1201 determines whether the ID information
has been acquired (S302). In the case in which the ID
information fails to be acquired (S302: NO), the processor
1201 outputs information indicating that entry is not per-
mitted (S303), and ends the entrance propriety determina-
tion routine.

In the case in which the second ID recognition unit 1202*a*
determines that the second ID information has been acquired
(S302: YES), the processor 1201 determines whether the
second ID has an entry qualification (S304). In the case in
which it is determined that the second ID has no entry
qualification (S304: NO), the processor 1201 outputs infor-
mation indicating that entry is not permitted (S305), and
ends the entrance propriety determination routine.

In the case in which the second ID has an entry qualifi-
cation, the processor 1201 acquires the first determination
result associated with the first ID corresponding to the
second ID from the storage device 1001 (S306). The pro-
cessor 1201 determines whether the first determination
result has been acquired (S307). In the case in which the first
determination result has been acquired (S307: YES), the
processor 1201 acquires the body determination result asso-
ciated with the second ID from the storage device 1001
(S311). The processor 1201 determines whether the second
ID holder carries a predetermined object based on the body
determination result (S312). In the case in which the second
ID holder carries a predetermined object (S312: NO), the
processor 1201 outputs information indicating that entry is
not permitted (S313), and ends the entrance propriety deter-
mination routine. In the case in which the second ID holder
does not carry the predetermined object (S312: YES), the
processor 1201 executes a predetermined object determination subroutine of the baggage of the second ID holder shown in FIG. 8 (S314), and ends the entrance propriety determination routine.

In the case in which the first determination result fails to be acquired (S312: NO), the second determination unit 1204 acquires the first sensor information from the first sensor 1203a via the processor 1201 (S308). The second determination unit 1204 determines whether all the pieces of baggage carried by the passerby of the second entrance section 301a are less than the predetermined size based on the acquired first sensor information (S309). In the case in which at least one piece of baggage is equal to or larger than the predetermined size (S309: NO) based on the determination result of the second determination unit 1204, the processor 1201 outputs information indicating that entry is not permitted (S310), and ends the entrance propriety determination routine.

When all the pieces of baggage are less than the predetermined size (S309: YES), the processor 1201 determines whether the passage unit through which the second ID holder is passing includes the body determination device (S315). Since the second entrance sections 301a and 301b do not include the body determination device (S315: NO), when the second ID holder is passing through 301a or 301b, the processor 1201 outputs information indicating that entry is not permitted (S316), and ends the entrance propriety determination routine. Since the second entrance section 301c includes the body determination device (S315: YES), in the case in which the second ID holder is passing through the second entrance section 301c, the processor 1201 executes a carrying determination subroutine of a predetermined object in the second entrance section shown in FIG. 16 (S317), and ends the entrance propriety determination routine.

Here, Steps S308 to S310 correspond to the second determination subroutine in FIG. 7.

Next, referring to a flowchart shown in FIG. 16, a description will be given of a carrying determination subroutine of the predetermined object in the second entrance section that determines whether the user of the body determination device included in the second entrance section 301c carries the predetermined object.

The predetermined object carrying determination units 1402d1 and 1042d2 included in the second entrance section 301c determine whether the second ID holder passing through the second entrance section 301c carries a predetermined object (SR301). The processor 1401 determines whether the second ID holder carries the predetermined object based on the body determination results of the predetermined object carrying determination units 1402d1 and 1042d2 (SR302). In the case in which the second ID holder carries a predetermined object (SR302: YES), the processor 1401 outputs information indicating that entry is not permitted (SR303). In the case in which the second ID holder does not carry the predetermined object (SR302: NO), the processor 1401 outputs information indicating that entry is permitted (SR304). The processor 1401 stores the first ID corresponding to the second ID possessed by the second ID holder and the body determination result in association with each other in the storage device 1001 (SR305), and ends the carrying determination subroutine of the predetermined object in the second entrance section.

Next, a gate open/close processing routine included in the second entrance section will be described with reference to a flowchart shown in FIG. 17.

The approach detector 1502 intermittently detects that a passerby approaches the gate device (S320). When the approach of the person is detected, the processor 1501 closes the open/close unit 1504 of the gate via the open/close control unit 1503 (S321). Thereafter, the entrance propriety determination routine shown in FIGS. 15A and 15B is executed (S322). The processor 1501 acquires the entrance propriety information of the second ID holder output in the entrance propriety determination routine via the storage device 1001 (S323). The processor 1501 displays the acquired entrance propriety information on the display device 1505 (S324). The processor 1501 determines whether the acquired entrance propriety information indicates that entry is permitted (S325). In the case in which the entrance propriety information indicates that entry is not permitted (S325: NO), the processor 1501 ends the gate open/close processing routine. In the case in which the entrance propriety information indicates that entry is permitted (S325: YES), the processor 1501 opens the open/close unit 1504 via the open/close control unit 1503 (S326). The processor 1501 starts a second ID holder passage detection loop (S327). The processor 1501 determines whether the second ID holder has passed through gate device 15 based on the information acquired by approach detector 1502 (S328). In the case in which the second ID holder has not passed through gate device 15 (S328: NO), the processor 1501 continues the second ID holder passage detection loop. In the case in which the second ID holder passes through the gate device 15 (YES in S328), the processor 1501 ends the second ID holder passage detection loop (S329). The processor 1501 closes the gate open/close unit 1504 via the open/close control unit 1503 (S330), and ends the gate open/close process.

As described above, in accordance with the entrance management system 10b of the third embodiment, in the inspection system 300b to which the entrance management system 10b is applied, by combining the determination by the baggage determination device and the determination by the walk-through type body determination device, it is possible to detect the predetermined object hidden in the clothing by the person who possesses only the baggage of less than the predetermined size without reducing the inspection throughput.

Figure 13:
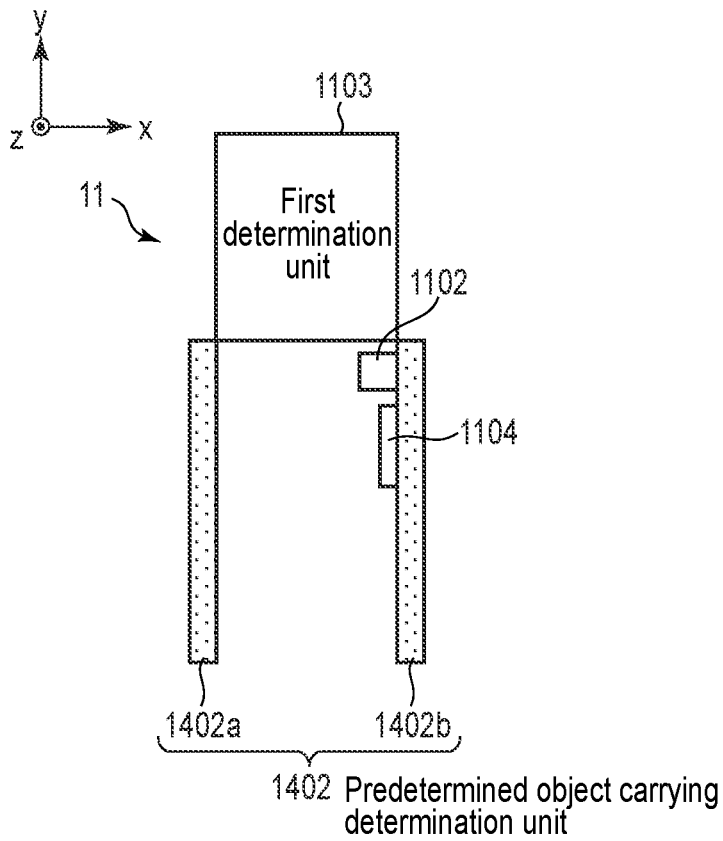
FIG. 13 is a schematic plan view of a body determination device and a first determination unit according to the third embodiment.

In addition, by integrating the baggage determination device and the body determination device as shown in FIG. 13, the body inspection can be always performed on the user of the baggage determination device, and thus it is possible to prevent the inspection from being omitted. In addition, for the user of the baggage determination device, the body inspection at the entrance section is unnecessary, and the inspection throughput is improved. In addition, by providing the body determination device in the second entrance section, the determination by the body determination device can be performed even for a visitor in which all pieces of baggage not using the baggage determination device are less than a predetermined size.

In addition, by providing the gate device in the entrance section, it is possible to obtain an effect of preventing unauthorized entry of a visitor who has been determined to be unable to enter.

In addition, by providing the display device in the gate device, the visitor can know the entrance propriety information of the visitor. In addition, since the visitor can know the moving route after entering and the action to be taken in the case in which the visitor is not allowed by the display device, there is no need for an operator to guide the visitor, and it is possible to achieve labor-saving.

Fourth Embodiment

Next, a fourth embodiment will be described. In the configuration of the fourth embodiment, the description of the configuration similar to that of the first embodiment is omitted or simplified by referring to the description of the first embodiment.

FIG. 18 is a diagram showing a schematic configuration of an entrance management system 10c according to the fourth embodiment. In entrance management system 10c according to the fourth embodiment shown in FIG. 18, the same components as those of the entrance management system 10 according to the first embodiment are partially omitted. FIG. 19 is a plan view schematically showing the inspection system 300c to which an entrance management system 10c according to the fourth embodiment is applied.

As shown in FIG. 18, a baggage determination device 11c included in the entrance management system 10c according to the fourth embodiment includes, for example, a third sensor 1110 and a fourth determination unit 1111.

The third sensor 1110 may be similar to the first sensor 1203. The third sensor 1110 includes, for example, a camera that captures visible light or infrared light, a LiDAR, a ToF sensor, a 3D sensor, or the like. Similarly to the first sensor 1203, the third sensor 1110 may include a plurality of sensors of the same type, or may include a combination of a plurality of types of sensors different from each other, such as a camera and a LiDAR, and a camera and a 3D sensor.

The third sensor 1110 may be installed, for example, in front of, behind, or above the user of the baggage determination device 11c, and acquire information of baggage carried by the user of the baggage determination device 11c. The third sensor 1110 may be installed inside a first determination unit 1103 and acquire baggage information determined by the first determination unit. The third sensor 1110 captures an image of baggage carried by a user of the baggage determination device 11c. The third sensor 1110 outputs the captured image to a processor 1101 and is controlled by the processor 1101.

The fourth determination unit 1111 may be, for example, the same as the second determination unit 1204. The fourth determination unit 1111 determines whether the first determination unit 1103 included in the baggage determination device 11c has determined all pieces of baggage in a predetermined size or more possessed by the visitor based on the information acquired by the third sensor 1110. The fourth determination unit 1111 is, for example, an integrated circuit such as a CPU, a GPU, an FPGA, or a microcontroller. Alternatively, the fourth determination unit 1111 may be a computer such as a server incorporating a CPU, a GPU, and the like. The fourth determination unit 1111 includes a program executed by an integrated circuit such as the CPU described above.

The fourth determination unit 1111 determines the number of pieces of baggage in a predetermined size or more carried by a first ID holder who uses the baggage determination device 11c based on, for example, the baggage information acquired by the third sensor 1110. The fourth determination unit 1111 determines whether the first determination unit has determined baggage in a predetermined size or more based on the output information of the first determination unit 1103. The fourth determination unit 1111 determines whether the first determination unit 1103 has performed the determination process on each piece of baggage in a predetermined size or more carried by the first ID holder who uses the baggage determination device 11c. When the fourth determination result fails to be obtained for the at least one piece of baggage of the predetermined size or more, that is, when the at least one piece of baggage of the predetermined size or more is not determined by the first determination unit 1103, the fourth determination unit 1111 outputs information indicating that entry is not permitted in an entrance propriety determination routine in the second entrance section described later.

Based on the information obtained from the third sensor 1110 and the fourth determination unit 1111, the processor 1101 may display baggage in a predetermined size or more that is not determined by the first determination unit 1103 on the display device 1104 as shown in FIGS. 20A and 20B, for example.

The display device 1104 may display a message urging the user of the baggage determination device 11 to inspect the baggage, for example, as a display content 11041 and a display content 11043 shown in FIG. 20A. The display device 1104 may display the uninspected baggage using an image of the first ID holder, a silhouette of a person and the baggage, or the like as the display content 11044. In addition, as in the display content 11045, unchecked baggage may be highlighted by using display schemes such as being surrounded by a frame or indicated by an arrow.

The display device 1104 may display a plurality of pieces of uninspected baggage like display contents 11044a and 11044b shown in FIG. 20B. For example, when the baggage determination device 11c includes a baggage storage area 1108 as shown in FIG. 4B, the display content 11044a may display unchecked baggage that is worn or touched by the first ID holder, and the display content 11044b may display unchecked baggage placed in the baggage storage area 1108. A plurality of pieces of unchecked baggage may be highlighted like display contents 11045a and 11045b.

In this manner, the user of the inspection system 300c can determine whether a predetermined object is included in baggage in a predetermined size or more without omission for all pieces of baggage.

A first determination routine in the entrance management system 10c according to the fourth embodiment will be described with reference to flowcharts shown in FIGS. 21A and 21B. The first determination routine in the fourth embodiment is different from the first determination routine in the first embodiment in that a determination as to whether a predetermined object is included in baggage of a first ID holder by a baggage determination device 11c and a fourth determination as to whether all pieces of baggage in a predetermined size or more carried by a first ID holder have been determined by a first determination unit are performed simultaneously.

The first ID recognition unit 1102 acquires information of the first ID possessed by the first ID holder (S401).

The processor 1101 determines whether the information of the first ID has been acquired (S402). In the case in which the first ID information fails to be acquired (S402: NO), the processor 1101 ends the first determination routine.

In the case in which the information of the first ID has been acquired (S402: YES), the processor 1101 determines whether the first ID has an entry qualification (S403). In the case in which the first ID has no entry qualification (S403: NO), the processor 1101 ends the first determination routine.

In the case in which the first ID has an entry qualification (S403: YES), the processor 1101 starts a baggage determination loop (S404). The processor 1101 determines whether the first ID holder has interrupted the determination loop (S405). In the case in which the determination loop is interrupted (S405: YES), the processor 1101 ends the baggage determination loop (S413) and ends the first determination routine. In the case in which the baggage determination loop is not interrupted (S405: NO), the first ID holder installs the baggage in the baggage determination device 11 (S406). The first determination unit 1103 determines whether the baggage includes a predetermined object (S407). The processor 1101 stores the first determination result and the first ID in association with each other in the storage device 1001 (S408). The processor 1101 executes a fourth determination subroutine shown in FIG. 22 (S409). The processor 1101 determines whether all pieces of baggage in a predetermined size or more of the first ID holder have been determined by the first determination unit 1103 based on the fourth determination result (S410). In the case in which all pieces of baggage of the predetermined size or more are determined by the first determination unit 1103 (S410: YES), the processor 1101 ends the baggage determination loop (S411) and ends the first determination routine. In the case in which the first determination unit 1103 does not determine at least one piece of baggage of the predetermined size or more (S410: NO), the processor 1101 repeats the baggage determination loop.

Next, the fourth determination routine in the entrance management system 10c according to the fourth embodiment will be described with reference to a flowchart shown in FIG. 22.

The processor 1101 acquires the information on the baggage of the predetermined size or more of the first ID holder acquired by the third sensor 1110 (SR401). The fourth determination unit 1111 determines whether the baggage of the first ID holder is determined by the first determination unit 1103 based on the information acquired by the third sensor 1110 (SR402). The processor 1101 stores the first ID, the baggage information, and the fourth determination result in association with each other in the storage device 1001 (SR403), and ends the fourth determination subroutine.

Next, the entrance propriety determination routine in the entrance management system 10c according to the fourth embodiment will be described with reference to flowcharts shown in FIGS. 23A and 23B.

In the entrance propriety determination routine according to the fourth embodiment, Steps S420 to S427 correspond to Steps S110 to S117 of the entrance propriety determination routine according to the first embodiment shown in FIG. 6, and thus these steps are omitted.

In the case in which the first determination result associated with the first ID corresponding to the second ID has been acquired (S426: YES), the processor 1201 acquires the fourth determination result associated with the first ID corresponding to the second ID from the storage device 1001 (S428). The processor 1201 determines whether all pieces of baggage in a predetermined size or more carried by the second ID holder have been determined by the first determination unit 1103 based on the fourth determination result (S429). In the case in which the first determination unit 1103 does not determine at least one piece of baggage of the predetermined size or more (S429: NO), the processor 1201 outputs information indicating that entry is not permitted (S430), and ends the entrance propriety determination routine. In the case in which all pieces of baggage in a predetermined size or more have been determined by the first determination unit 1103 (S429: YES), the processor 1201 executes a predetermined object determination subroutine of the baggage of the second ID holder shown in FIG. 8 (S431), and ends the entrance propriety determination routine.

As described above, in accordance with the entrance management system 10c according to the fourth embodiment, in the inspection system 300c to which the entrance management system 10c is applied, the user of the inspection system 300c can determine whether a predetermined object is included in baggage in a predetermined size or more without omission for all pieces of baggage. By displaying baggage in a predetermined size or more for which determination is not performed on the display device 1104, it is possible to urge execution of the determination.

In addition, the entry of a visitor who does not obtain the fourth determination result for at least one piece of baggage is not permitted, and thus it is possible to prevent a visitor from bringing baggage including a predetermined object and undetermined baggage in a predetermined size or more.

Fifth Embodiment

Next, a fifth embodiment will be described. In the configuration of the fifth embodiment, the description of the configuration similar to that of the first embodiment is omitted or simplified by referring to the description of the first embodiment.

FIG. 24 is a diagram showing a schematic configuration of an entrance management system 10d according to the fifth embodiment. In FIG. 24, the same components as those of the entrance management system 10 according to the first embodiment are partially omitted.

A baggage determination device 11d included in the entrance management system 10d according to the fifth embodiment includes, for example, a fourth sensor 1120. The fourth sensor 1120 may be similar to the first sensor 1203. The fourth sensor 1120 includes, for example, a camera that captures visible light or infrared light, a LiDAR, a ToF sensor, a 3D sensor, or the like. Similarly to the first sensor 1203, the fourth sensor 1120 may include a plurality of sensors of the same type, or may include a combination of a plurality of types of sensors different from each other, such as a camera and a LiDAR, and a camera and a 3D sensor.

The fourth sensor 1120 may be installed, for example, in front of, behind, or above the user of the baggage determination device 11d, and acquire information of baggage carried by the user of the baggage determination device 11d. The fourth sensor 1120 may be installed inside a first determination unit 1103 and acquire baggage information determined by the first determination unit. The fourth sensor 1120 captures an image of baggage carried by a user of the baggage determination device 11d. The fourth sensor 1120 outputs the captured image to a processor 1101 and is controlled by the processor 1101.

The processor 1101 of the baggage determination device 11d causes a storage device 1001 to store the information on the baggage of the predetermined size or more possessed by a first ID holder acquired by the fourth sensor 1120, and a first ID in association with each other.

The entrance management device 12d according to the fifth embodiment includes, for example, a fifth determination unit 1220. The fifth determination unit 1220 may be, for example, the same as the second determination unit 1204. The fifth determination unit 1220 is, for example, an integrated circuit such as a CPU, a GPU, an FPGA, or a microcontroller. Alternatively, the fifth determination unit 1220 may be a computer such as a server incorporating a CPU, a GPU, and the like. The fifth determination unit 1220 includes a program executed by an integrated circuit such as the CPU described above.

The fifth determination unit 1220 determines whether all pieces of baggage in a predetermined size or more carried by a second ID holder are pieces of baggage already determined by a baggage determination device 11e based on the information acquired by the fourth sensor 1120. Specifically, the fifth determination unit 1220 determines whether all pieces of baggage in a predetermined size or more carried by the second ID holder are stored in the storage device 1001 in association with the first ID corresponding to a second ID. For example, it is assumed that at least one of pieces of baggage in a predetermined size or more carried by the second ID holder is not stored in the storage device 1001 in association with the first ID corresponding to the second ID, that is, the baggage of the predetermined size or more not carried at the time of using the baggage determination device 11*d* is carried. At this time, the processor 1201 outputs information indicating that entry is not permitted. On the other hand, since the fifth determination unit does not determine the baggage smaller than the predetermined size, even when the second ID holder has purchased, for example, food and drink after the determination by the baggage determination device 11*d*, the second ID holder can enter without performing the redetermination by the baggage determination device 11*d*, and thus the inspection through-put of the inspection system 300*d* can be improved. In addition, it is possible to prevent the second ID holder from receiving a baggage having a predetermined size or more and not yet determined by the baggage determination device 11*d* from a third party after the determination by the baggage determination device 11*d* and from illegally entering.

FIG. 25 is a plan view schematically showing inspection system 300*d* to which the entrance management system 10*d* according to the fifth embodiment is applied.

In the inspection system 300*d* according to the fifth embodiment shown in FIG. 25, a baggage determination device 11*da* includes a fourth sensor 1120*a*, a baggage determination device 11*db* includes a fourth sensor 1120*b*, and a baggage determination device 11*dc* includes a fourth sensor 1120*c*.

A first determination routine in the entrance management system 10*d* according to the fifth embodiment will be described with reference to a flowchart shown in FIG. 26.

The first ID recognition unit 1102 acquires information of the first ID possessed by the first ID holder (S501).

The processor 1101 determines whether the information of the first ID has been acquired (S502). In the case in which the first ID information fails to be acquired (S502: NO), the processor 1101 ends the first determination routine.

In the case in which the information of the first ID has been acquired (S502: YES), the processor 1101 determines whether the first ID has an entry qualification (S503). In the case in which the first ID has no entry qualification (S503: NO), the processor 1101 ends the first determination routine.

In the case in which the first ID has an entry qualification (S503: YES), the processor 1101 starts a baggage determination loop (S504). The first ID holder installs the baggage in the baggage determination device 11 (S505). The fourth sensor 1120 acquires information of the baggage owned by the first ID holder (S506). The processor 1101 stores the first ID and the baggage information acquired by the fourth sensor 1120 in the storage device 1001 in association with each other (S507). The first determination unit 1103 determines whether the baggage includes a predetermined object (S508). The processor 1101 stores the first determination result and the first ID in association with each other in the storage device 1001 (S509). The processor 1101 determines whether the first ID holder has ended the baggage determination loop (S510). In the case in which the first ID holder ends the baggage determination loop (S510: YES), the processor 1101 ends the baggage determination loop (S511) and ends the first determination routine. In the case in which the first ID holder has not ended the baggage determination loop (S510: NO), the processor 1101 repeats the baggage determination loop.

Next, an entrance propriety determination routine in the entrance management system 10*d* according to the fifth embodiment will be described with reference to flowcharts shown in FIGS. 27A and 27B.

In the entrance propriety determination routine according to the fifth embodiment, Steps S520 to S527 correspond to Steps S110 to S117 of the entrance propriety determination routine according to the first embodiment shown in FIG. 6, and thus the steps are omitted.

In the case in which the first determination result associated with the first ID corresponding to the second ID has been acquired (S526: YES), the processor 1201 acquires information of baggage carried by the second ID holder via the first sensor 1203 (S528). The processor 1201 acquires baggage information associated with the first ID correspond-ing to the second ID from the storage device 1001 (S529). The fifth determination unit 1220 determines whether all pieces of baggage in a predetermined size or more carried by the second ID holder are associated with the first ID corre-sponding to the second ID (S530). In the case in which at least one piece of baggage of the predetermined size or more is not associated with the first ID corresponding to the second ID (S530: NO), the processor 1201 outputs infor-mation indicating that entry is not permitted (S531), and ends the entrance propriety determination routine. In the case in which all the pieces of baggage of the predetermined size or more are associated with the first ID corresponding to the second ID (S530: YES), the processor 1201 executes a predetermined object determination subroutine of the baggage of the second ID holder shown in FIG. 8 (S532), and ends the entrance propriety determination routine.

As described above, in accordance with the entrance management system 10*d* according to the fifth embodiment, in the inspection system 300*d* to which the entrance man-agement system 10*d* is applied, at least one piece of baggage in a predetermined size or more is not stored in the storage device 1001 in association with the first ID corresponding to the second ID, that is, a visitor who possesses a piece of baggage in a predetermined size or more that fails to be possessed at the time of using the baggage determination device 11*d* is not allowed to enter, and thus it is possible to prevent the visitor from receiving a piece of baggage from a third party after determination by the baggage determina-tion device 11*d* and from illegally entering. On the other hand, since the fifth determination unit does not determine the baggage smaller than the predetermined size, even when the second ID holder has purchased, for example, food and drink after the determination by the baggage determination device 11*d*, the second ID holder can enter without perform-ing the redetermination by the baggage determination device 11*d*, and thus the inspection throughput of the inspection system 300*d* can be improved.

Sixth Embodiment

Next, a sixth embodiment will be described.

In the configuration of the sixth embodiment, the descrip-tion of the configuration similar to that of the first embodi-ment is omitted or simplified by referring to the description of the first embodiment.

Figure 29:
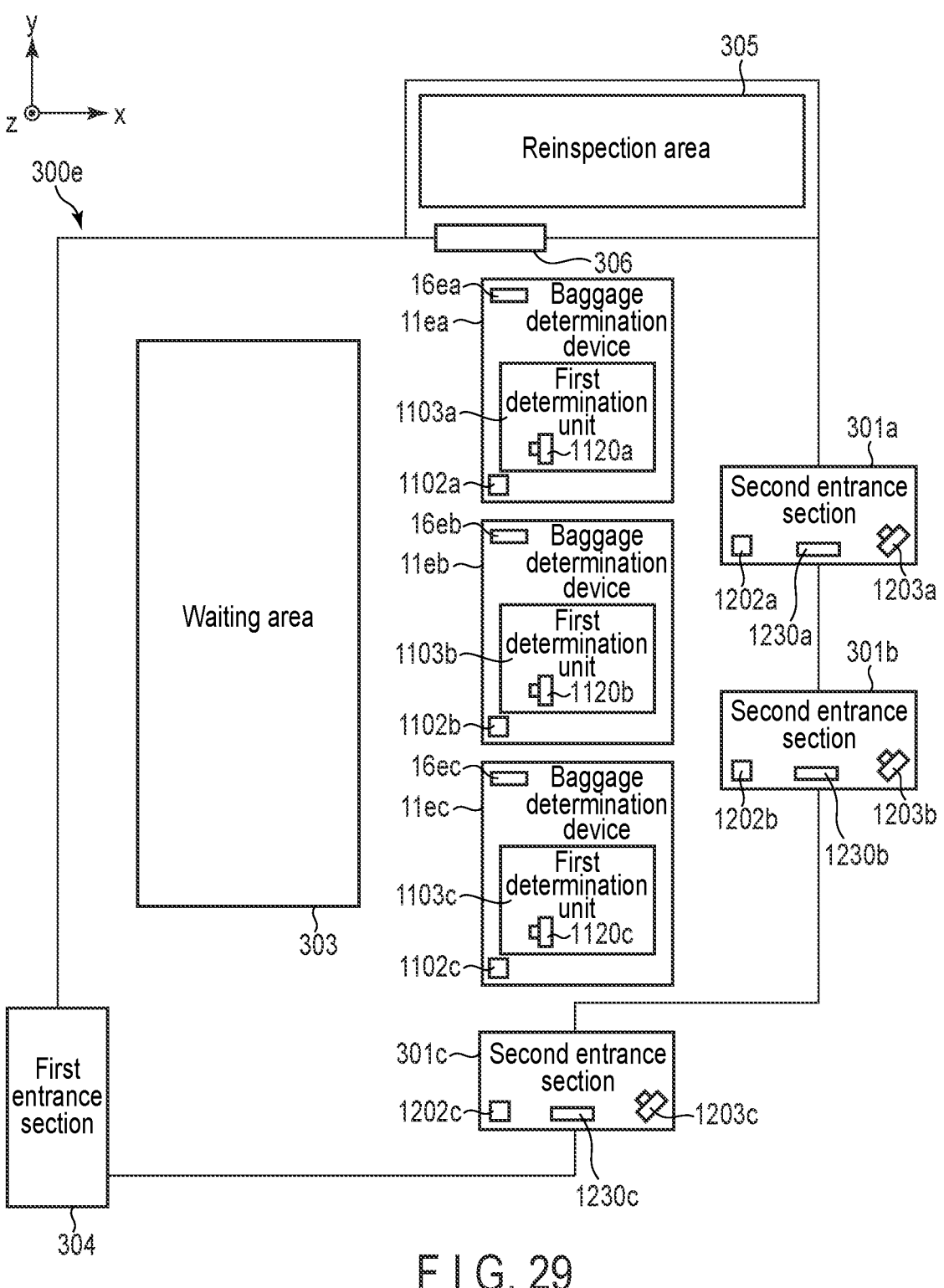
FIG. 29 is a plan view schematically showing an inspection system to which the entrance management system according to the sixth embodiment is applied.

FIG. 28 is a diagram showing a schematic configuration of an entrance management system 10*e* according to the sixth embodiment. FIG. 29 is a plan view schematically showing an inspection system 300*d* to which the entrance management system 10e according to the sixth embodiment is applied. In FIG. 28, the same components as those of the entrance management system 10 according to the first embodiment are partially omitted.

A baggage determination device 11e included in the entrance management system 10e according to the sixth embodiment includes, for example, a tag issuing unit 16e.

In an inspection system 300e according to the sixth embodiment shown in FIG. 29, a baggage determination device 11ea includes a tag issuing unit 16ea, a baggage determination device 11eb includes a tag issuing unit 16eb, and a baggage determination device 11ec includes a tag issuing unit 16ec.

The tag issuing unit 16e includes, for example, a processor 1601, a tag printing unit 1602, a tag storage unit 1603, and a tag receiving unit 1604.

The processor 1601 receives information from a processor 1101 of the baggage determination device 11e and transmits the information to the processor 1101. For example, the processor 1601 may read and write the stored information in a storage device 1001 through the processor 1101, or acquire first ID information acquired by a first ID recognition unit 1102. The processor 1601 writes the acquired first ID information in a tag. The processor 1601 transmits the tag issued by the tag issuing unit 16e and the first ID in association with each other to the processor 1101. Furthermore, the processor 1601 controls tag issuance processing.

The tag printing unit 1602 is controlled by the processor 1601 to print the tag. The tag storage unit 1603 has a function of storing a tag that is printed by the tag printing unit 1602. The tag receiving unit 1604 is configured such that a user of the baggage determination device 11e can send a tag printed by the tag printing unit 1602 and the user can receive the tag.

The tag printing unit 1602 acquires a tag from the tag storage unit 1603, and sends the printed tag to the tag receiving unit 1604. The tag printing unit 1602 may print information on the tag using ink, and when the tag is a radio frequency identification (RFID) tag, the tag printing unit 1602 may read and write information of an IC included in the RFID tag.

FIG. 30 shows an example of the tag 1610 issued by the tag issuing unit 16e. The tag 1610 includes, for example, information 16101 of a first ID holder and a tag ID 16102.

The information 16101 of the first ID holder may be, for example, the same as the display content 11042 shown in FIG. 3A. The information 16101 of the first ID holder may be, for example, a name, an age, a gender, or the like associated in advance with the first ID. Furthermore, for example, in the case of inspecting a visitor of a movie theater, a concert venue, or the like, or a passenger of a train or a bus, the information 16101 of the first ID holder may be a seat or an entry possible time associated in advance with an ID, a destination of the train or the bus, or the like. The information 16101 of the first ID holder is not limited to text, and may be, for example, an image such as a face photograph of the first ID holder associated with the first ID.

The tag ID 16102 is a unique identification code attached to the tag issued by the tag issuing unit 16e. When the tag issuing unit 16e issues a plurality of tags 1610, different IDs are assigned to the respective tags, and the tags are identified based on the ID 16102. The ID 16102 may be printed and displayed on the tag 1610 or may be electronically recorded on an IC 16103. The ID 16102 may be displayed as a character string or may be displayed as an identifier such as a one-dimensional or two-dimensional code.

The tag 1610 may include, for example, the IC 16103 and an antenna 16104. In this case, the tag 1610 operates as an RFID tag capable of reading and writing recorded information of the IC 16103 by an electromagnetic unit. When the tag 1610 is an RFID tag, a fifth sensor 1230 can read the tag carried by a second ID holder in a non-contact manner.

In the inspection system 300e according to the sixth embodiment shown in FIG. 29, a second entrance section 301a includes a fifth sensor 1230a, a second entrance section 301b includes a fifth sensor 1230b, and a second entrance section 301c includes a fifth sensor 1230c. The fifth sensor 1230a acquires information of a tag carried by a passerby of the second entrance section 301a. The same applies to the fifth sensors 1230b and 1230c.

The sixth determination unit 1231 is, for example, an integrated circuit such as a CPU, a GPU, an FPGA, or a microcontroller. Alternatively, the sixth determination unit 1231 may be a computer such as a server incorporating a CPU or a GPU. The sixth determination unit 1231 includes a program executed by an integrated circuit such as the CPU described above.

The sixth determination unit 1231 determines, based on the information acquired by the first sensor 1203 and the fifth sensor 1230, whether all pieces of baggage in a predetermined size or more carried by the second ID holder are pieces of baggage already determined by the baggage determination device 11e. Specifically, the sixth determination unit 1231 determines whether the number of pieces of baggage equal to or larger than the predetermined size determined by the second determination unit 1204 matches based on the information of the tag carried by the second ID holder acquired by the fifth sensor 1230 and the information acquired by the first sensor 1203. The sixth determination unit 1231 determines whether the information of the tag carried by the second ID holder acquired by the fifth sensor 1230 matches the information of the tag stored in the baggage determination device 11e in association with the first ID corresponding to the second ID.

In the case in which the sixth determination unit 1231 determines that the number of tags possessed by the second ID holder does not match the number of tags stored in association with the first ID corresponding to the second ID, the processor 1201 outputs information indicating that the second ID holder is not allowed to enter. In addition, even in the case in which the number of tags possessed by the second ID holder matches the number of tags stored in association with the first ID corresponding to the second ID, in the case in which the information of the tag does not match the tag information stored in association with the first ID corresponding to the second ID in the baggage determination device 11e, the processor 1201 outputs information indicating that the second ID holder is not allowed to enter. In this manner, it is possible to prevent the second ID holder from illegally entering with baggage including a predetermined object or baggage that is not determined whether a predetermined object is included after using the baggage determination device.

A first determination routine in the entrance management system 10e according to the sixth embodiment will be described with reference to a flowchart shown in FIG. 31.

The first ID recognition unit 1102 acquires information of the first ID possessed by the first ID holder (S601).

The processor 1101 determines whether the information of the first ID has been acquired (S602). In the case in which the first ID information fails to be acquired (S602: NO), the processor 1101 ends the first determination routine.

In the case in which the information of the first ID has been acquired (S602: YES), the processor 1101 determines whether the first ID has an entry qualification (S603). In the case in which the first ID has no entry qualification (S603: NO), the processor 1101 ends the first determination routine.

In the case in which the first ID has an entry qualification (S603: YES), the processor 1101 starts a baggage determination loop (S604). The first ID holder makes a baggage determination, and the first ID holder installs the baggage in the baggage determination device 11 (S605). The processor 1101 causes the first determination unit to determine whether the baggage includes a predetermined object (S606). The processor 1101 stores the first ID and the first determination result in association with each other in the storage device 1001 (S607). The tag issuing unit 16e issues a tag corresponding to the baggage (S608). The processor 1601 stores the tag and the first ID in association with each other in the storage device 1001 via the processor 1101 (S609). The processor 1101 determines whether the first ID holder has ended the baggage determination loop (S610). In the case in which it is determined that the first ID holder has ended the baggage determination loop (S610: YES), the processor 1101 ends the baggage determination loop (S611) and ends the first determination routine. In the case in which determining that the first ID holder has not ended the baggage determination loop (S610: NO), the processor 1101 repeats the baggage determination loop.

Next, an entrance propriety determination routine in the entrance management system 10e according to the sixth embodiment will be described with reference to flowcharts shown in FIGS. 32A and 32B.

In the entrance propriety determination routine according to the sixth embodiment, Steps S620 to S627 correspond to Steps S110 to S117 of the entrance propriety determination routine according to the first embodiment shown in FIG. 6, and thus the steps are omitted.

In the case in which the first determination result associated with the first ID corresponding to the second ID has been acquired (S626: YES), the processor 1201 acquires information of baggage carried by the second ID holder via the first sensor 1203 (S628). The fifth sensor 1230 acquires information of a tag carried by the second ID holder (S629). Based on the first sensor information and the fifth sensor information, the sixth determination unit 1231 determines whether the number of all pieces of baggage in a predetermined size or more carried by the second ID holder matches the number of tags carried by the second ID (S630). In the case in which the number of all pieces of baggage of the predetermined size or more carried by the second ID holder does not match the number of tags carried by the second ID (S631: NO), the processor 1201 outputs information indicating that entry is not permitted (S632), and ends the entrance propriety determination routine.

In the case in which the number of all pieces of baggage of the predetermined size or more carried by the second ID holder matches the number of tags carried by the second ID (S631: NO), the sixth determination unit 1231 determines whether the information on the tag acquired by the fifth sensor matches the information on the tag associated with the first ID corresponding to the second ID (S633). When the sixth determination unit 1231 determines that the information of the tag acquired by the fifth sensor 1230 does not match at least one piece of information of the tag associated with the first ID corresponding to the second ID (S634: NO), the processor 1201 outputs information indicating that entry is not permitted (S635), and ends the entrance propriety determination routine. When the sixth determination unit 1231 determines that the information on the tag acquired by the fifth sensor 1230 and the information on the tag associated with the first ID corresponding to the second ID all match (S634: YES), the processor 1201 executes a predetermined object determination subroutine for the baggage of the second ID holder shown in FIG. 32B (S636).

As described above, in accordance with the entrance management system 10e according to the sixth embodiment, by issuing a tag corresponding to baggage in a predetermined size or more in the baggage determination device 11e, it is possible to prevent the second ID holder from illegally entering with baggage including a predetermined object or baggage that is not determined whether a predetermined object is included after using the baggage determination device.

In the above description of each embodiment, an example has been described in which each of the baggage determination device 11, the entrance management device 12, the passage unit 13, the body determination device 14, and the gate device 15 executes various types of information processing by the processors 1101, 1201, 1301, 1401, and 1501 provided in each of the components. The entrance management system 10 may be configured in which a server is connected to each of the baggage determination device 11, the entrance management device 12, the passage unit 13, the body determination device 14, and the gate device 15 via a network, the server receives information from each device and executes various types of information in an integrated manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An entrance management system comprising:
a baggage determination device including a first recognition unit and a first determination unit, the first recognition unit being configured to acquire identification information of a visitor, and the first determination unit being configured to determine whether or not a predetermined object is included in baggage of the visitor;
a storage device configured to store first identification information acquired by the first recognition unit and a first determination result of the first determination unit in association with each other; and
an entrance management device including a first sensor, a second recognition unit, a second determination unit, and a processor, the first sensor being configured to detect information including a size of the baggage, the second recognition unit being configured to acquire identification information of the visitor, the second determination unit being configured to determine whether or not the baggage has a predetermined size or more based on the information detected by the first sensor, and the processor being configured to acquire, from the storage device, the first determination result associated with the first identification information corresponding to the second identification information acquired by the second recognition unit, wherein the baggage determination device further includes a fourth sensor configured to acquire information of the baggage, wherein the storage device is configured to store the first identification information and the baggage information acquired by the fourth sensor in association with each other, wherein the entrance management device further includes an additional determination unit configured to determine whether or not a piece of baggage carried by the visitor is a piece of baggage in which the first identification information corresponding to the second identification information is associated with the piece of baggage information in the storage device based on the information detected by the first sensor; and wherein the processor is configured to:

determine whether or not the visitor is permitted to enter based on the first determination result, a second determination result of the second determination unit, and an additional determination result by the additional determination unit, and output information indicating that the visitor is permitted to enter or the visitor is not permitted to enter.

2. The entrance management system of claim 1, wherein when the first determination result has not been acquired, the processor is configured to output information indicating that entry is permitted when the second determination result indicates that the baggage is less than the predetermined size and the second identification information has an attribute with an entry qualification.

3. The entrance management system of claim 1, further comprising a passage unit including a second sensor, and a third determination unit, the second sensor being configured to detect information including a size of the baggage, and the third determination unit being configured to determine whether or not the baggage is a predetermined size or more based on the information detected by the second sensor, wherein the determination by the third determination unit is performed before the determination by the first determination unit.

4. The entrance management system of claim 1, further comprising a body determination device configured to determine whether or not the visitor possesses the predetermined object, wherein when the first determination result fails to be acquired, the processor is configured to determine to perform determination by the body determination device on the visitor.

5. The entrance management system of claim 1, wherein:

the baggage determination device further includes a third sensor, and a fourth determination unit, the third sensor being configured to acquire information of the baggage, the fourth determination unit being configured to determine whether or not the first determination unit has made a determination on the baggage of the predetermined size or more possessed by the visitor based on the information acquired by the third sensor and the first determination result;

the storage device is configured to store the identification information and a fourth determination result by the fourth determination unit in association with each other; and the processor is configured to determine whether or not the visitor is permitted to enter based on the first determination result, the second determination result, and the fourth determination result.

6. The entrance management system of claim 1, wherein when the second determination unit determines that the baggage is the predetermined size or more, and the additional determination unit determines that the baggage of the predetermined size or more is not the baggage in which the first identification information corresponding to the second identification information is associated with the information on the baggage in the storage device, the processor is configured to output information indicating that entry is not permitted.

7. The entrance management system of claim 3, wherein:
the passage unit further includes a display device; and
the processor is configured to:
determine information regarding baggage inspection to be presented to the visitor based on a third determination result by the third determination unit, and
display the information on the display device.

8. The entrance management system of claim 4, wherein when the second identification information is information having an attribute with an entry qualification and the body determination device determines that the visitor does not have the predetermined object, the processor is configured to output information indicating that entry is permitted.

9. The entrance management system of claim 8, further comprising a gate device to which the information output from the processor is input,
wherein when information indicating that entry is not permitted is input, the gate device is configured to open, and when information indicating that entry is permitted is input, the gate device is configured to close.

10. The entrance management system of claim 9, wherein:
the body determination device includes a display device, and
the display device is configured to display information regarding whether or not the visitor is permitted to enter based on the information output by the processor.

11. The entrance management system of claim 5, wherein when the fourth determination unit determines that the determination by the first determination unit fails to be performed on the baggage of the predetermined size or more possessed by the visitor, the processor is configured to output information indicating that entry is not permitted.

12. An entrance management system of claim 1, comprising:
a baggage determination device including a first recognition unit and a first determination unit, the first recognition unit being configured to acquire identification information of a visitor, and the first determination unit being configured to determine whether or not a predetermined object is included in baggage of the visitor;
a storage device configured to store first identification information acquired by the first recognition unit and a first determination result of the first determination unit in association with each other; and
an entrance management device including a first sensor, a second recognition unit, a second determination unit, and a processor, the first sensor being configured to detect information including a size of the baggage, the second recognition unit being configured to acquire identification information of the visitor, the second determination unit being configured to determine whether or not the baggage has a predetermined size or more based on the information detected by the first sensor, and the processor being configured to acquire, from the storage device, the first determination result associated with the first identification information corresponding to the second identification information acquired by the second recognition unit, wherein the baggage determination device further includes a tag issuing unit configured to issue a tag for identifying the baggage having the predetermined size or more and having been determined by the first determination unit;

wherein the storage device is configured to store the first identification information and the tag information in association with each other;

wherein the entrance management device further includes a fifth an extra sensor, and an extra determination unit, the extra sensor being configured to acquire information from the tag, and the extra determination unit being configured to determine whether or not the baggage of the predetermined size or more possessed by the visitor includes a tag in which the first identification information corresponding to the second identification information is associated with the information of the tag in the storage device based on the information detected by the first sensor and the information of the tag acquired by the extra sensor; and wherein the processor is configured to:

determine whether or not the visitor is permitted to enter based on the first determination result, a second determination result of the second determination unit, and an extra determination result of the extra determination unit, and output information indicating that the visitor is permitted to enter or the visitor is not permitted to enter.

13. The entrance management system of claim 12, wherein when the extra determination unit determines that the baggage of the predetermined size or more possessed by the visitor does not include a tag in which the first identification information corresponding to the second identification information is associated with information of the tag in the storage device, the processor is configured to output information indicating that entry is not permitted.

* * * * *